United States Patent
Cirik et al.

(10) Patent No.: US 12,219,557 B2
(45) Date of Patent: Feb. 4, 2025

(54) WIRELESS COMMUNICATIONS FOR SCHEDULING TRANSMISSIONS

(71) Applicant: Comcast Cable Communications, LLC, Philadelphia, PA (US)

(72) Inventors: Ali Cirik, Herndon, VA (US); Esmael Dinan, McLean, VA (US); Yunjung Yi, Vienna, VA (US); Hua Zhou, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/090,670

(22) Filed: Nov. 5, 2020

(65) Prior Publication Data
US 2021/0136802 A1    May 6, 2021

Related U.S. Application Data

(60) Provisional application No. 62/930,803, filed on Nov. 5, 2019.

(51) Int. Cl.
*H04W 72/1273* (2023.01)
*H04L 1/1867* (2023.01)
(Continued)

(52) U.S. Cl.
CPC ......... *H04W 72/1273* (2013.01); *H04L 1/189* (2013.01); *H04L 5/0053* (2013.01); *H04L 5/0092* (2013.01); *H04L 5/0094* (2013.01); *H04W 72/231* (2023.01); *H04W 72/232* (2023.01); *H04L 1/08* (2013.01); *H04L 5/0023* (2013.01); *H04W 72/20* (2023.01)

(58) Field of Classification Search
CPC ......... H04W 72/1278; H04W 72/1273; H04W 72/042; H04W 72/1289; H04W 72/23; H04W 72/231; H04W 72/232; H04L 1/08; H04L 5/0092; H04L 5/0023; H04L 1/189; H04L 5/0053; H04L 5/0094
See application file for complete search history.

(56) References Cited

U.S. PATENT DOCUMENTS

2019/0260532 A1 * 8/2019 Manolakos ........... H04L 5/0051
2019/0297603 A1    9/2019 Guo et al.
(Continued)

FOREIGN PATENT DOCUMENTS

| EP | 3963752 A1 | 3/2022 | |
|---|---|---|---|
| WO | WO-2020164116 A1 * | 8/2020 | ............ H04B 7/022 |
| WO | 2020226843 A1 | 11/2020 | |

OTHER PUBLICATIONS

Huawei et al: "Enhancements on multi-TRP/panel transmission", 3GPP Draft; R1-1910073, 3rd Eneration Partnership Project (3GPP), Mobile Competence Centre ; 650, Route Des Lucioles ; F-06921 Sophia-Antipolis Cedex; France vol. RAN WG1, No. Chongqing, China; Oct. 14, 2019-Oct. 20, 2019 Oct. 5, 2019.*

(Continued)

*Primary Examiner* — Kevin C. Harper
(74) *Attorney, Agent, or Firm* — Banner & Witcoff, Ltd.

(57) ABSTRACT

A wireless device may receive one or more repetitions of a downlink transmission. The wireless device may use one or more default receiving beams for receiving transmission. A quantity of default receiving beams to be used by the wireless device may be indicated by a base station.

20 Claims, 27 Drawing Sheets

(51) Int. Cl.
  *H04L 5/00* (2006.01)
  *H04W 72/231* (2023.01)
  *H04W 72/232* (2023.01)
  *H04L 1/08* (2006.01)
  *H04W 72/20* (2023.01)

(56) References Cited

U.S. PATENT DOCUMENTS

| | | | | |
|---|---|---|---|---|
| 2020/0100277 | A1* | 3/2020 | Khoshnevisan | H04W 72/1273 |
| 2020/0337058 | A1* | 10/2020 | Song | H04W 72/0446 |
| 2021/0219336 | A1* | 7/2021 | Fan | H04W 74/04 |
| 2021/0235284 | A1 | 7/2021 | Venugopal et al. | |
| 2021/0368517 | A1* | 11/2021 | Chen | H04L 5/0051 |
| 2021/0385847 | A1* | 12/2021 | Kang | H04L 5/0023 |
| 2021/0392630 | A1* | 12/2021 | Ying | H04L 5/0053 |
| 2022/0022237 | A1* | 1/2022 | Kim | H04B 7/0408 |
| 2022/0200758 | A1* | 6/2022 | Su | H04L 5/0035 |

OTHER PUBLICATIONS

R1-1911217 3GPP TSG RAN WG1 Meeting #98bis, Chongqing, China, Oct. 14-20, 2019, Source: ASUSTek, Title: Enhancements on multiple TRP or panel transmission.
R1-1911235 3GPP TSG RAN WG1 Meeting #98bis, Chongqing, China, Oct. 14-20, 2019, Source: China Telecom, Title: Discussion on Multi-TRP/Panel Transmission enhancements.
R1-1911425 3GPP TSG RAN WG1 Meeting #98bis, Chongqing, China, Oct. 14-20, 2019, Source: Huawei, HiSilicon, Title: Feature Summary of Enhancements on Multi-TRP/Panel Transmission.
R1-1911426 3GPP TSG RAN WG1 Meeting #98bis, Chongqing, China, Oct. 14-20, 2019, Source: Huawei, HiSilicon, Title: Summary of Remaining Issues and Agreements for Enhancements on Multi-TRP/panel transmission.
R1-1911470 3GPP TSG RAN WG1 Meeting #98bis, Chongqing, China, Oct. 14-20, 2019, Source: Huawei, HiSilicon, Title: Summary of Proposals for M-TRP Online Section on Tuesday.
R1-1911471 3GPP TSG RAN WG1 Meeting #98bis, Chongqing, China, Oct. 14-20, 2019, Source: Huawei, HiSilicon, Title: Summary of Proposals for M-TRP Offline Section on Tuesday.
R1-1911524 3GPP TSG RAN WG1 Meeting #98bis, Chongqing, China, Oct. 14-20, 2019, Source: Huawei [RAN WG1], Title: [Draft] Reply LS on single PDCCH-based multi-TRP operation.
R1-1911550 3GPP TSG RAN WG1 Meeting #98bis, Chongqing, China, Oct. 14-20, 2019, Source: RAN WG1, Title: Reply LS on single PDCCH-based multi-TRP operation.
R1-1911603 3GPP TSG RAN WG1 Meeting #98bis, Chongqing, China, Oct. 14-20, 2019, Source: Huawei, HiSilicon, Title: Feature Lead summary for M-TRP Offline Session on Thursday.
3GPP TS 38.213 V15.6.0 (Jun. 2019), Technical Specification, 3rd Generation Partnership Project; Technical Specification Group Radio Access Network; NR; Physical layer procedures for control (Release 15).
3GPP TS 38.214 V15.6.0 (Jun. 2019), Technical Specification, 3rd Generation Partnership Project; Technical Specification Group Radio Access Network; NR; Physical layer procedures for data (Release 15).
3GPP TS 38.300 V15.6.0 (Jun. 2019), Technical Specification, 3rd Generation Partnership Project; Technical Specification Group Radio Access Network; NR; NR and NG-RAN Overall Description; Stage 2 (Release 15).
3GPP TS 38.321 V15.6.0 (Jun. 2019), Technical Specification, 3rd Generation Partnership Project; Technical Specification Group Radio Access Network; NR; Medium Access Control (MAC) protocol specification (Release 15).
3GPP TS 38.331 V15.6.0 (Jun. 2019), Technical Specification, 3rd Generation Partnership Project; Technical Specification Group Radio Access Network; NR; Radio Resource Control (RRC) protocol specification (Release 15).
R1-1908066 3GPP TSG RAN WG1 Meeting #98, Prague, Czech Republic, Aug. 26-30, 2019, Source: Huawei, HiSilicon, Title: Enhancements on Multi-TRP/panel transmission.
R1-19xxxxx 3GPP TSG-RAN WG1 Meeting #98bis, Chongqing, China, Oct. 14-20, 2019, Source: Samsung, Title: Introduction of MIMO enhancements.
R1-19xxxxx 3GPP TSG-RAN WG1 Meeting #98bis, Chongqing, China, Oct. 14-20, 2019, Source: Nokia, Title: Introduction of NR enhanced MIMO.
R1-1908166 3GPP TSG RAN WG1 Meeting #98, Prague, Czech Republic, Aug. 26-30, 2019, Source: vivo, Title: Remaining issues on multi-TRP/Panel transmission.
R1-1908191 3GPP TSG RAN WG1 Meeting #98, Prague, Czech Republic, Aug. 26-30, 2019, Source: ZTE, Title: Enhancements on Multi-TRP and Multi-panel Transmission.
R1-1908232 3GPP TSG RAN WG1 Meeting #98, Prague, Czech Republic, Aug. 26-30, 2019, Source: InterDigital Inc., Title: On the Performance of Multi-TRP/Panel Transmission.
R1-1908323 3GPP TSG RAN WG1 Meeting #98, Prague, Czech Republic, Aug. 26-30, 2019, Source: Fujitsu, Title: Enhancements on multi-TRP transmission.
R1-1908379 3GPP TSG RAN WG1 Meeting #98, Prague, Czech Republic, Aug. 26-30, 2019, Source: MediaTek Inc., Title: Enhancements on multi-TRP/panel transmission.
R1-1908501 3GPP TSG RAN WG1 Meeting #98, Prague, Czech Republic, Aug. 26-30, 2019, Source: Samsung, Title: Enhancements on Multi-TRP/Panel Transmission.
R1-1908602 3GPP TSG RAN WG1 Meeting #98, Prague, Czech Republic, Aug. 26-30, 2019, Source: CATT, Title: Considerations on multi-TRP/panel transmission.
R1-1908653 3GPP TSG RAN WG1 Meeting #98, Prague, Czech Republic, Aug. 26-30, 2019, Source: Intel Corporation, Title: On multi-TRP/multi-panel transmission.
R1-1908699 3GPP TSG RAN WG1 Meeting #98, Prague, Czech Republic, Aug. 26-30, 2019, Source: LG Electronics, Title: Enhancements on multi-TRP/panel transmission.
R1-1908783 3GPP TSG RAN WG1 Meeting #98, Prague, Czech Republic, Aug. 26-30, 2019, Source: Sony, Title: Considerations on Multi-TRP/Panel Transmission.
R1-1908856 3GPP TSG RAN WG1 Meeting #98, Prague, Czech Republic, Aug. 26-30, 2019, Source: NEC, Title: Discussion on multi-TRP operation.
R1-1908869 3GPP TSG RAN WG1 Meeting #98, Prague, Czech Republic, Aug. 26-30, 2019, Source: CMCC, Title: Discussion on multi-TRP/panel transmission.
R1-1908885 3GPP TSG RAN WG1 Meeting #98, Prague, Czech Republic, Aug. 26-30, 2019, Source: China Telecom, Title: Discussion on Multi-TRP/Panel Transmission enhancements.
R1-1908958 3GPP TSG RAN WG1 Meeting #98, Prague, Czech Republic, Aug. 26-30, 2019, Source: Spreadtrum Communications, Title: Discussion on Multi-TRP transmission.
R1-1908972 3GPP TSG RAN WG1 Meeting #98, Prague, Czech Republic, Aug. 26-30, 2019, Source: Panasonic, Title: On multi-TRP enhancements for NR MIMO in Rel. 16.
R1-1908990 3GPP TSG RAN WG1 Meeting #98, Prague, Czech Republic, Aug. 26-30, 2019, Source: Ericsson, Title: On multi-TRP and multi-panel.
R1-1909047 3GPP TSG RAN WG1 Meeting #98, Prague, Czech Republic, Aug. 26-30, 2019, Source: Apple Inc., Title: Remaining Issues on Multi-TRP Enhancement.
R1-1909075 3GPP TSG RAN WG1 Meeting #98, Prague, Czech Republic, Aug. 26-30, 2019, Source: AT&T, Title: Enhancements on Multi TRP Transmission.
R1-1910023 3GPP TSG RAN WG1 Meeting #98bis, Chongqing, China, Oct. 14-20, 2019, Source: Spreadtrum Communications, Title: Discussion on Multi-TRP transmission.
R1-1910073 3GPP TSG RAN WG1 Meeting #98bis, Chongqing, China, Oct. 14-20, 2019, Source: Huawei, HiSilicon, Title: Enhancements on multi-TRP/panel transmission.
R1-1910116 3GPP TSG RAN WG1 Meeting #98bis, Chongqing, China, Oct. 14-20, 2019, Source: OPPO, Title: Enhancements on multi-TRP and multi-panel transmission.

(56) References Cited

OTHER PUBLICATIONS

R1-1910142 3GPP TSG RAN WG1 Meeting #98bis, Chongqing, China, Oct. 14-20, 2019, Source: Lenovo, Motorola Mobility, Title: Discussion of multi-TRP/panel transmission.

R1-1910170 3GPP TSG RAN WG1 Meeting #98bis, Chongqing, China, Oct. 14-20, 2019, Source: CMCC, Title: Discussion on multi-TRP/panel transmission.

R1-1910190 3GPP TSG RAN WG1 Meeting #98bis, Chongqing, China, Oct. 14-20, 2019, Source: Fujitsu, Title: Enhancements on multi-TRP transmission.

R1-1910229 3GPP TSG RAN WG1 Meeting #98bis, Chongqing, China, Oct. 14-20, 2019, Source: vivo, Title: Discussion on remaining issues on multi TRP transmission.

R1-1910284 3GPP TSG RAN WG1 Meeting #98bis, Chongqing, China, Oct. 14-20, 2019, Source: ZTE, Title: Enhancements on Multi-TRP and Multi-panel Transmission.

R1-1910349 3GPP TSG RAN WG1 Meeting #98bis, Chongqing, China, Oct. 14-20, 2019, Source: CATT, Title: Considerations on multi-TRP/panel transmission.

R1-1910493 3GPP TSG RAN WG1 Meeting #98bis, Chongqing, China, Oct. 14-20, 2019, Source: Samsung, Title: Enhancements on Multi-TRP/Panel Transmission.

R1-1910523 3GPP TSG RAN WG1 Meeting #98bis, Chongqing, China, Oct. 14-20, 2019, Source: Panasonic, Title: On multi-TRP enhancements for NR MIMO in Rel. 16.

R1-1910567 3GPP TSG RAN WG1 Meeting #98bis, Chongqing, China, Oct. 14-20, 2019, Source: NEC, Title: Discussion on multi-TRP operation.

R1-1910582 3GPP TSG RAN WG1 Meeting #98bis, Chongqing, China, Oct. 14-20, 2019, Source: LG Electronics, Title: Enhancements on multi-TRP/panel transmission.

R1-1910668 3GPP TSG RAN WG1 Meeting #98bis, Chongqing, China, Oct. 14-20, 2019, Source: Intel Corporation, Title: On multi-TRP/multi-panel transmission transmission.

R1-1910749 3GPP TSG RAN WG1 Meeting #98bis, Chongqing, China, Oct. 14-20, 2019, Source: Sony, Title: Considerations on Multi-TRP/Panel Transmission.

R1-1910865 3GPP TSG RAN WG1 Meeting #98bis, Chongqing, China, Oct. 14-20, 2019, Source: Ericsson, Title: Remaining issues for mTRP.

R1-1910915 3GPP TSG RAN WG1 Meeting #98bis, Chongqing, China, Oct. 14-20, 2019, Source: Nokia, Nokia Shanghai Bell, Title: Enhancements on Multi-TRP/Panel Transmission.

R1-1910968 3GPP TSG RAN WG1 Meeting #98bis, Chongqing, China, Oct. 14-20, 2019, Source: Apple Inc., Title: Remaining Issues on Multi-TRP Enhancement Transmission.

R1-1911046 3GPP TSG RAN WG1 Meeting #98bis, Chongqing, China, Oct. 14-20, 2019, Source: MediaTek Inc., Title: Enhancements on multi-TRP/panel transmission.

R1-1911086 3GPP TSG RAN WG1 Meeting #98bis, Chongqing, China, Oct. 14-20, 2019, Source: ITRI, Title: Enhancements on multi-TRP and multi-panel transmission.

R1-1911126 3GPP TSG RAN WG1 Meeting #98bis, Chongqing, China, Oct. 14-20, 2019, Source: Qualcomm Incorporated, Title: Multi-TRP Enhancements.

R1-1911184 3GPP TSG RAN WG1 Meeting #98bis, Chongqing, China, Oct. 14-20, 2019, Source: NTT Docomo, Inc, Title: Enhancements on multi-TRP/panel transmission.

R1-1911209 3GPP TSG RAN WG1 Meeting #98bis, Chongqing, China, Oct. 14-20, 2019, Source: KDDI, Title: Enhancements on multi-TRP/panel transmission.

R1-1911215 3GPP TSG RAN WG1 Meeting #98bis, Chongqing, China, Oct. 14-20, 2019, Source: Xiaomi, Title: Enhancements on Multi-TRP/Panel Transmission.

Huawei et al: "Enhancements on multi-TRP/panel transmission", 3GPP Draft; R1-1910073, 3rd Generation Partnership Project (3GPP), Mobile Competence Centre; vol. RAN WG1, No. Chongqing, China; Oct. 5, 2019.

Mar. 18, 2021—Extended European Search Report—EP 20205972.1.

May 10, 2023—European Office Action—EP App. No. 20205972.1.

* cited by examiner

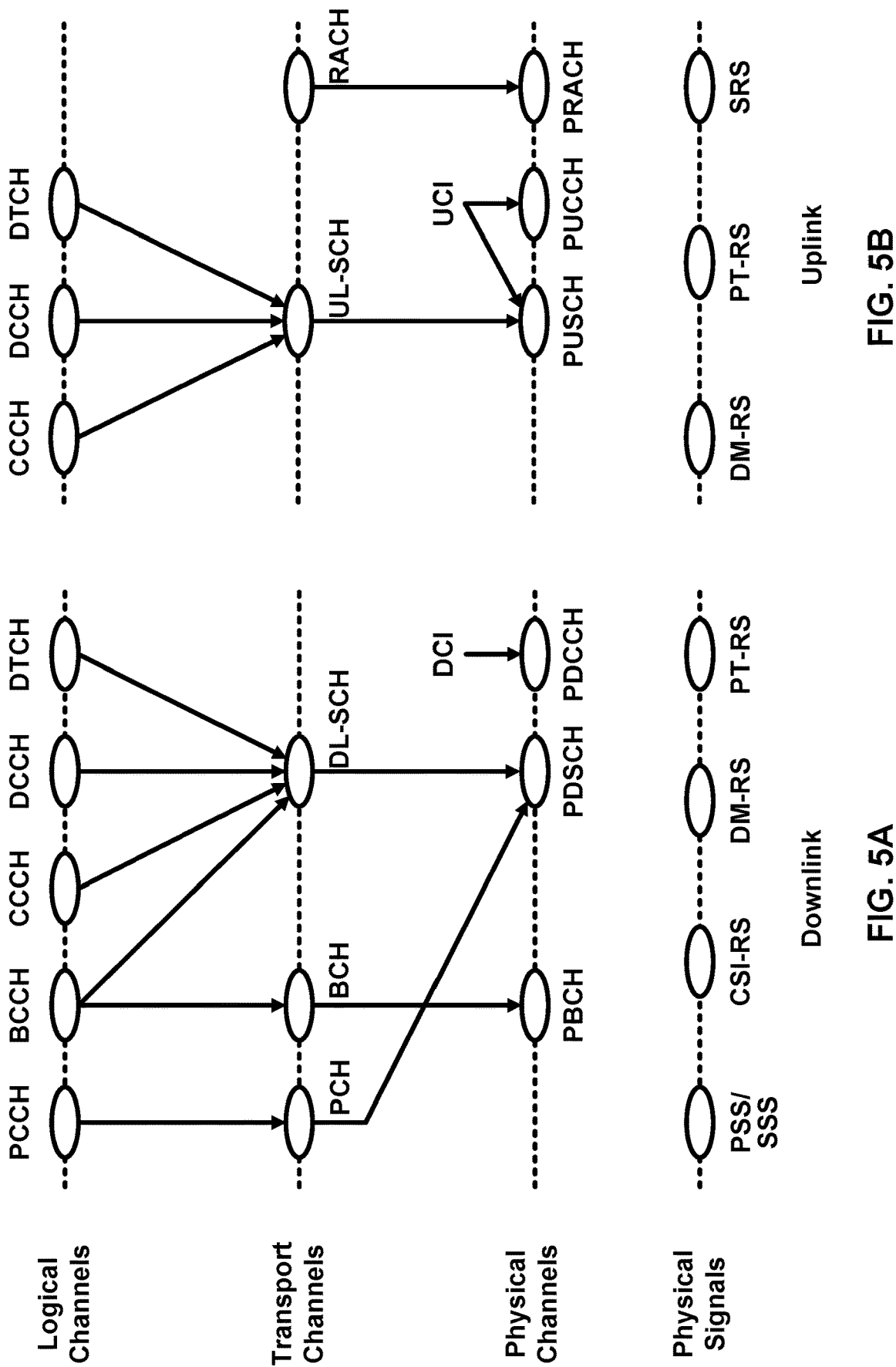

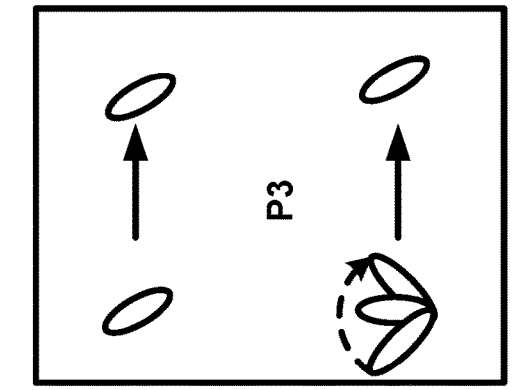
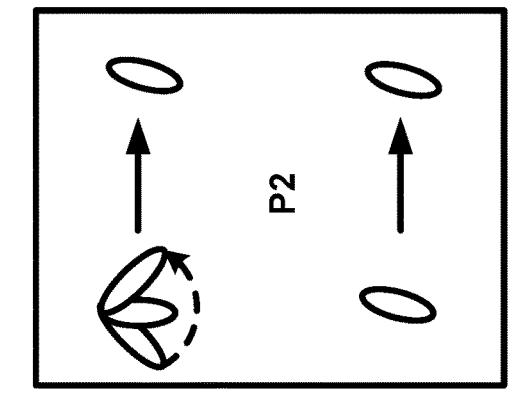
FIG. 12A
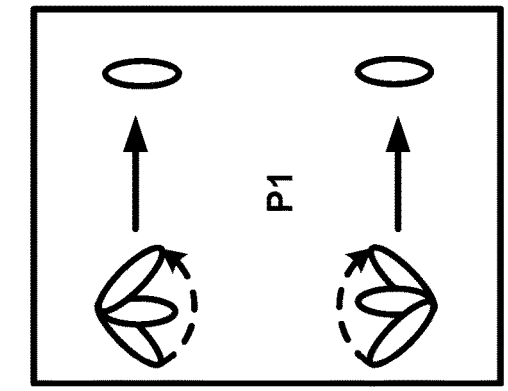
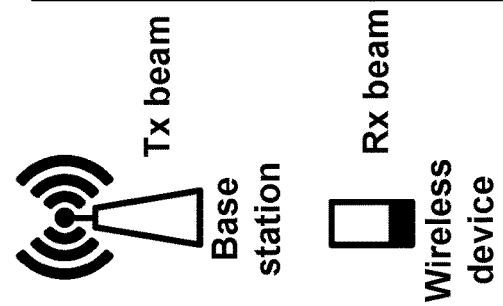
FIG. 12B

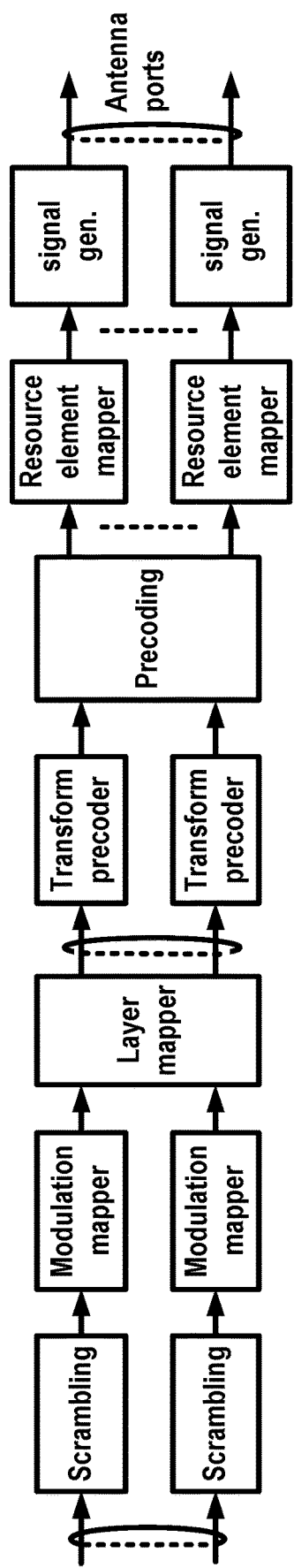
FIG. 16A
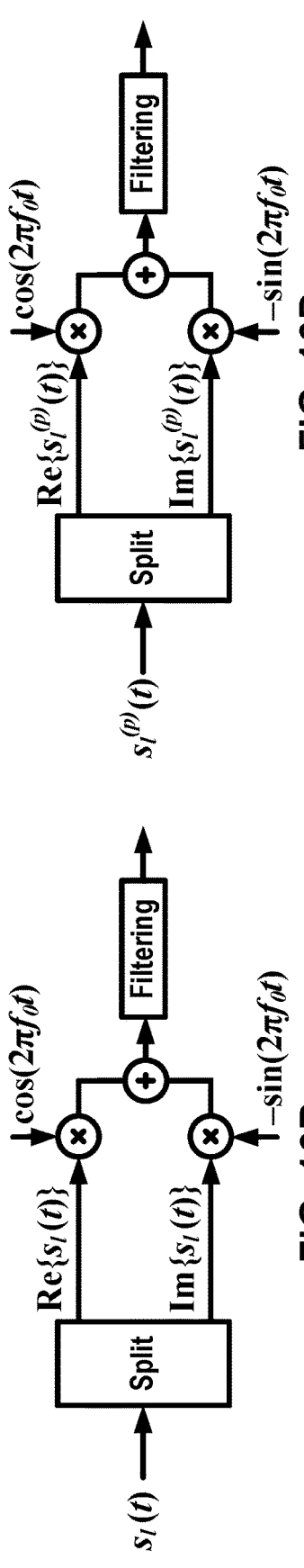
FIG. 16B
FIG. 16D
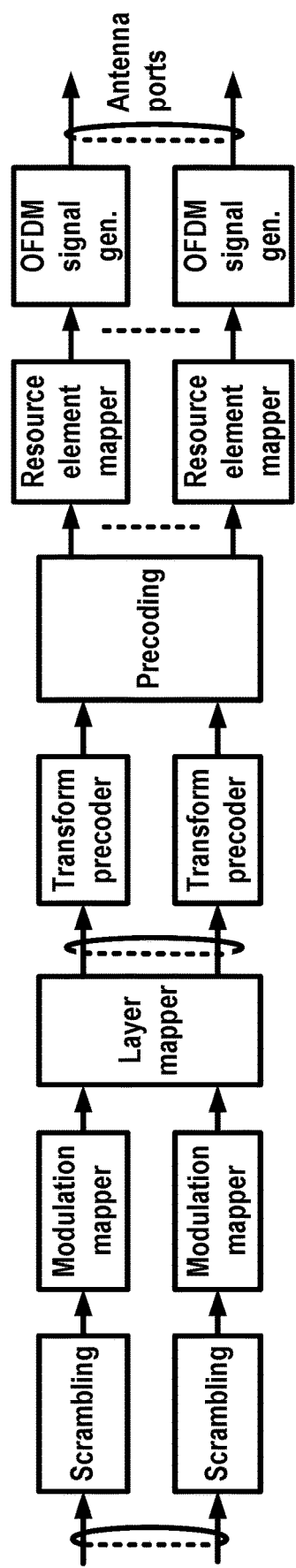
FIG. 16C

TCI-State information element

```
-- ASN1START
-- TAG-TCI-STATE-START

TCI-State ::=            SEQUENCE {
    tci-StateId              TCI-StateId,
    qcl-Type1                QCL-Info,
    qcl-Type2                QCL-Info         OPTIONAL,    -- Need R
    ...
}

QCL-Info ::=             SEQUENCE {
    cell                     ServCellIndex    OPTIONAL,    -- Need R
    bwp-Id                   BWP-Id           OPTIONAL,    -- Cond CSI-RS-Indicated
    referenceSignal          CHOICE {
        csi-rs                   NZP-CSI-RS-ResourceId,
        ssb                      SSB-Index
    },
    qcl-Type                 ENUMERATED {typeA, typeB, typeC, typeD},
    ...
}
```

FIG. 17

```
PDSCH-TimeDomainResourceAllocationList ::= SEQUENCE (SIZE(1..maxNrofDL-Allocations)) OF
                                                    PDSCH-TimeDomainResourceAllocation PDSCH-TimeDomainResourceAllocation ::= SEQUENCE {
    k0                      INTEGER(0..32)                  OPTIONAL
    mappingType             ENUMERATED {typeA, typeB},
    startSymbolAndLength    INTEGER (0..127)
    URLLCRepNum             ENUMERATED {n2, n4, n8}         OPTIONAL
}
```

FIG. 18A

| Row index/ indicator | K0 | Mapping Type | Start symbol and length (SLIV) | Repetition quantity parameter (e.g., URLLCRepNum) |
|---|---|---|---|---|
| 1 | 0 | Type A | 0 | n2 |
| 2 | 0 | Type A | 25 | Not available |
| 3 | 1 | Type B | 127 | n4 |

FIG. 18B

WIRELESS COMMUNICATIONS FOR SCHEDULING TRANSMISSIONS

CROSS-REFERENCE TO RELATED APPLICATIONS

This application claims the benefit of U.S. Provisional Application No. 62/930,803, filed on Nov. 5, 2019. The above-referenced application is hereby incorporated by reference in its entirety.

BACKGROUND

One or more transmission and reception points (TRPs) send downlink transmissions to a wireless device and/or receive uplink transmissions from the wireless device. Transmissions are received and processed at a communication device (e.g., base station, wireless device) using receiving beams.

SUMMARY

The following summary presents a simplified summary of certain features. The summary is not an extensive overview and is not intended to identify key or critical elements.

Wireless communications may comprise transmissions between a wireless device and a base station. The transmissions may may be sent to and/or from one or more transmission and reception points (TRPs), antenna panels, and/or any other device/location. A transmission may comprise repetitions of data and/or control information (e.g., from/to one or more TRPs). The transmission may be received using different receiving beams (e.g., spatial domain transmission filters and/or TCI states). The receiving beams may be indicated via control signaling. Default receiving beam(s) may be used if a transmission is scheduled to be received within a threshold time period (e.g., corresponding to a decoding delay) after reception of the control signaling for the transmission. A quantity of default receiving beams to be used may be configured by a base station. Default receiving beams may be used for receiving a transmission starting within the threshold time period, for example, even if the transmission ends outside the threshold time period. A transmission may span multiple transmission occasions (e.g., multiple time slots) and different default receiving beams may be used in different (e.g., alternating) transmission occasions.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A shows an example mapping for downlink channels.
FIG. 5B shows an example mapping for uplink channels.
FIG. 12A shows examples of downlink beam management procedures.
FIG. 12B shows examples of uplink beam management procedures.
FIG. 16A, FIG. 16B, FIG. 16C, and FIG. 16D show examples of uplink and downlink signal transmission.
FIG. 17 shows an example a transmission configuration indication (TCI) state information element (IE) for downlink beam management.
FIG. 18A and FIG. 18B show examples of physical downlink shared channel (PDSCH) time domain resource allocation.

DETAILED DESCRIPTION

Figure 1A:
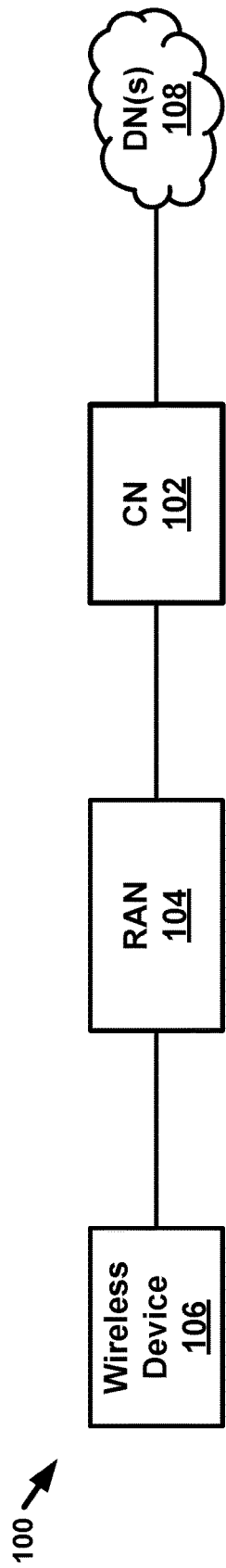
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to wireless communications for downlink transmission (e.g., repetitions and/or using one or more transmission and reception points (TRPs)).

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
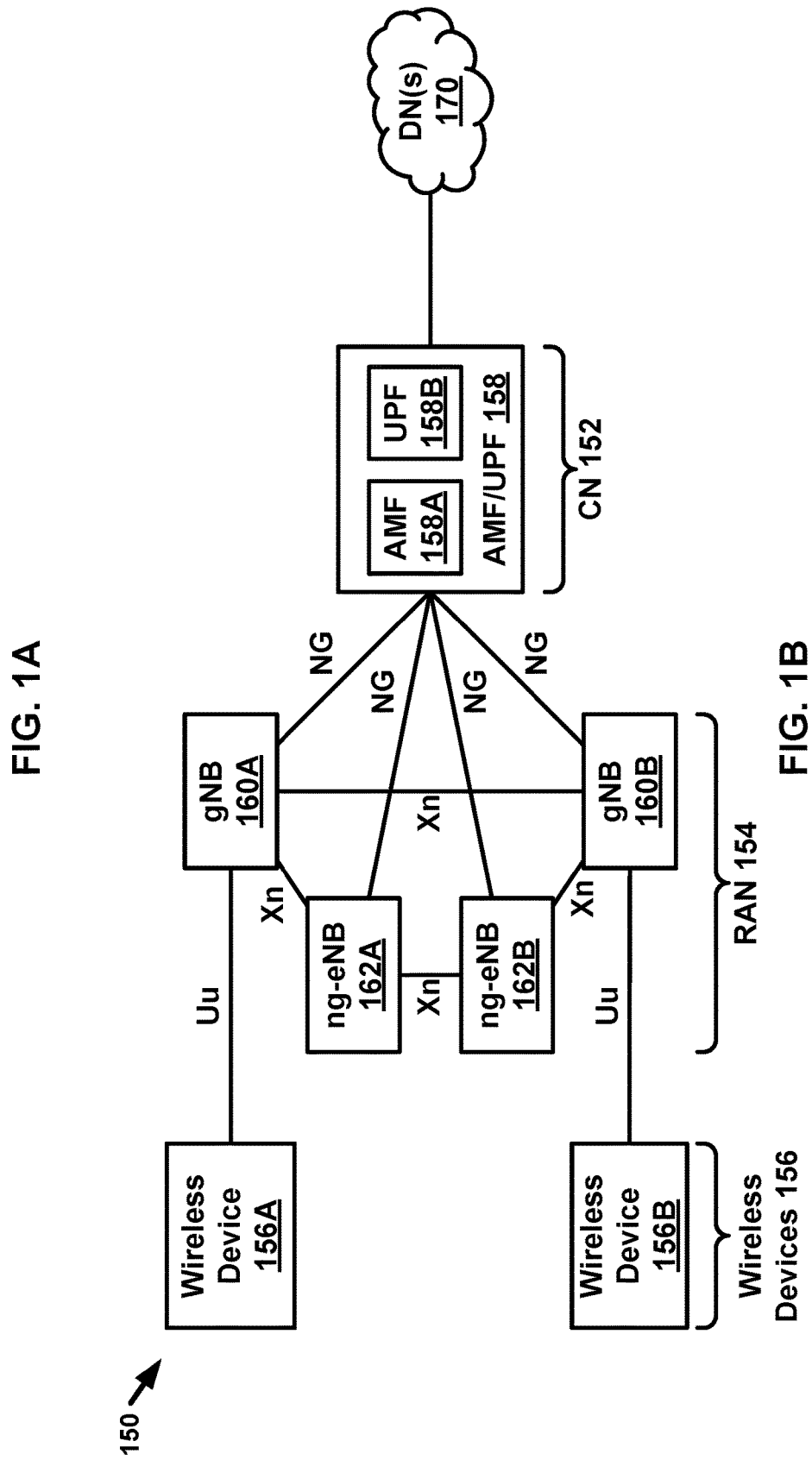

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
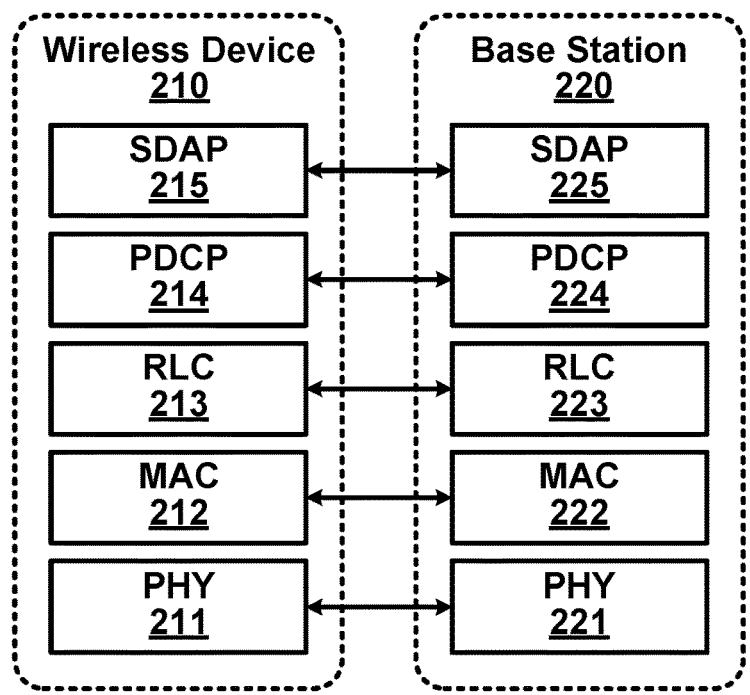
FIG. 2A shows an example user plane.
Figure 2B:
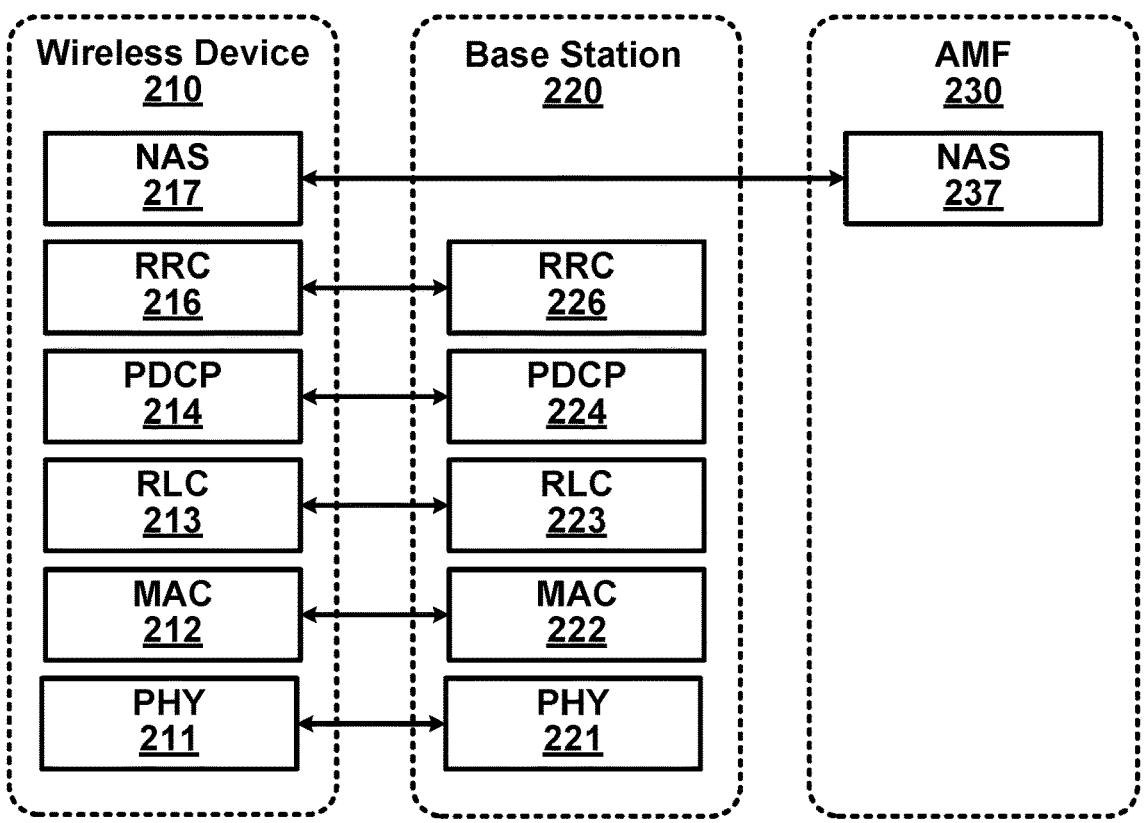
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
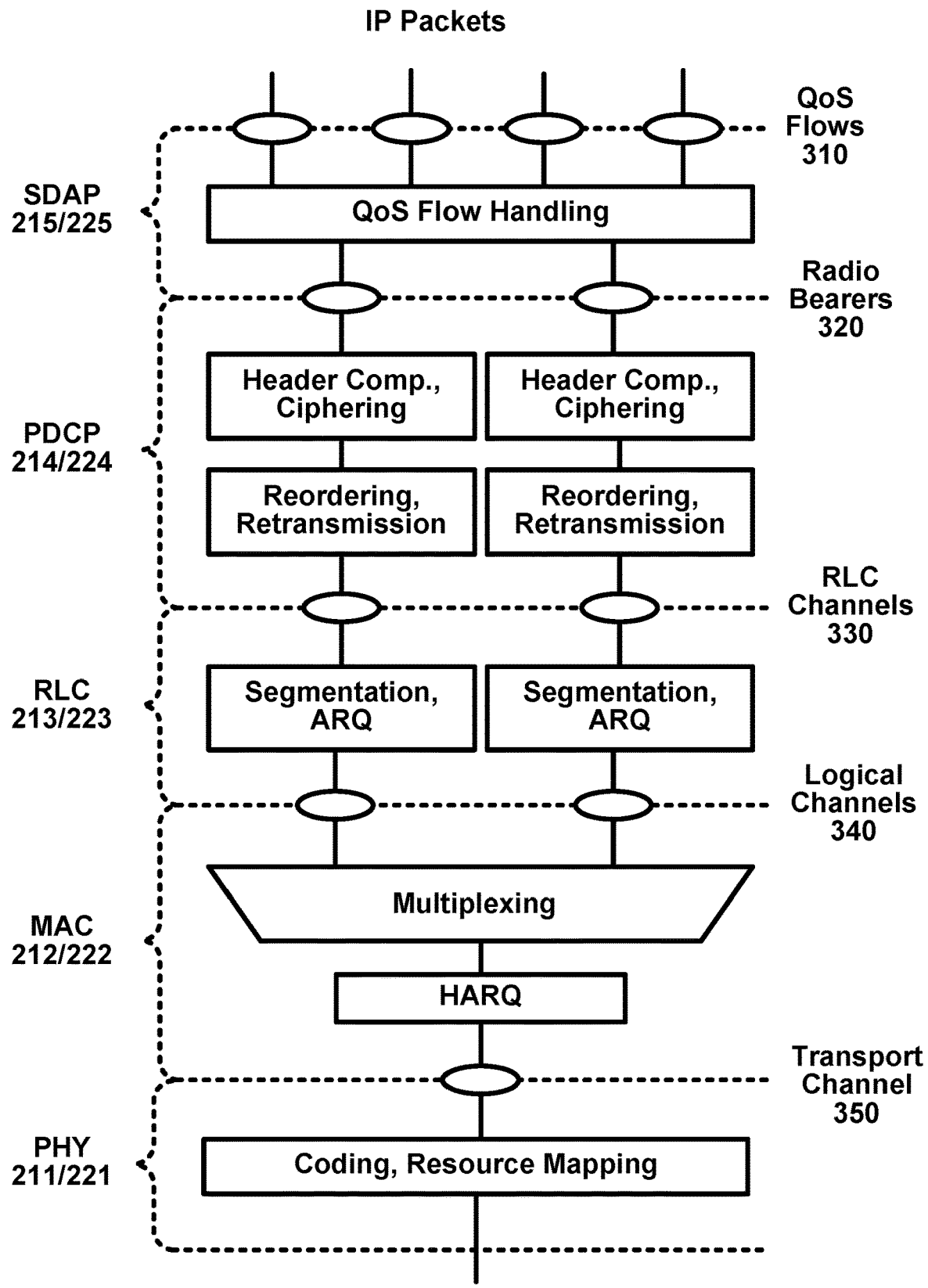
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
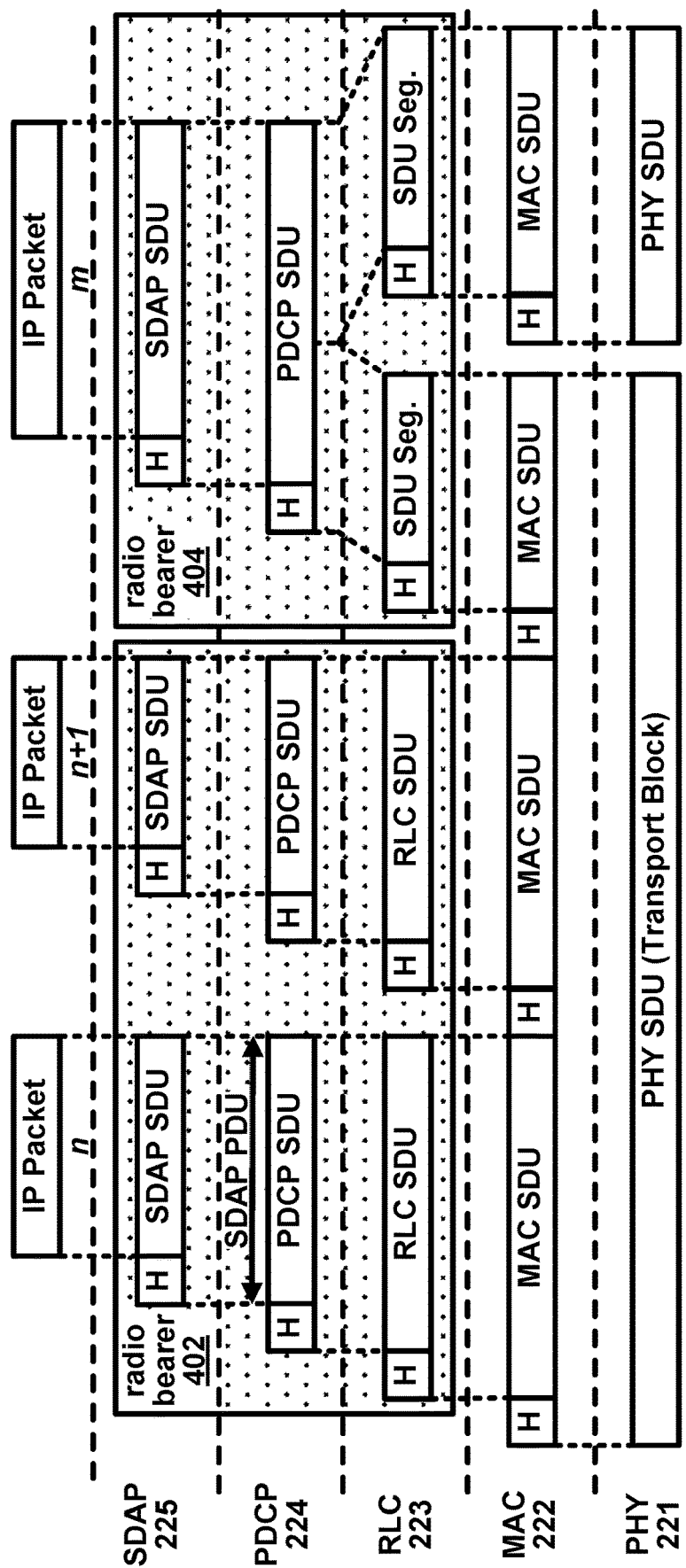
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol laters may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

Figure 4B:
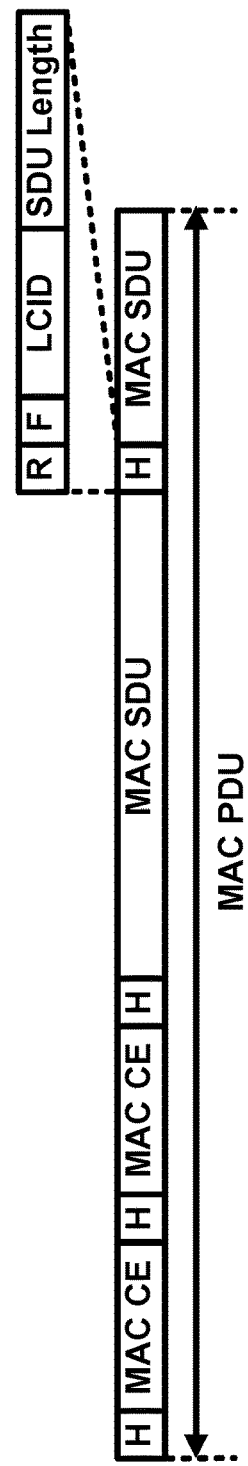
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
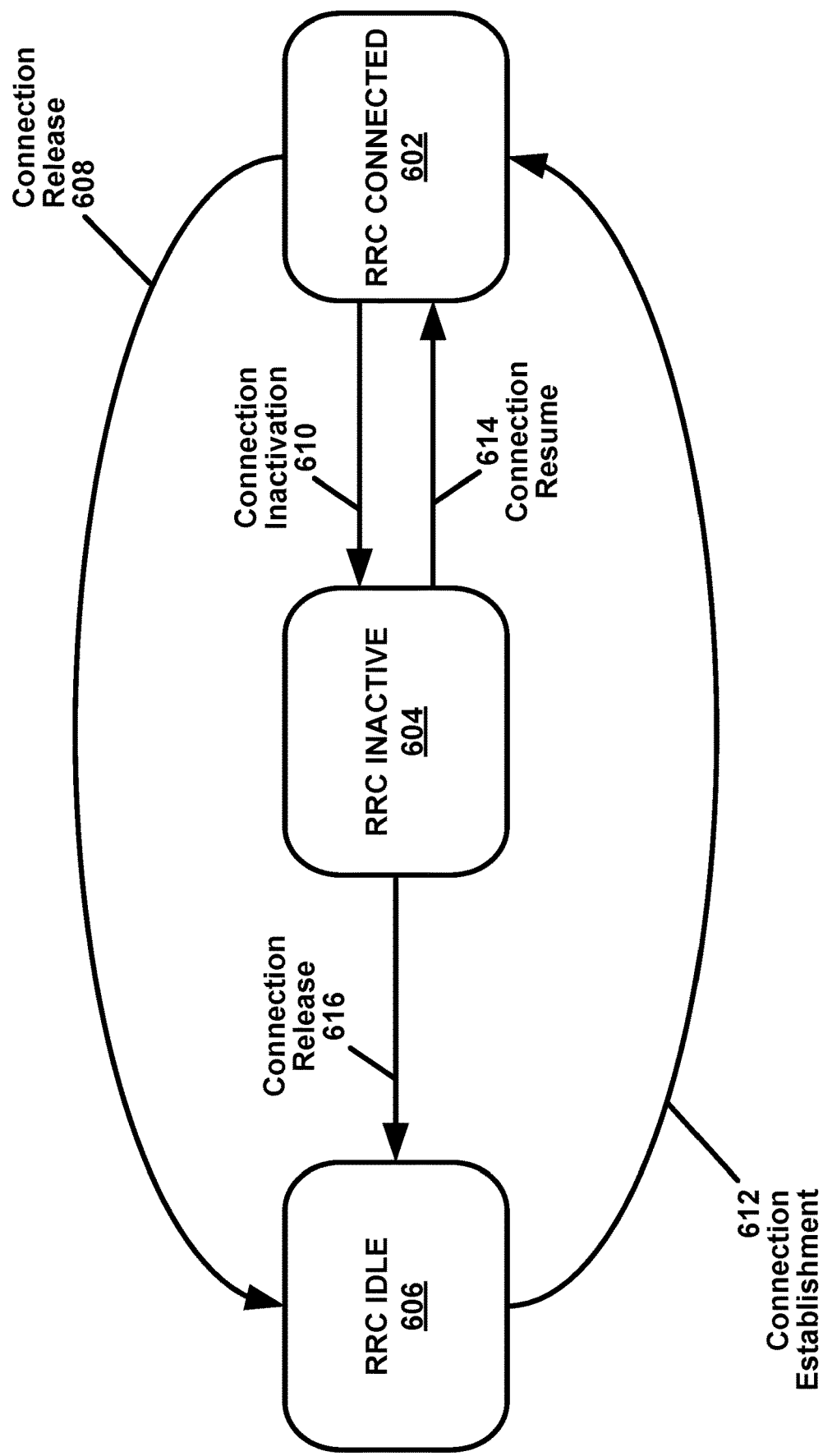
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., each discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/ provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/ output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
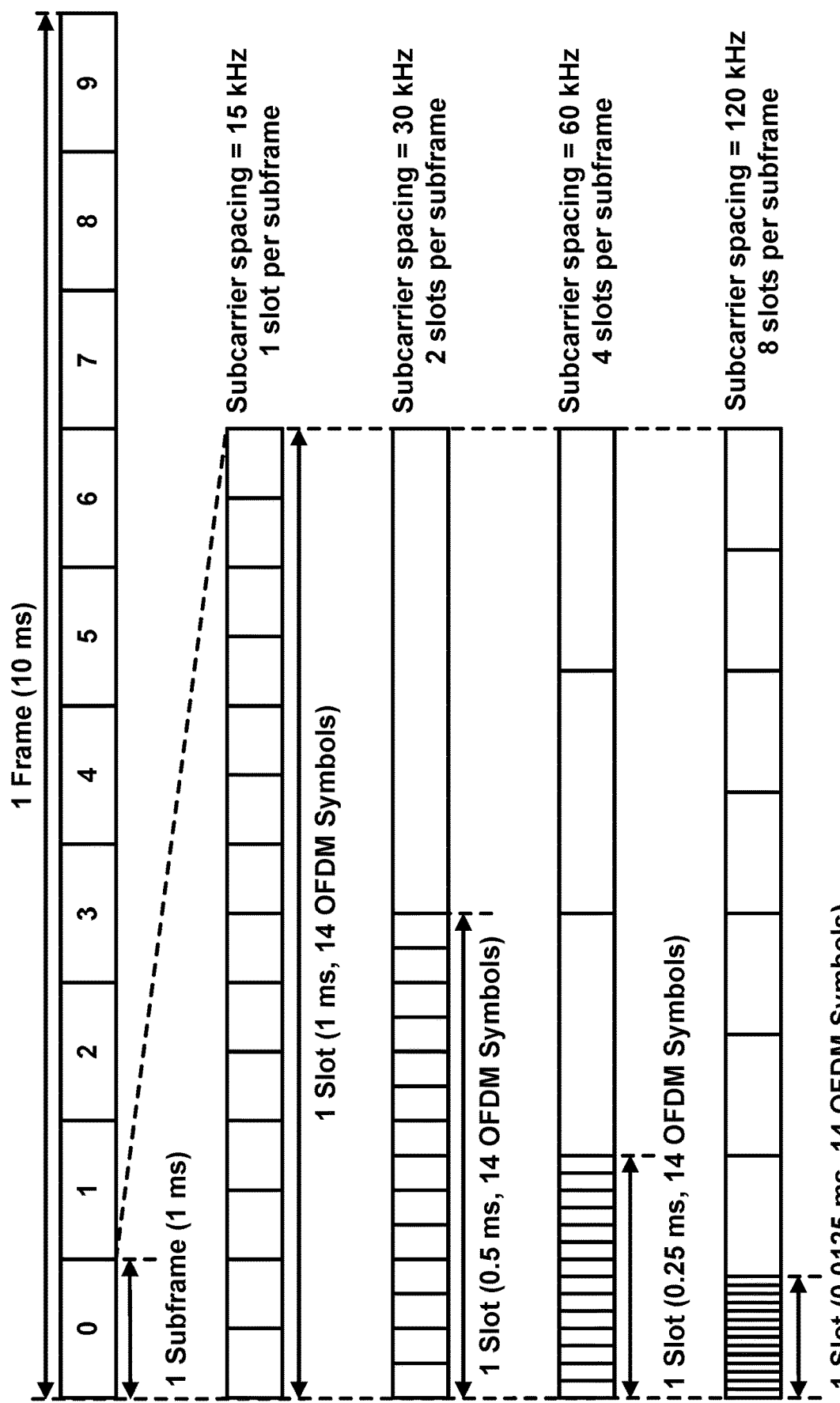
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/ cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
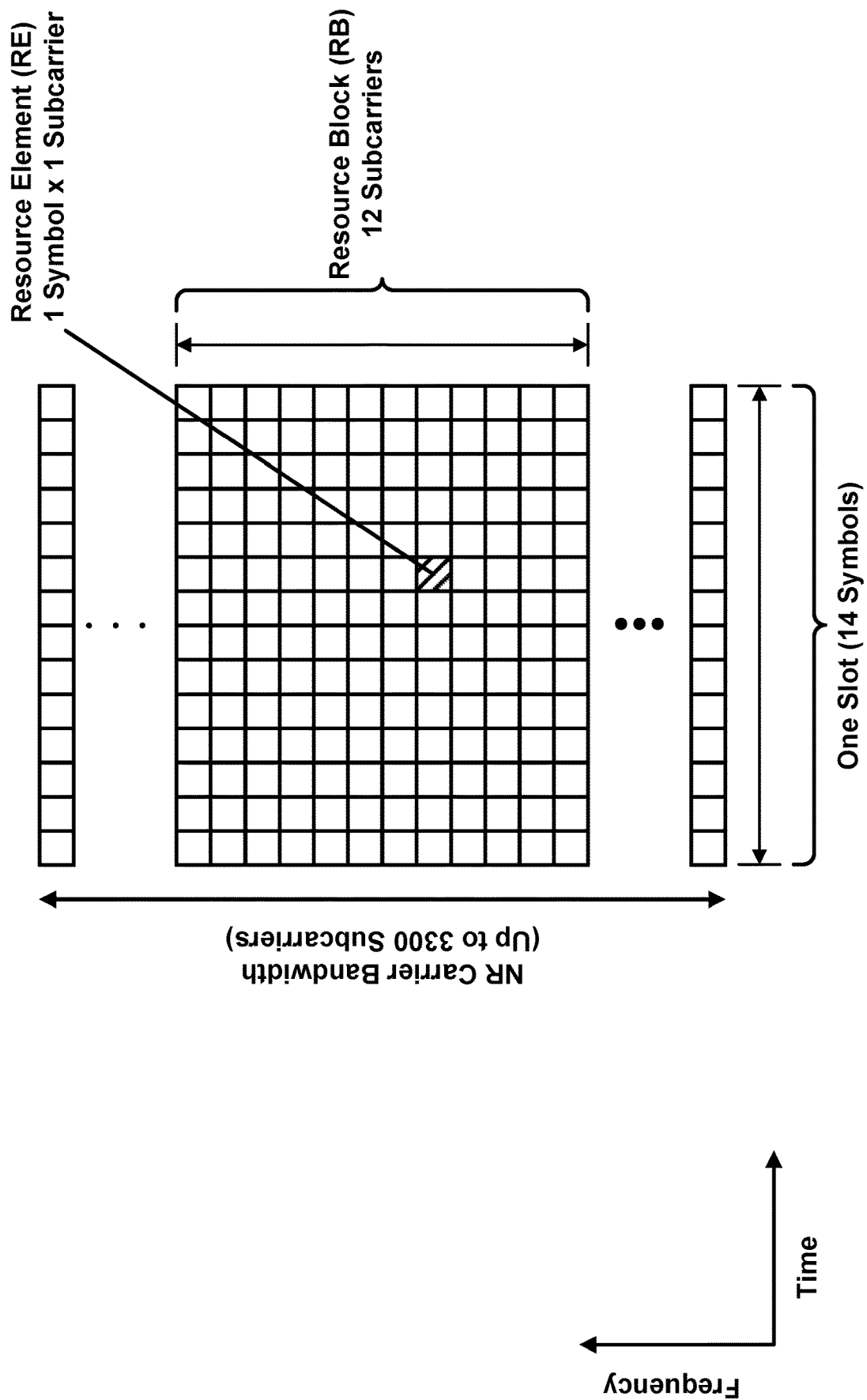
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
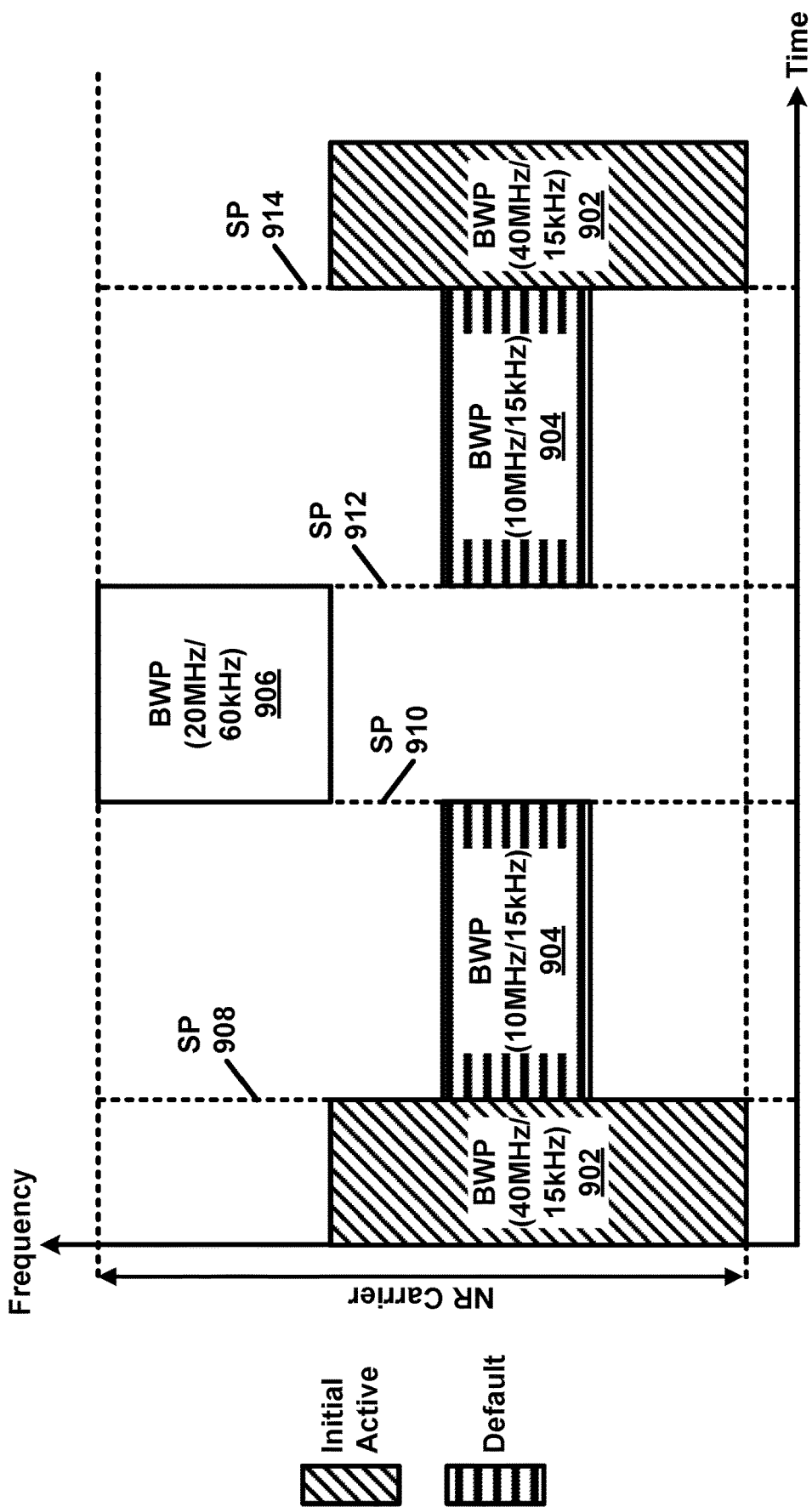
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
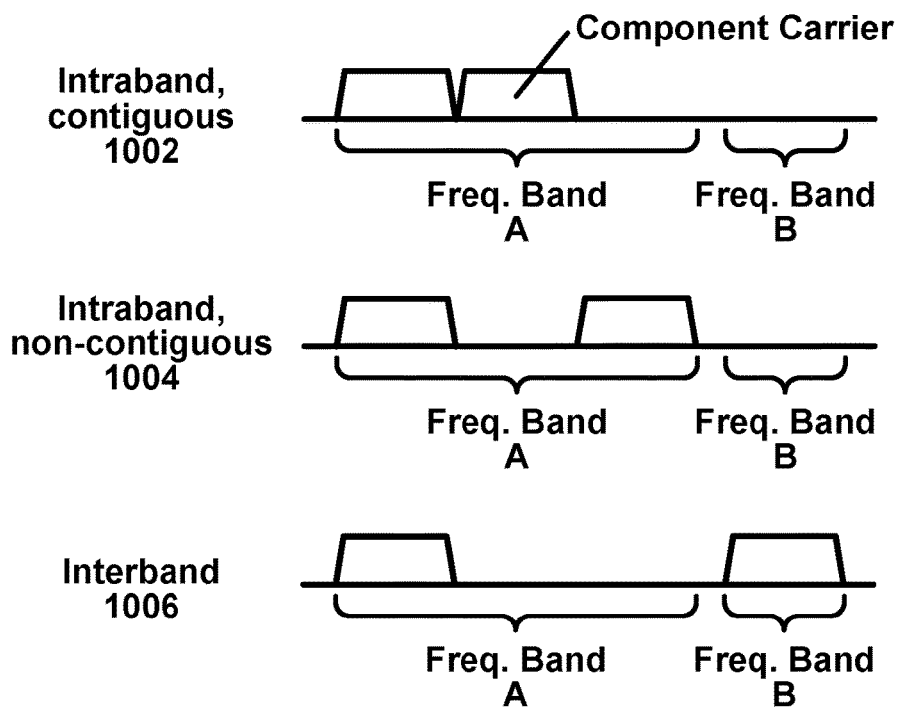
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
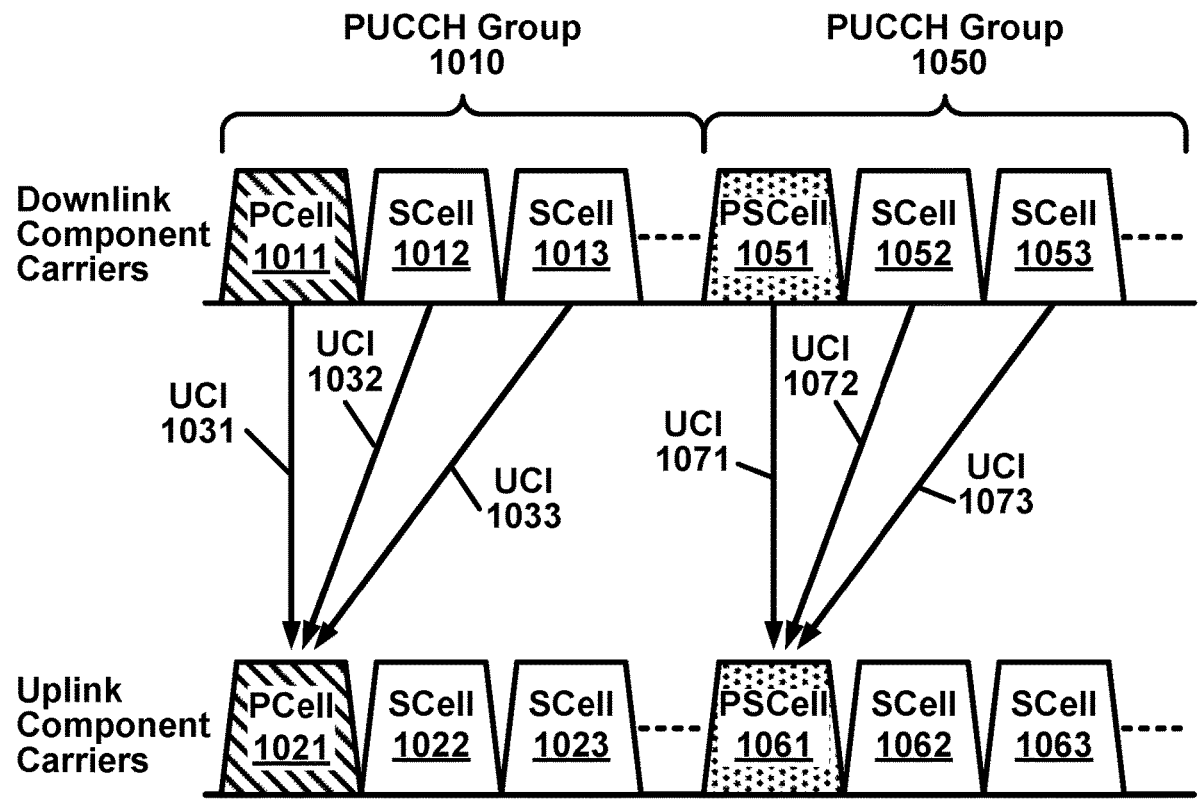
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
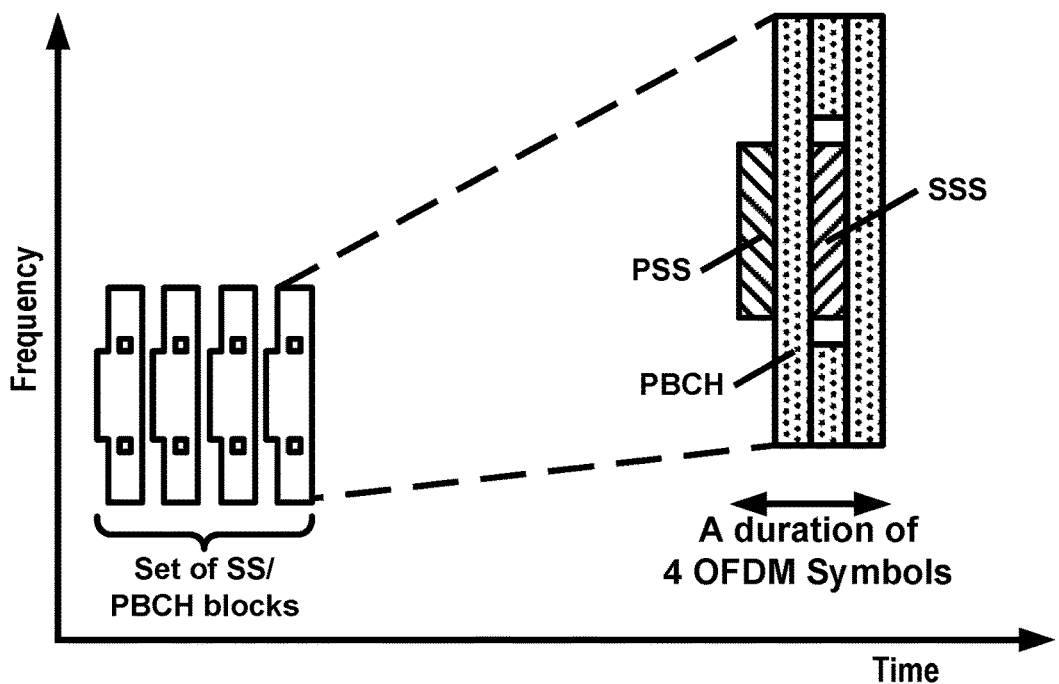
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
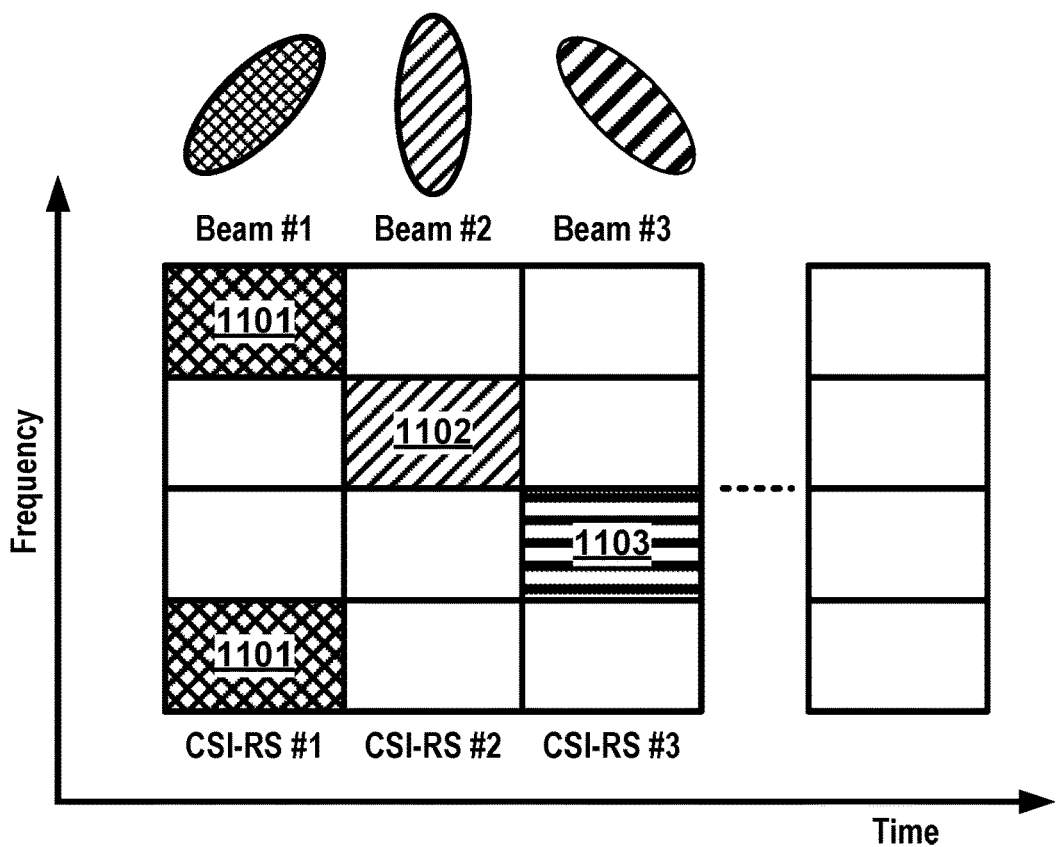
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figure 13C:
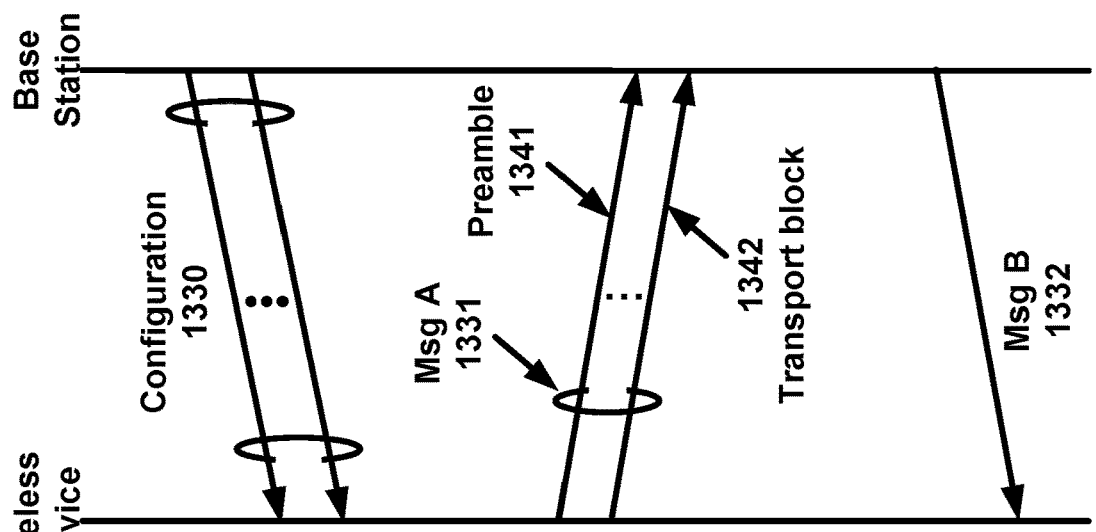
FIG. 13C shows an example two-step random access procedure.
Figure 13B:
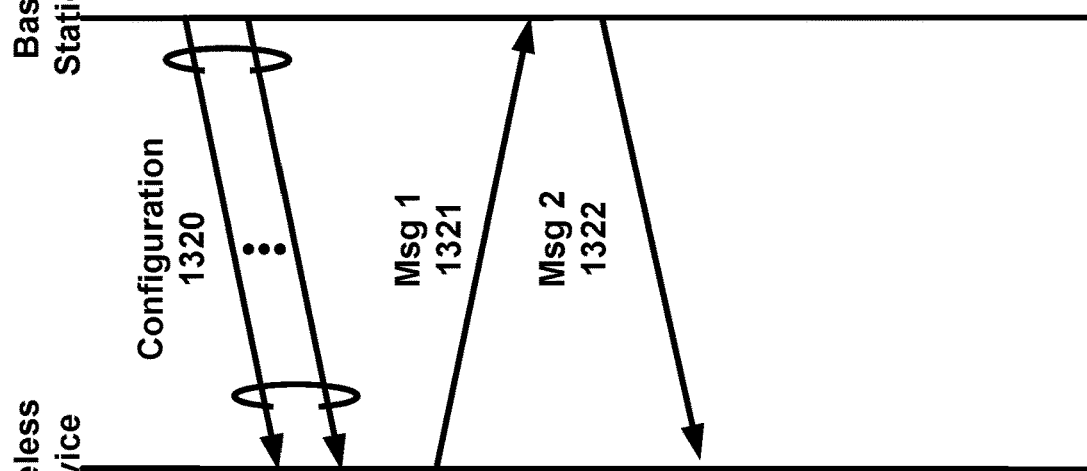
FIG. 13B shows an example two-step random access procedure.
Figure 13A:
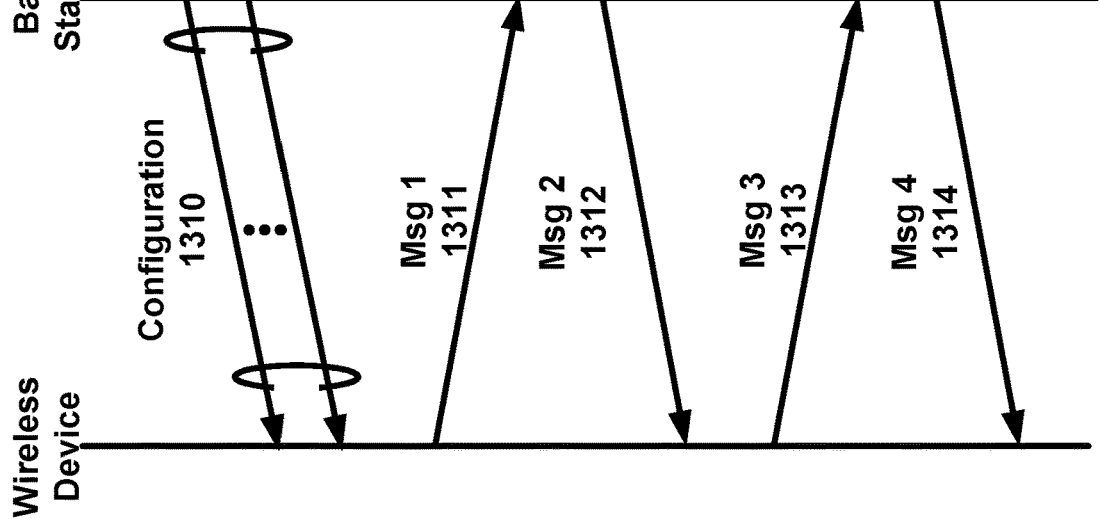
FIG. 13A shows an example four-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313).

The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$\text{RA-RNTI}=1+s\_id+14\times t\_id+14\times 80\times f\_id+14\times 80\times 8\times ul\_carrier\_id$$

where s_id may be an index of a first OFDM symbol of the PRACH occasion (e.g., $0 \le s\_id < 14$), t_id may be an index of a first slot of the PRACH occasion in a system frame (e.g., $0 \le t\_id < 80$), f_id may be an index of the PRACH occasion in the frequency domain (e.g., $0 \le f\_id < 8$), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after (e.g., based on or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
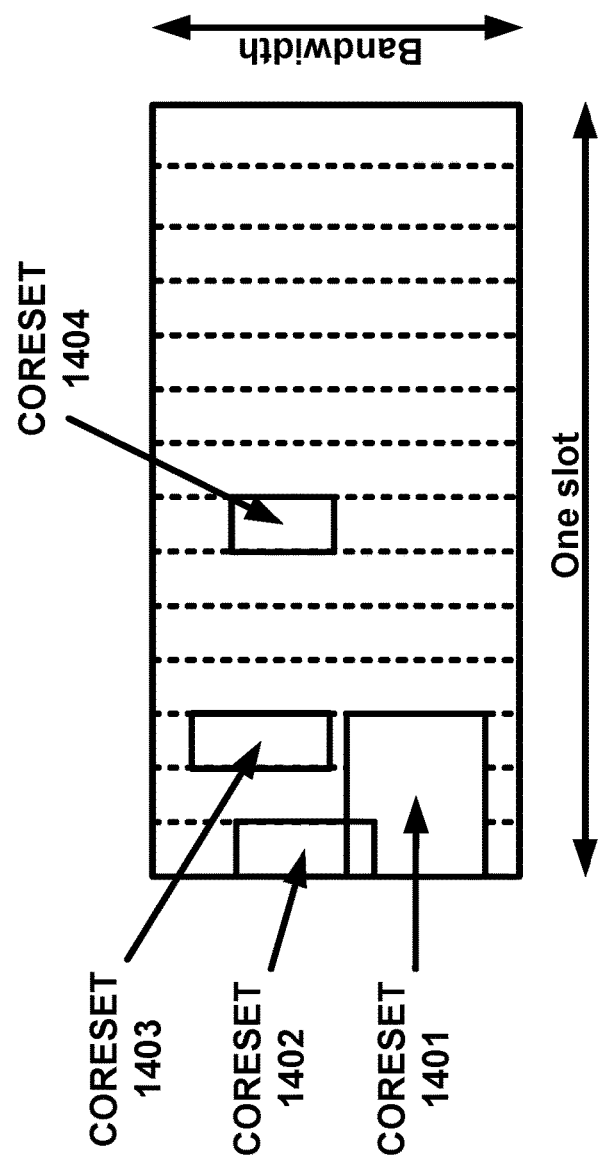
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
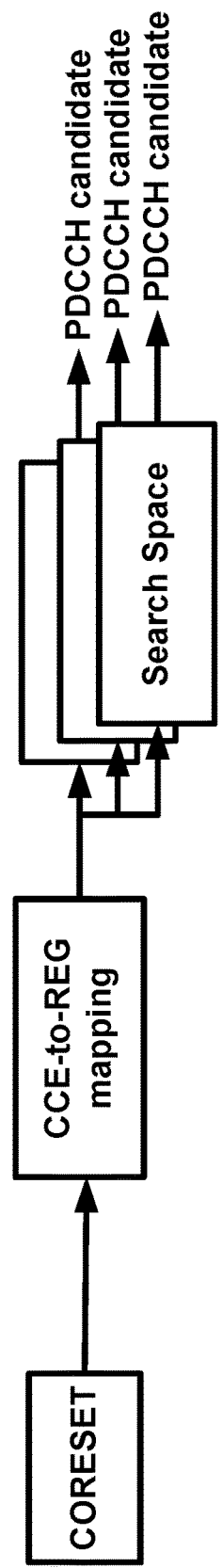
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set.

The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
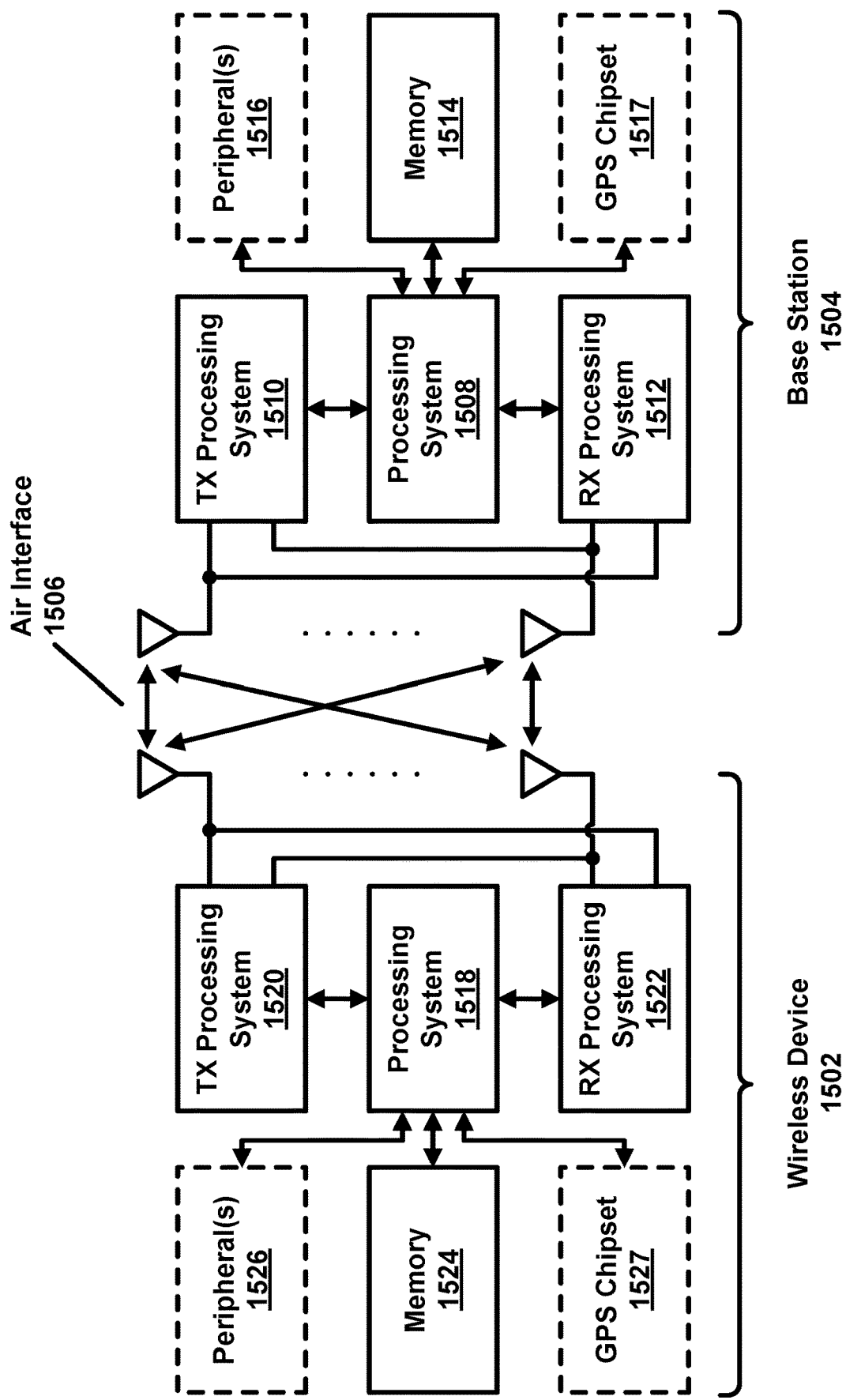
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For sending/transmision processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
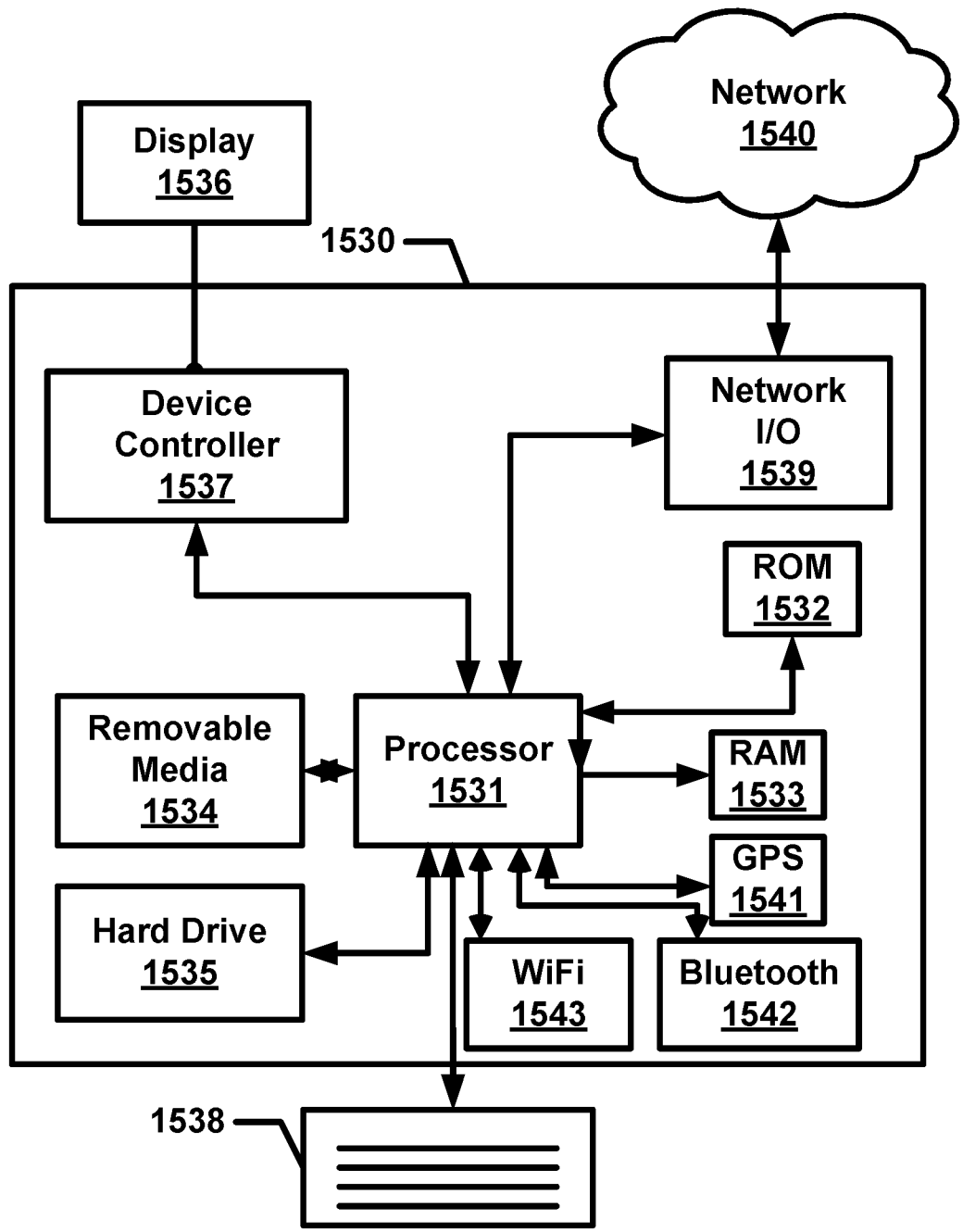
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started, and continue running until it is stopped or until it expires. A timer may be started, for example, if it is not running or restarted if it is running A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A wireless device may receive DCI from a base station. The DCI may schedule data for reception at the wireless device. The data may correspond to a PDSCH transmission (e.g., one or more TBs) from the base station. The data may correspond to any other type of transmission. The wireless device may require a time interval (e.g., DCI decoding delay) for detecting/decoding the DCI. The DCI decoding delay may be specified by a higher layer parameter (e.g., timeDurationForQCL). The DCI decoding delay may be based on a capability of the wireless device. The DCI decoding delay may correspond to a minimum quantity of OFDM symbols required by the wireless device to receive the DCI and apply spatial relation information (e.g., beam information) indicated, by the DCI, for PDSCH reception/processing. The DCI decoding delay may be indicated, by the wireless device, in at least one message to the base station.

The DCI may indicate transmission/reception of a plurality of repetitions of data (e.g., a PDSCH transmission, a TB, etc.). The plurality of repetitions may be sent via one or more TRPs, antenna panels, and/or any other device/location (e.g., associated with a base station and/or associated with a wireless device). The plurality of repetitions may improve reliability and robustness of reception of the TB. The wireless device may receive each of the plurality of repetitions via a different/respective beam (e.g., associated with a different/respective TCI state). As used herein, a beam may refer to one or more of: a spatial domain filter set, a spatial receiving filter, and/or a TCI state. A TCI state may indicate a reference signal. The reference signal indicated by the TCI state may be received, at the wireless device, via a spatial receiving beam (e.g., based on wireless device implementation). The wireless device may receive data (e.g., a PDSCH transmission) via a spatial receiving beam used for receiving a reference signal indicated by a TCI state, for example, if the TCI state is indicated to the wireless device for the data reception.

A wireless device may receive repetitions of a TB from two or more TRPs. For example, the wireless device may receive repetitions of a TB, from two TRPs, via two different corresponding receiving beams. Transmission of the repetitions of the TB from multiple TRPs and reception via multiple different receiving beams may increase reliability and robustness of transmission of the TB. The wireless device may be able to receive the TB via a first receiving beam (associated with a first TRP) of the two receiving beams, for example, even if a second receiving beam (associated with a second TRP) of the two receiving beams fails (or vice versa).

DCI may indicate different/respective beams to use for a plurality of repetitions of data (e.g., a PDSCH transmission, a TB, etc.). At least a first quantity (two, or any other quantity) of the plurality of repetitions may occur within a threshold period of time (e.g., DCI decoding delay). The wireless device may not be aware of or may not receive/decode the plurality of repetitions (or the at least first quantity of the plurality of repetitions), for example, if the at least first quantity of the plurality of repetitions occurs within the DCI decoding delay. The wireless device may not be aware of different/respective beams to apply for the plurality of repetitions (or for the at least first quantity of the plurality of repetitions), for example, if the at least first quantity of the plurality of repetitions occurs within the DCI decoding delay. The base station may schedule the plurality of repetitions of the TB, for example, after the DCI decoding delay to avoid the scenario in which the wireless device may not be aware of the different/respective receiving beams to apply. Scheduling the plurality of repetitions of the TB after the DCI decoding delay may increase the latency/delay of data communication. Increased latency/delay may be especially disadvantageous for services that require low latencies (e.g., ultra-reliable low-latency communication (URLLC) services).

The wireless device may use a default beam for reception of data (e.g., repetitions of a TB) within a threshold period of time (e.g., DCI decoding delay) following reception of DCI. Applying/using a single default beam (or TCI state) to receive a plurality of repetitions of the TB within the DCI decoding delay may be inefficient, for example, if the base station send/transmits the plurality of repetitions of the TB via different beams (e.g., at least two, or any other quantity of, default beams) and/or different TRPs. The wireless device may properly receive only some of the plurality of repetitions if the wireless device uses the single default beam, thereby reducing the benefits of TB repetition. Various examples herein describe use of multiple default beams for reception of data.

A wireless device may be unable to apply/use an appropriate beam for receiving a TB in a plurality of repetitions (or at least repetitions within the DCI decoding delay), for example, if the wireless device is not aware of a first symbol and/or a first duration of a first repetition of the plurality of repetitions. Various examples herein describe determination of the first symbol and the first duration for a first repetition of the plurality of repetitions of a TB. The wireless device may determine remaining of the plurality of the repetitions based on the first symbol and the first duration.

FIG. 17 shows an example TCI state information element (IE) for downlink beam management. A base station may configure a wireless device with one or more TCI states. The one or more TCI states may be configured by a higher layer parameter (e.g., PDSCH-Config) for a serving cell (e.g., PCell, SCell). The wireless device may detect/receive a PDCCH transmission comprising DCI for the serving cell. The DCI may indicate a TCI state (e.g., among one or more activated TCI states of the one or more TCI states). The wireless device may use the TCI state, of the one or more TCI states, to decode a PDSCH transmission scheduled by the PDCCH transmission. The DCI may be intended for the wireless device and/or for the serving cell of the wireless device.

The TCI state of the one or more TCI states may comprise/indicate one or more parameters (e.g., qcl-Type1, qcl-Type2, referenceSignal, etc.). The TCI state may be indicated (e.g., identified) by a TCI state indicator/index (e.g., tci-StateId as shown in FIG. 17). The wireless device may use the one or more parameters, indicated by the TCI state, to configure one or more quasi co-location relationships between at least one downlink reference signal (DL RS) (e.g., SS/PBCH block, CSI-RS) and DM-RS ports of the PDSCH transmission. A first quasi co-location relationship of the one or more quasi co-location relationships may be configured by a higher layer parameter (e.g., qcl-Type1) for a first DL RS (e.g., indicated by the referenceSignal in FIG. 17) of the at least one DL RS. A second quasi co-location relationship of the one or more quasi co-location relationships may be configured by a higher layer parameter (e.g., qcl-Type2) for (if configured) a second DL RS (e.g., indicated by the referenceSignal in FIG. 17) of the at least one DL RS.

At least one quasi co-location type of the at least one DL RS (e.g., the first DL RS, the second DL RS) may be provided, to the wireless device, by a higher layer parameter (e.g., qcl-Type in QCL-Info in FIG. 17). A first QCL type (e.g., QCL type A, QCL type B) of a first DL RS of at least two DL RSs and a second QCL type (e.g., QCL type C, QCL type D) of a second DL RS of the at least two DL RSs may not be the same, for example, if at least two quasi co-location relationships, comprising the first QCL type and the second QCL type, between the at least two DL RSs and DM-RS ports of a PDSCH transmission are configured. The first DL RS and the second DL RS may be the same. The first DL RS and the second DL RS may be different.

A wireless device may receive (e.g., from a base station) one or more messages. The one or more messages may comprise one or more configuration parameters. The one or more configuration parameters may comprise a first higher layer parameter (e.g., PDCCH-Config). The first higher layer parameter may comprise/indicate at least two values (e.g., 0 and 1) for/of a parameter (e.g., HigherLayerindexPerCORESET or a CORESETPoolIndex) in a second higher layer parameter (e.g., ControlResourceSet). The wireless device may receive a plurality of PDCCH transmissions scheduling PDSCH transmissions (e.g., fully overlapped, partially overlapped, or non-overlapped PDSCH transmissions in time domain and/or frequency domain) based on the first higher layer parameter comprising/indicating the at least two values. The wireless device may receive a first PDSCH transmission that is fully or partially overlapping in time and/or frequency domain with a second PDSCH transmission based on receiving a first PDCCH transmission. The wireless device may receive the first PDCCH transmission in a first CORESET. The first CORESET may correspond to a first value (e.g., of the higherLayerindexPerCORESET). The first PDCCH transmission may schedule the first PDSCH. The wireless device may receive a second PDCCH transmission in a second CORESET. The second CORESET may correspond to a second value (e.g., of the higherLayerIndexPerCORESET). The second PDCCH transmission may schedule the second PDSCH. The first value and the second value may be same or different. At least two values may comprise the first value and the second value. The first CORESET and the second CORESET may be the same or different. The plurality of PDCCH transmissions may comprise the first PDCCH transmission and the second PDCCH transmission. The PDSCH transmissions (e.g., fully overlapped, partially overlapped, or non-overlapped PDSCH transmissions) may comprise the first PDSCH transmission and the second PDSCH transmission.

Scheduling information for receiving each PDSCH transmission of fully overlapped or partially-overlapped PDSCH transmissions may be indicated and/or carried by a corresponding/respective PDCCH transmissions. The wireless device may be scheduled, for receiving each PDSCH transmission of the fully overlapped or partially-overlapped PDSCH transmissions, with a same active BWP and a same subcarrier spacing (SCS). The wireless device may be scheduled with at most two codewords (or any other quantity of codewords) simultaneously, for example, if the wireless device is scheduled with fully overlapped or partially-overlapped (e.g., in time domain and/or frequency domain) PDSCH transmissions.

The one or more configuration parameters may comprise a higher layer parameter (e.g., URLLSchemeEnabler). The higher layer parameter (e.g., URLLSchemeEnabler) may be set to (or may indicate) a transmission scheme (e.g., FDMSchemeA, FDMSchemeB, TDMSchemeA). The wireless device may receive DCI, for example, based on the higher layer parameter being set to (or indicating) the transmission scheme. The DCI may comprise a TCI field indicating at least two TCI states, for example, based on the higher layer parameter being set to (or indicating) the transmission scheme. The at least two TCI states may comprise a first TCI state and a second TCI state. The TCI field indicating the at least two TCI states may comprise that a codepoint (e.g., 000, 010, 111, 100, etc), indicated by the TCI field, indicates the at least two TCI states.

The wireless device may receive, in a single PDSCH transmission occasion, a TB based on each TCI state (e.g., of the at least two TCI states) associated with a non-overlapping frequency domain resource allocation, for example, if the TCI field indicates the at least two TCI states and the higher layer parameter (e.g., URLLSchemeEnabler) is set to (or indicates) a first transmission scheme (e.g., FDMSchemeA). The wireless device may receive the TB via each of at least two non-overlapping frequency resources in the single PDSCH transmission occasion, for example, based on corresponding TCI states of the at least two TCI states.

The wireless device may receive, in at least two PDSCH transmission occasions, a TB based on each TCI state (e.g., of the at least two TCI states) associated with a respective PDSCH transmission occasion of at least two PDSCH transmission occasions, for example, if the TCI field indicates the at least two TCI states and the higher layer parameter (e.g., URLLSchemeEnabler) is set to (or indicates) a second transmission scheme (e.g., FDMSchemeB). A first transmission occasion of the at least two PDSCH transmission occasions and a second transmission occasion of the at least two PDSCH transmission occasions may have/comprise a non-overlapping frequency domain resource allocation. The wireless device may receive the TB in each of the at least two PDSCH transmission occasions, for example, based on corresponding TCI states of the at least two TCI states.

The wireless device may receive, in at least two PDSCH transmission occasions, a TB based on each TCI state (e.g., of the at least two TCI states) associated to a respective PDSCH transmission occasion of the at least two PDSCH transmission occasions, for example, if the TCI field indicates the at least two TCI states and the higher layer parameter (e.g., URLLSchemeEnabler) is set to (or indicates) a third transmission scheme (e.g., TDMSchemeA). A first transmission occasion of the at least two PDSCH transmission occasions and a second transmission occasion of the at least two PDSCH transmission occasions may have/comprise a non-overlapping time domain resource allocation. The wireless device may receive the TB in the at least two PDSCH transmission occasions in a (same/given) slot. The (same/given) slot may comprise the at least two PDSCH transmission occasions. The wireless device may receive the TB in each of the at least two PDSCH transmission occasions, for example, based on corresponding TCI states of the at least two TCI states.

The higher layer parameter (e.g., URLLSchemeEnabler) may be set to (or may indicate) a transmission scheme (e.g., TDMSchemeA). The wireless device may determine a quantity of PDSCH transmission occasions of a TB based on a quantity of TCI states indicated by a TCI field of/in DCI scheduling the TB, for example, if the higher layer parameter is set to (or indicates) the transmission scheme (e.g., TDMSchemeA). The quantity of TCI states indicated by the TCI field may be one, two, or any other quantity. The wireless device may receive the TB in two PDSCH transmission occasions (e.g., comprising a first PDSCH transmission occasion and a second PDSCH transmission occasion), for example, if the quantity of TCI states is two. The wireless device may receive the TB in the first PDSCH transmission occasion, for example, based on a first TCI state of the TCI states indicated by the TCI field. The wireless device may receive the TB in the second PDSCH transmission occasion, for example, based on a second TCI state of the TCI states indicated by the TCI field. A first quantity of symbols (e.g., a first duration) in the first PDSCH transmission occasion and a second quantity of symbols (e.g., a second duration) in the second PDSCH transmission occasion may be the same, substantially the same, or different. The DCI may indicate the first quantity of symbols in the first PDSCH transmission occasion (e.g., via a time domain resource assignment field in the DCI). The DCI may indicate a first symbol as a starting symbol of the first PDSCH transmission occasion (e.g., via a time domain resource assignment field in the DCI). The one or more configuration parameters may indicate a value for a higher layer parameter (e.g., StartingSymbolOffsetK). The wireless device may determine a second symbol as a starting symbol of the second PDSCH transmission occasion based on the value of the higher layer parameter (e.g., StartingSymbolOffsetK) and a last symbol of the first PDSCH transmission occasion. The second symbol may start following a quantity of symbols (e.g., that may be equal to the value) from the last symbol of the first PDSCH transmission. The one or more configuration parameters may not indicate a value for a higher layer parameter (e.g., StartingSymbolOffsetK). The wireless device may determine/use a predefined value for the higher layer parameter, for example, based on the one or more configuration parameters not indicating the value for the higher layer parameter. The predefined value may be zero, one, or any other quantity.

FIG. 18A and FIG. 18B show examples of a PDSCH time domain resource allocation. A wireless device may receive, from a base station, one or more configuration parameters. The one or more configuration parameters may indicate one or more time domain resource allocations (e.g., via higher layer parameter PDSCH-TimeDomainResourceAllocation in pdsch-TimeDomainResourceAllocationList as shown in FIG. 18A). The one or more configuration parameters may comprise a higher layer parameter (e.g., PDSCH-config). The higher layer parameter (e.g., PDSCH-config) may comprise one or more higher layer parameters (e.g., pdsch-TimeDomainResourceAllocationList) comprising the one or more time domain resource allocations. The wireless device may determine/construct a PDSCH time domain resource allocation table indicating the one or more time domain resource allocations (e.g., as shown in FIG. 18B) based on the received one or more configuration parameters. The one or more time domain resource allocations may correspond to an inter-slot repetition of a PDSCH transmission.

Each time domain resource allocation of the one or more time domain resource allocations may be associated with a corresponding row index/indicator. The wireless device may receive DCI comprising a time domain resource assignment field. The time domain resource assignment field may indicate a time domain resource allocation (e.g., among the one or more time domain resource allocations). The time domain resource assignment field may comprise a row index/indicator corresponding to the time domain resource allocation. The wireless device may receive a PDSCH transmission based on the received DCI and the time domain resource allocation indicated in the time domain resource assignment field.

Each time domain resource allocation of the one or more time domain resource allocations may be associated with a corresponding value of parameter KO. KO may indicate a slot-offset between the PDSCH transmission and the received DCI. KO being equal to 0 may indicate that the PDSCH transmission is in a same time slot in which the DCI is received. KO being equal to 1 may indicate that the PDSCH transmission is in a next time slot following a time slot in which the DCI is received. The wireless device may receive the PDSCH transmission in time slot n+KO, for example, if the wireless device receives the DCI in time slot n.

Each time domain resource allocation of the one or more time domain resource allocations may be associated with a corresponding mapping type (e.g., type A, type B). Type A mapping may indicate that the DCI may be sent, by the base station earlier in a time slot (e.g., within the first 3 symbols, or any other quantity of symbols, within the time slot). Type B mapping may indicate that the DCI may be sent, by the base station later in a time slot (e.g., after the first 3 symbols, or any other quantity of symbols, within the time slot).

At least one time domain resource allocation (e.g., corresponding to row indicator/index 1 and/or row indicator/index 3 in FIG. 18B, or at least one entry in the higher layer parameter pdsch-TimeDomainResourceAllocationList) of the one or more time domain resource allocations may comprise a higher layer parameter (e.g., repetition quantity parameter, URLLCRepNum). A value of the repetition quantity parameter may indicate a quantity of a plurality of PDSCH transmission repetitions (e.g., 2, 4, 8, or any other quantity) for a corresponding time domain resource allocation. The repetition quantity parameter may indicate one of n2, n4, n8, etc. For example, n2 may correspond to 2 PDSCH transmission repetitions, n4 may correspond to 4 PDSCH transmission repetitions, n8 may correspond to 8 PDSCH transmission repetitions, etc. The quantity of PDSCH transmission repetitions may correspond to (e.g., may be equal to) a quantity of PDSCH transmission occasions. The at least one time domain resource allocation may comprise a repetition quantity parameter indicating a value greater than one (e.g., n2, n4, n8, such as shown in FIG. 18A and FIG. 18B).

The wireless device may receive DCI. The DCI may comprise a TCI field indicating at least two TCI states, for example, based on the at least one time domain resource allocation comprising the repetition quantity parameter. The at least two TCI states may comprise a first TCI state and a second TCI state. The DCI may comprise a time domain resource assignment field indicating a time domain resource allocation (e.g., among the at least one time domain resource allocation comprising the repetition quantity parameter). A value of the repetition quantity parameter, corresponding to the time domain resource allocation, may be greater than one. The DCI may schedule a TB. The wireless device may receive the TB in a plurality of PDSCH transmission occasions, for example, based on the TCI field indicating the at least two TCI states and the time domain resource assignment field indicating the time domain resource allocation. The wireless device may receive the TB in the plurality of PDSCH transmission occasions based on the at least two TCI states used across the plurality of PDSCH transmission occasions. The value of the repetition quantity parameter may indicate a quantity of the plurality of PDSCH transmission occasions (e.g., 2, 4, 8, or any other quantity). Each PDSCH transmission occasion of the plurality of PDSCH transmission occasions may be in a respective (or different) slot. A first PDSCH transmission occasion of the plurality of PDSCH transmission occasions may be (or may occur) in a first slot. A second PDSCH transmission occasion of the plurality of PDSCH transmission occasions may be (or may occur) in a second slot. The first PDSCH transmission occasion and the second PDSCH transmission occasion may be different. The first slot and the second slot may be different, for example, based on the first PDSCH transmission occasion and the second PDSCH transmission occasion being different.

Each time domain resource allocation of the one or more time domain resource allocations may be associated with a start and length indicator value (SLIV). The SLIV may indicate a start symbol and a quantity of consecutive symbols for PDSCH transmission occasion(s). The wireless device may use/apply, for reception of the TB, the SLIV indicated by the time domain resource allocation for the plurality of PDSCH transmission occasions. Each PDSCH transmission occasion of the plurality of PDSCH transmission occasions may be associated with a same SLIV. The wireless device may receive the TB in each PDSCH transmission occasion of the plurality of PDSCH transmission occasions based on a starting symbol and a length indicated by a SLIV in the time domain resource allocation.

The wireless device may receive the TB in the first PDSCH transmission occasion of the plurality of PDSCH transmission occasions based on the first TCI state. A value of the repetition quantity parameter in the time domain resource allocation may be two (e.g., n2). The wireless device may receive the TB in the second PDSCH transmission occasion of the plurality of PDSCH transmission occasions based on the second TCI state, for example, if the value of the higher layer parameter is two.

The one or more configuration parameters may comprise a higher layer parameter (e.g., RepTCIMapping, mapping parameter). The mapping parameter may be set to (or indicate) a first type of mapping (e.g., CycMapping). The mapping parameter may be set to (or indicate) a second type of mapping (e.g., SeqMapping).

The repetition quantity parameter in the time domain resource allocation may comprise any quantity. For example, a value of the repetition quantity parameter in the time domain resource allocation may be eight (e.g., n8). The plurality of PDSCH transmission occasions may comprise a first PDSCH transmission occasion, a second PDSCH transmission occasion, a third PDSCH transmission occasion, a fourth PDSCH transmission occasion, a fifth PDSCH transmission occasion, a sixth PDSCH transmission occasion, a seventh PDSCH transmission occasion, and an eight PDSCH transmission occasion. The first TCI state may be TCI 1. The second TCI state may be TCI 2.

A value of the repetition quantity parameter in the time domain resource allocation may be four (e.g., n4). The plurality of PDSCH transmission occasions may comprise a first PDSCH transmission occasion, a second PDSCH transmission occasion, a third PDSCH transmission occasion, and a fourth PDSCH transmission occasion. The first TCI state may be TCI 1. The second TCI state may be TCI 2.

A value of the repetition quantity parameter in the time domain resource allocation may be larger than two (e.g., n4, n8, etc.). The wireless device may receive the TB in the first PDSCH transmission occasion, in the third PDSCH transmission, in the fifth PDSCH transmission, and in the seventh PDSCH transmission using the first TCI state, for example, based on the mapping parameter being set to (or indicating) the first type of mapping. Additionally or alternatively, the wireless device may receive the TB in the second PDSCH transmission occasion, in the fourth PDSCH transmission occasion, in the sixth PDSCH transmission occasion, and in the eight PDSCH transmission using the second TCI state, for example, based on the mapping parameter being set to (or indicating) the first type of mapping. The wireless device may apply {TCI 1, TCI 2, TCI 1, TCI 2} for the {first PDSCH transmission occasion, second PDSCH transmission occasion, third PDSCH transmission occasion, fourth PDSCH transmission occasion}, respectively, for example, based on the mapping parameter being set to (or indicating) the first type of mapping and based on the repetition quantity parameter being set to (or indicating) n4. The wireless device may apply {TCI 1, TCI 2, TCI 1, TCI 2, TCI 1, TCI 2, TCI 1, TCI 2} for the {first PDSCH transmission occasion, second PDSCH transmission occasion, third PDSCH transmission occasion, fourth PDSCH transmission occasion, fifth PDSCH transmission occasion, sixth PDSCH transmission occasion, seventh PDSCH transmission occasion, eight PDSCH transmission occasion}, respectively, for example, based on the mapping parameter being set to (or indicating) the first type of mapping and based on the repetition quantity parameter being set to (or indicating) n8.

A value of the repetition quantity parameter in the time domain resource allocation may be larger than two (e.g., n4, n8). The wireless device may receive the TB in the first PDSCH transmission occasion, in the second PDSCH transmission, in the fifth PDSCH transmission, and in the sixth PDSCH transmission using the first TCI state, for example, based on the mapping parameter being set to (or indicating) the second type of mapping. Additionally or alternatively, the wireless device may receive the TB in the third PDSCH transmission occasion, in the fourth PDSCH transmission occasion, in the seventh PDSCH transmission occasion, and in the eight PDSCH transmission occasion using the second TCI state, for example, based on the mapping parameter being set to (or indicating) the second type of mapping. The wireless device may use/apply {TCI 1, TCI 1, TCI 2, TCI 2} for the {first PDSCH transmission occasion, second PDSCH transmission occasion, third PDSCH transmission occasion, fourth PDSCH transmission occasion}, respectively, for example, based on the mapping parameter being set to (or indicating) the second type of mapping and based on the repetition quantity parameter being set to (or indicating) n4. The wireless device may use/apply {TCI 1, TCI 1, TCI 2, TCI 2, TCI 1, TCI 1, TCI 2, TCI 2} for the {first PDSCH transmission occasion, second PDSCH transmission occasion, third PDSCH transmission occasion, fourth PDSCH transmission occasion, fifth PDSCH transmission occasion, sixth PDSCH transmission occasion, seventh PDSCH transmission occasion, eight PDSCH transmission occasion}, respectively, for example, based on the mapping parameter being set to (or indicating) the second type of mapping and based on the repetition quantity parameter being set to (or indicating) n8.

The one or more configuration parameters may not comprise a mapping parameter. The wireless device may determine that the one or more configuration parameters do not comprise the mapping parameter. The mapping parameter may be absent in the one or more configuration parameters. The wireless device may set the mapping parameter to a first type of mapping (e.g., CycMapping), for example, based on the determining that that the one or more configuration parameters do not comprise the mapping parameter. The first type of mapping may be a default type of mapping if the one or more configuration parameters do not comprise the mapping parameter. The wireless device may set the mapping parameter to a second type of mapping (e.g., SeqMapping), for example, based on the determining that that the one or more configuration parameters do not comprise the mapping parameter. The second type of mapping may be a default type of mapping if the one or more configuration parameters do not comprise the mapping parameter.

The base station may determine to send/transmit, to the wireless device, DCI scheduling a TB. The DCI may comprise a time domain resource assignment field indicating a time domain resource allocation (e.g., corresponding to row indicator/index 3 as shown in FIG. 18B), among the at least one time domain resource allocation. The time domain resource allocation may comprise the repetition quantity parameter (e.g., n4).

The base station may determine that the one or more configuration parameters comprise a mapping parameter. The base station may send/transmit the DCI, to the wireless device, comprising the time domain resource assignment field indicating the time domain resource allocation, for example, based on the determining that the one or more configuration parameters comprise the mapping parameter. The time domain resource allocation may comprise the repetition quantity parameter.

The base station may determine that the one or more configuration parameters do not comprise a mapping parameter. The base station may not send/transmit DCI to the wireless device, for example, based on the determining that the one or more configuration parameters do not comprise the mapping parameter. The base station may send/transmit, to the wireless device, one or more second messages comprising one or more second configuration parameters, for example, based on the determining that the one or more configuration parameters do not comprise the mapping parameter. The one or more second configuration parameters may comprise the mapping parameter. The base may send/transmit DCI, to the wireless device, comprising the time domain resource assignment field indicating the time domain resource allocation, for example, based on the transmitting the one or more second messages comprising the one or more second configuration parameters. The time domain resource allocation may comprise the repetition quantity parameter.

The one or more configuration parameters may comprise a mapping parameter. The base station may send/transmit DCI, to the wireless device, comprising a time domain resource assignment field indicating a time domain resource allocation, for example, based on the one or more configuration parameters comprising the mapping parameter. The time domain resource allocation may comprise the repetition quantity parameter. The DCI may schedule a TB. The at least one time domain resource allocation may comprise the time domain resource allocation.

The one or more configuration parameters may not comprise a mapping parameter. The base station may not send/transmit DCI, to the wireless device, indicating a time domain resource allocation comprising a repetition quantity parameter, for example, based on the one or more configuration parameters not comprising the mapping parameter. The base station may send/transmit DCI, to the wireless device, comprising a time domain resource assignment field indicating a time domain resource allocation. The time domain resource allocation may not comprise the repetition quantity parameter. The DCI may schedule a TB. The at least one time domain resource allocation may comprise the time domain resource allocation. The wireless device may not expect to receive/may not receive DCI indicating a time domain resource allocation comprising a repetition quantity parameter, for example, if the one or more configuration parameters do not comprise a mapping parameter.

The DCI may comprise a redundancy version (RV) field indicating a value for an RV. The wireless device may receive the TB in one or more first PDSCH transmission occasions, of the plurality of PDSCH transmission occasions, for which a first TCI state is applied/used, for example, based on the RV.

The wireless device may receive the TB with the (e.g., using or based on) the first TCI state in the first PDSCH transmission occasion (e.g., transmission occasion n=0), in the third PDSCH transmission occasion (e.g., transmission occasion n=1), in the fifth PDSCH transmission occasion (e.g., transmission occasion n=2), and in the seventh PDSCH transmission occasion (e.g., transmission occasion n=3). The RV may be equal to 0. The wireless device may use/apply RVs 0, 2, 3, and 1 in the first PDSCH transmission occasion, the third PDSCH transmission occasion, in the fifth PDSCH transmission occasion, and in the seventh PDSCH transmission occasion, respectively, for example, based on the RV being equal to 0.

The wireless device may receive the TB with the (e.g., using or based on) the first TCI state in the first PDSCH transmission occasion (e.g., transmission occasion n=0), the second PDSCH transmission occasion (e.g., transmission occasion n=1), in the fifth PDSCH transmission occasion (e.g., transmission occasion n=2) and in the sixth PDSCH transmission occasion (e.g., transmission occasion n=3). The RV may be equal to 0. The wireless device may apply use/RVs 0, 2, 3, and 1 in the first PDSCH transmission occasion, the second PDSCH transmission occasion, in the fifth PDSCH transmission occasion, and in the sixth PDSCH transmission occasion, respectively, for example, based on the RV being equal to 0.

The wireless device may receive the TB with the (e.g., using or based on) the first TCI state in the first PDSCH transmission occasion (e.g., transmission occasion n=0), the third PDSCH transmission occasion (e.g., transmission occasion n=1), in the fifth PDSCH transmission occasion (e.g., transmission occasion n=2), and in the seventh PDSCH transmission occasion (e.g., transmission occasion n=3). The RV may be equal to 2. The wireless device may use/apply RVs 2, 3, 1 and 0 in the first PDSCH transmission occasion, the third PDSCH transmission occasion, in the fifth PDSCH transmission occasion, and in the seventh PDSCH transmission occasion, respectively, for example, based on the RV being equal to 2.

The one or more configuration parameters may indicate a value for an RV offset (e.g., RVSchOffset). The wireless device may determine a second RV based on the RV indicated by the DCI and the value for the RV offset (e.g., second RV=the RV+the value for the RV offset, second RV=(the RV+the value for the RV offset) modulo 4). The wireless device may receive the TB in one or more second PDSCH transmission occasions, of the plurality of PDSCH transmission occasions, for which the second TCI state is applied/used, for example, based on the second RV.

The wireless device may receive the TB with the (e.g., using or based on) the second TCI state in the second PDSCH transmission occasion (e.g., transmission occasion n=0), the fourth PDSCH transmission occasion (e.g., transmission occasion n=1), in the sixth PDSCH transmission occasion (e.g., transmission occasion n=2), and in the eight PDSCH transmission occasion (e.g., transmission occasion n=3). The wireless device may determine the second RV as 0. The wireless device may use/apply RVs that is equal to 0, 2, 3, and 1 in the second PDSCH transmission occasion, the fourth PDSCH transmission occasion, in the sixth PDSCH transmission occasion, and in the eight PDSCH transmission occasion, respectively, for example, based on the determining the second RV as 0.

The wireless device may receive the TB with the (e.g., using or based on) the second TCI state in the third PDSCH transmission occasion (e.g., transmission occasion n=0), the fourth PDSCH transmission occasion (e.g., transmission occasion n=1), in the seventh PDSCH transmission occasion (e.g., transmission occasion n=2) and in the eight PDSCH transmission occasion (e.g., transmission occasion n=3). The wireless device may determine the second RV as 0. The wireless device may use/apply RVs 0, 2, 3, and 1 in the third PDSCH transmission occasion, the fourth PDSCH transmission occasion, in the seventh PDSCH transmission occasion, and in the eight PDSCH transmission occasion, respectively, for example, based on the determining the second RV as 0.

The wireless device may receive the TB with the (e.g., using or based on) the second TCI state in the second PDSCH transmission occasion (e.g., transmission occasion n=0), the fourth PDSCH transmission occasion (e.g., transmission occasion n=1), in the sixth PDSCH transmission occasion (e.g., transmission occasion n=2), and in the eight PDSCH transmission occasion (e.g., transmission occasion n=3). The wireless device may determine the second RV as 2. The wireless device may use/apply RVs 2, 3, 1 and 0 in the second PDSCH transmission occasion, the fourth PDSCH transmission occasion, in the sixth PDSCH transmission occasion, and in the eight PDSCH transmission occasion, respectively, for example, based on the determining the second RV as 2.

The one or more configuration parameters may not indicate a value for the RV offset (e.g., RVSchOffset). The one or more configuration parameters may not indicate the RV offset. The wireless device may receive the TB in one or more second PDSCH transmission occasions, of the plurality of PDSCH transmission occasions, for which the second TCI state is applied/used based on the indicated RV (e.g., indicated in the DCI), for example, based on the one or more configuration parameters not indicating the value for the RV offset. RV mapping for the second TCI state may be similar to RV mapping for the first TCI state.

The wireless device may receive DCI with a TCI field indicating at least two TCI states. The at least two TCI states may comprise a first TCI state and a second TCI state. The wireless device may receive a single PDSCH transmission with two different layer combinations (e.g., 2+1, 2+2, 1+2 layer(s)), for example, based on TCI field indicating the at least two TCI states. Each layer may correspond to a TCI state of the at least two TCI states. The wireless device may receive the single PDSCH transmission, for example, if the one or more configuration parameters do not comprise a higher layer parameter (e.g., URLLSchemeEnabler). The wireless device may receive the single PDSCH transmission, for example, if the higher layer parameter URLLSchemeEnabler is not set to (or does not indicate) a transmission scheme (e.g., 1-DMSchemeA, FDMSchemeB, TDMSchemeA). The wireless device may receive DCI with a time domain resource assignment field. The wireless device may receive the single PDSCH transmission, for example, if a time domain resource assignment field in the DCI does not indicate a time domain resource allocation, among the at least one time domain resource allocation, comprising a repetition quantity parameter.

Figure 19:
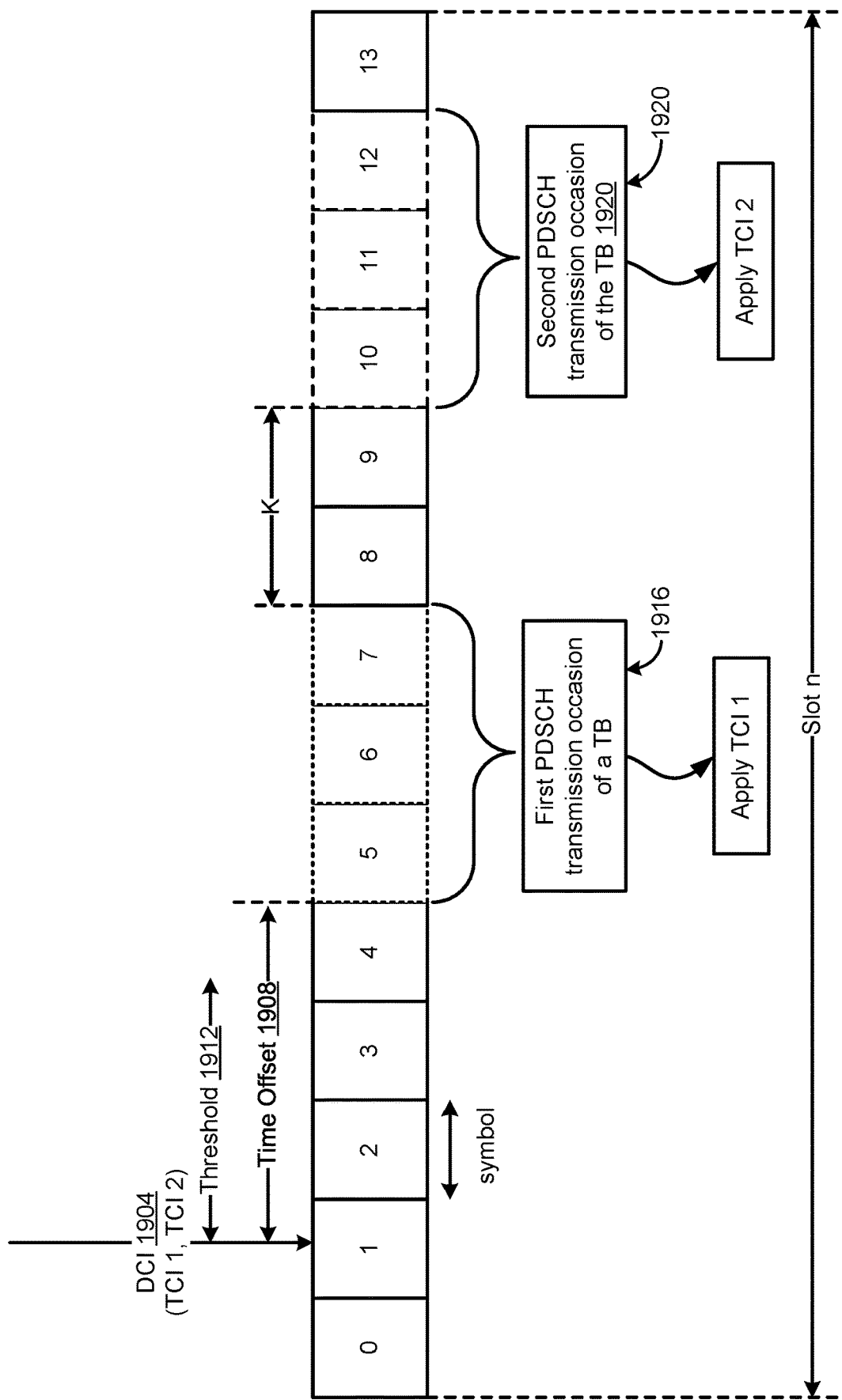
FIG. 19 shows an example of an intra-slot PDSCH transmission repetition.

FIG. 19 shows an example of intra-slot PDSCH transmission repetition. The PDSCH transmission repetition may correspond to multiple repetitions of a PDSCH transmission (e.g., a TB) in a single time slot. A time offset between receiving DCI (e.g., scheduling a TB) and receiving a first repetition of the TB (e.g., among multiple repetitions of the TB) may be greater than or equal to a threshold.

The wireless device may receive (e.g., from the base station) one or more messages. The one or more messages may comprise one or more configuration parameters. The one or more configuration parameters may be for a cell. At least one configuration parameter of the one or more configuration parameters may be for a cell. The cell may be a PCell, SCell, or an SCell configured with PUCCH (e.g., PUCCH SCell). The cell may be an unlicensed cell (e.g., operating in an unlicensed frequency band). The cell may be a licensed cell (e.g., operating in a licensed frequency band).

The cell may comprise/accommodate a plurality of BWPs. The plurality of BWPs may comprise one or more uplink BWPs comprising an uplink BWP of the cell. The plurality of BWPs may comprise one or more downlink BWPs comprising a downlink BWP of the cell.

A BWP of the plurality of BWPs may be in an active state or an inactive state. The wireless device may monitor a downlink channel/signal (e.g., PDCCH, DCI, CSI-RS, PDSCH) on/for/via a downlink BWP of the one or more downlink BWPs, for example, if the downlink BWP is in an active state. The wireless device may receive a PDSCH transmission via the downlink BWP, for example, if the downlink BWP is in the active state. The wireless device may not monitor a downlink channel/signal (e.g., PDCCH, DCI, CSI-RS, PDSCH) on/for a downlink BWP of the one or more downlink BWPs, for example, if the downlink BWP is in an inactive state. The wireless device may not receive a PDSCH transmission on/via the downlink BWP, for example, if the downlink BWP is in the inactive state.

The wireless device may send/transmit an uplink signal (e.g., PUCCH transmission, preamble, PUSCH transmission, PRACH transmission, SRS, etc.) via an uplink BWP of the one or more uplink BWPs, for example, if the uplink BWP is in an active state. The wireless device may not send/transmit an uplink signal (e.g., PUCCH transmission, preamble, PUSCH transmission, PRACH transmission, SRS, etc) via the uplink BWP, for example, if the uplink BWP is in an inactive state.

The wireless device may activate the downlink BWP of the one or more downlink BWPs of the cell. The activating the downlink BWP may comprise that the wireless device sets the downlink BWP as an active downlink BWP of the cell. The activating the downlink BWP may comprise that the wireless device sets the downlink BWP in the active state. The activating the downlink BWP may comprise switching the downlink BWP from the inactive state to the active state.

The wireless device may activate the uplink BWP of the one or more uplink BWPs of the cell. The activating the uplink BWP may comprise that the wireless device sets the uplink BWP as an active uplink BWP of the cell. The activating the uplink BWP may comprise that the wireless device sets the uplink BWP in the active state. The activating the uplink BWP may comprise switching the uplink BWP from the inactive state to the active state.

The one or more configuration parameters may be for the downlink BWP of the cell. At least one configuration parameter of the one or more configuration parameters may be for the downlink BWP of the cell. The one or more configuration parameters may be for the uplink BWP of the cell. At least one configuration parameter of the one or more configuration parameters may be for the uplink BWP of the cell.

The one or more configuration parameters may indicate a transmission scheme (e.g., for URLLC service, eMBB service, and/or any other supported services). The one or more configuration parameters indicating the transmission scheme may comprise that the one or more configuration parameters comprise a higher layer parameter (e.g., URLLSchemeEnabler) being set to (or indicating) the transmission scheme (e.g., FDMSchemeA, FDMSchemeB, TDMSchemeA). The higher layer parameter may indicate a type of repetition (e.g., TDM (or time domain)-based repetition, FDM (or frequency domain)-based repetition) for a TB associated with the supported service (e.g., URLLC service).

The wireless device may receive DCI 1904. The DCI 1904 may schedule a TB (e.g., one or more TBs). Scheduling the TB may comprise scheduling a plurality of repetitions of the TB. The TB may be for a downlink reception (e.g., via a PDSCH) at the wireless device. The wireless device may receive the TB in a slot (e.g., slot n as shown in FIG. 19) and/or in any time duration. The TB may be for an uplink reception (e.g., via a PUSCH) at the base station. The wireless device may send/transmit the TB in a slot (e.g., slot n as shown in FIG. 19) and/or in any time duration.

The wireless device may determine that a time offset 1908 between a reception of the DCI 1904 and a reception of the TB is equal to or greater than a threshold 1912 (e.g., timeDurationForQCL, DCI decoding delay). The threshold 1912 may be based on a wireless device capability. The wireless device may send/transmit/report (e.g., to the base station) the wireless device capability indicating the threshold. The time offset 1908 between the reception of the DCI 1904 and the reception of the TB may comprise a time offset between the reception of the DCI 1904 and a first PDSCH transmission occasion 1916 of the TB. The time offset 1908 between the reception of the DCI 1904 and the reception of the TB may comprise a time offset between a last symbol of the DCI 1904 (e.g., symbol 1 as shown in FIG. 19) and a first symbol of the TB (e.g., symbol 5 as shown in FIG. 19).

The DCI 1904 may comprise a TCI field. The TCI field may indicate at least two TCI states. The at least two TCI states may comprise a first TCI state (e.g., TCI 1) and a second TCI state (e.g., TCI 2). The wireless device may determine at least two PDSCH transmission occasions of/for the TB, for example, based on the one or more configuration parameters indicating the transmission scheme (e.g., TDMSchemeA) and/or the TCI field indicating the at least two TCI states. The determining the at least two PDSCH transmission occasions of/for the TB may comprise that the wireless device may receive the TB in the at least two PDSCH transmission occasions. The wireless device receiving the TB in the at least two PDSCH transmission occasions may comprise that the wireless device receives the TB (e.g., a repetition of the TB) in each of the two transmission occasions. The determining the at least two PDSCH transmission occasions of/for the TB may comprise that the base station send/transmits the TB in the at least two PDSCH transmission occasions. The at least two PDSCH transmission occasions may comprise the first PDSCH transmission occasion 1916 and a second PDSCH transmission occasion 1920.

The at least two PDSCH transmission occasions may comprise the first PDSCH transmission occasion 1916 in a slot (e.g., slot n) and the second PDSCH transmission occasion 1920 in the slot (e.g., slot n). The slot may comprise the at least two PDSCH transmission occasions. The slot may comprise the first PDSCH transmission occasion 1916 and the second PDSCH transmission occasion 1920 (e.g., in accordance with intra-slot repetition). The DCI 1904 may comprise a time domain resource assignment field. The time domain resource assignment field may indicate a first symbol (e.g., symbol 5) and a first duration (e.g., 3 symbols comprising symbols 5, 6 and 7) for the first PDSCH transmission occasion 1916. The time domain resource assignment field indicating the first symbol and the first duration may comprise that the time domain resource assignment field comprises/indicates an SLIV (e.g., as described with reference to FIG. 18B) The SLIV may indicate the first symbol and the first duration. The first symbol may be a starting symbol for the first PDSCH transmission occasion 1916. The wireless device may determine a second symbol (e.g., symbol 10) as a starting symbol for the second PDSCH transmission occasion 1920, for example, based on a last symbol of the first PDSCH transmission occasion 1916 (e.g., symbol 7) and a value of a higher layer parameter (e.g., StartingSymbolOffsetK, K as shown in FIG. 19). The one or more configuration parameters may indicate the value of K. With reference to FIG. 19, K may be equal to 2. K may have other values in other example scenarios. The wireless device may determine K to be equal to 0 (or any other preconfigured value) if the one or more configuration parameters do not comprise/indicate the value of K. A second duration (e.g., three symbols comprising symbols 10, 11 and 12) of the second PDSCH transmission occasion 1920 may be same as the first duration (e.g., three symbols comprising symbols 5, 6 and 7). The determining the time offset 1908 between the reception of the DCI 1904 and the reception of the TB being equal to or greater than the threshold 1912 may comprise determining that a time offset between the reception of the DCI 1904 (or a last symbol for the reception of the DCI 1904) and the first symbol of the first PDSCH transmission occasion 1916 of the TB is equal to or greater than the threshold.

The wireless device may receive the TB in the first PDSCH transmission occasion 1916 based on (e.g., using, applying, and/or with) the first TCI state, for example, based on the determining that the time offset 1908 between the reception of the DCI 1904 and the reception of the TB is equal to or greater than the threshold 1912. The receiving the TB based on (e.g., using, applying, and/or with) the first TCI state may comprise that at least one first DM-RS port of the TB is quasi co-located with a first reference signal (e.g., CSI-RS) indicated by the first TCI state. The first TCI state indicating the first reference signal may comprise that the first TCI state comprises a first reference signal indicator/index indicating/identifying the first reference signal. The one or more configuration parameters may indicate the first reference signal indicator/index for the first TCI state. The first TCI state may indicate a first quasi co-location type (e.g., QCL type D, QCL type A). The receiving the TB based on the first TCI state may comprise that at least one first DM-RS port of the TB is quasi co-located with the first reference signal indicated by the first TCI state with respect to the first quasi co-location type (e.g., QCL type D, QCL type A). The receiving the TB based on the first TCI state may comprise using/applying the first TCI state for a reception of the TB in the first PDSCH transmission occasion 1916.

The wireless device may receive the TB in the second PDSCH transmission occasion 1920 based on the second TCI state, for example, based on the determining that the time offset between the reception of the DCI 1904 and the reception of the TB is equal to or greater than the threshold. The receiving the TB based on the second TCI state may comprise that at least one second DM-RS port of the TB is quasi co-located with a second reference signal (e.g., CSI-RS) indicated by the second TCI state. The second TCI state indicating the second reference signal may comprise that the second TCI state comprises a second reference signal indicator/index indicating/identifying the second reference signal. The one or more configuration parameters may indicate the second reference signal indicator/index for the second TCI state. The second TCI state may indicate a second quasi co-location type (e.g., QCL type D, QCL type A). The receiving the TB based on the second TCI state may comprise that at least one second DM-RS port of the TB is quasi co-located with the second reference signal indicated by the second TCI state with respect to the second quasi co-location type (e.g., QCL type D, QCL type A). The receiving the TB based on the second TCI state may comprise using/applying the second TCI state for a reception of the TB in the second PDSCH transmission occasion 1920. The at least one first DM-RS port and the at least one second DM-RS port may be the same. The at least one first DM-RS port and the at least one second DM-RS port may be different.

A base station may send, to a wireless device, DCI scheduling a downlink transmission. The downlink transmission may comprise a TB (e.g., one or more TBs). The downlink transmission comprising the TB may comprise one or more repetitions of the TB (e.g., from one or more TRPs). The wireless device may receive/buffer the TB based on multiple receiving beams (e.g., spatial domain filter sets and/or TCI states) indicated by the DCI, for example, if a time offset between the DCI and the TB is equal to or greater than the threshold (e.g., as described with reference to FIGS. 19 and 21). The wireless device may receive/buffer the TB based on multiple default receiving beams (e.g., default spatial domain filter sets and/or default TCI states), for example, if a time offset between the DCI and the TB is less than the threshold (e.g., as described with reference to FIGS. 20 and 22). Two or more TRPs may send/transmit the TB, for example, if multi-TRP communications is supported. Repetitions of the TB may be within a single slot or may be across multiple slots. The repetitions of the TB may be sent, by the base station, via respective transmission occasions.

A time offset between DCI and one or more first transmission occasions, of multiple transmission occasions, may be less than a threshold (e.g., DCI decoding delay). A time offset between the DCI and one or more second transmission occasions, of the multiple transmission occasions, may be equal to or greater than the threshold. The wireless device may receive the TB, via the one or more first transmission occasions, based on the multiple default receiving beams; and receive the TB, via the one or more second transmission occasions, based on the multiple receiving beams indicated by the DCI. The wireless device may switch (e.g., may have to switch) receiving beams which may cause a higher complexity and/or beam switching latency at the wireless device. The wireless device may be unable to coherently combine TBs comprising: the TB received based on the multiple default receiving beams, and the TB received based on the multiple receiving beams indicated by the DCI.

A wireless device may receive a TB (e.g., one or more repetitions of the TB) via multiple transmission occasions based on multiple default receiving beams (e.g., spatial domain filter sets and/or TCI states). The wireless device may receive the TB via multiple transmission occasions based on multiple default receiving beams, for example, regardless of whether or not some transmission occasions occur after the threshold. A time offset between DCI and one or more first transmission occasions, of multiple transmission occasions, may be less than a threshold (e.g., DCI decoding latency). A time offset between the DCI and one or more second transmission occasions, of the multiple transmission occasions, may be equal to or greater than the threshold. The wireless device may receive the TB, via the one or more first transmission occasions and the one or more second transmission occasions, based on multiple default receiving beams. Using multiple default receiving beams in all transmission occasions may result in the wireless device avoiding switching receiving beams following decoding the DCI. Avoiding the switching of receiving beams may reduce beam switching latency at the wireless device, improve reception performance, and reduce wireless device complexity.

A base station and a wireless device may be misaligned with respect to beams being used for transmission/reception of a TB within a threshold (e.g., DCI decoding delay). A wireless device may receive repetitions of the TB based on at least two default receiving beams, for example, if a wireless device receives DCI scheduling the TB (e.g., for an intra-slot or inter-slot repetition) and a time offset between the DCI and the TB is less than the threshold (e.g., as described with reference to FIGS. 20 and 22). The base station may not necessarily be aligned with the default beams being used by the wireless device. For example, for a TB that is repeated in four transmission occasions (or any other quantity of transmission occasions), the wireless device may use a first default receiving beam in first and third transmission occasions and a second default receiving beam in second and fourth transmission occasions. The base station may use the second default receiving beam in the first and third transmission occasions and the first default receiving beam in the second and fourth transmission occasions. Any other quantity and/or pattern of transmission occasions may be used. Misalignment between the base station and the wireless device may result in improper decoding and/or missing reception of the TB, and/or may lead to a high error rate. The improper decoding and/or missing reception of the TB may result in retransmissions of the TB leading to an increased power consumption and/or increased uplink interference.

A base station and/or a wireless device may use a predefined beam sequence for transmission/reception in a plurality of transmission occasions. The wireless device may receive, if a time offset between DCI and a first transmission occasion of a plurality of transmission occasions is less than a threshold (e.g., DCI decoding latency): a TB based on a first default receiving beam, of at least two default receiving beams, in odd transmission occasion(s) of the plurality of transmission occasions; and based on a second default receiving beam, of the two default receiving beams, in even transmission occasion(s) of the plurality of transmission occasions. A base station may send, if a time offset between DCI and a first transmission occasion of a plurality of transmission occasions is less than a threshold (e.g., DCI decoding latency): a TB based on a first default receiving beam, of at least two default receiving beams, in odd transmission occasion(s) of the plurality of transmission occasions; and based on a second default receiving beam, of the two default receiving beams, in even transmission occasion(s) of the plurality of transmission occasions. Using predefined default receiving beams in odd transmission occasions and even transmission occasions may enable the base station and wireless device to be aligned with respect the receiving beams. Alignment of the beams may reduce transmission error rates, interference, and power consumption.

Figure 20:
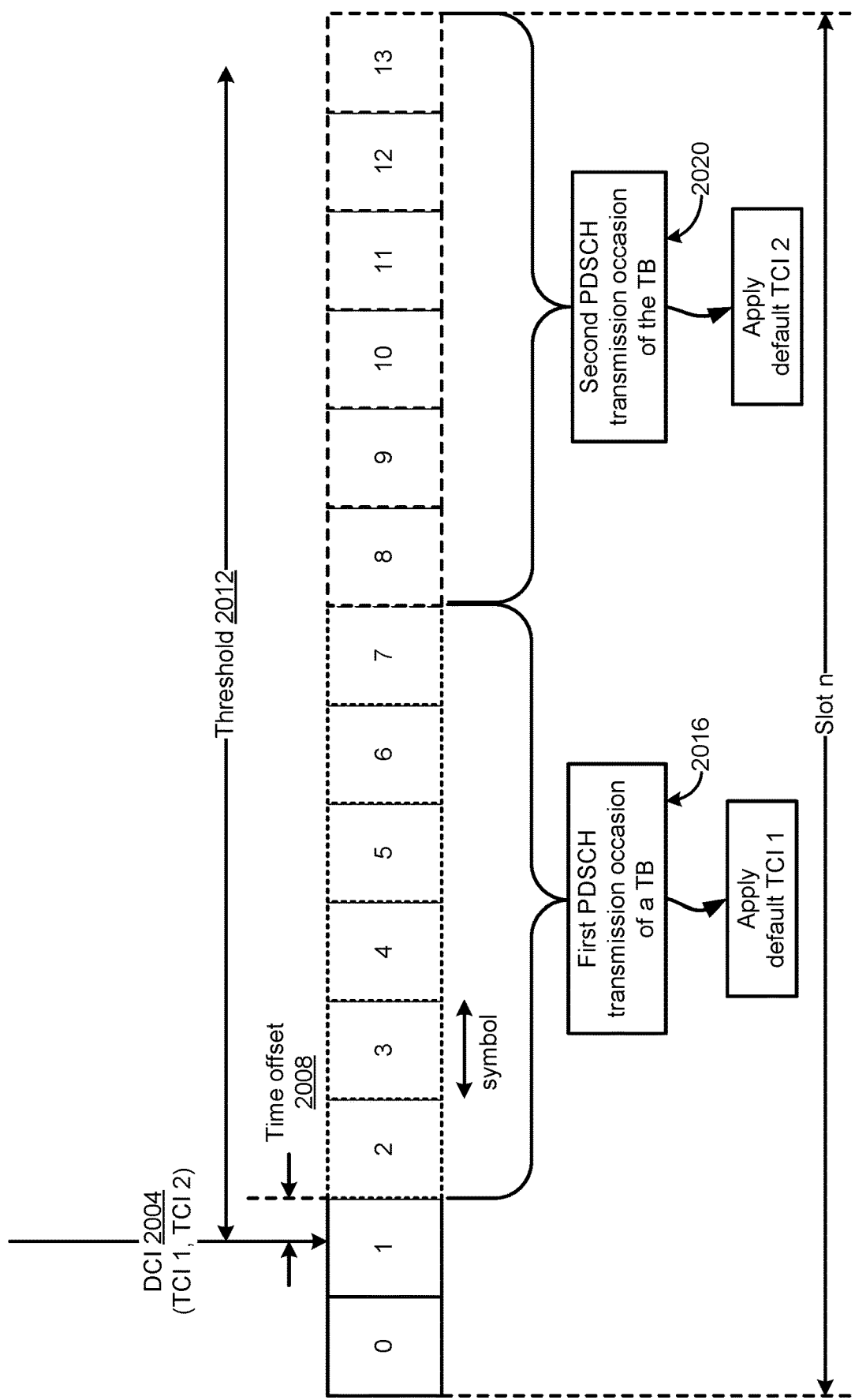
FIG. 20 shows an example of an intra-slot PDSCH transmission repetition.

FIG. 20 shows an example of intra-slot PDSCH transmission repetition. The PDSCH transmission repetition may correspond to multiple repetitions of a PDSCH transmission (e.g., a TB) in a single time slot. A time offset between receiving DCI (e.g., scheduling a TB) and receiving a first repetition of the TB (e.g., among multiple repetitions of the TB) may be less than a threshold.

The wireless device may receive (e.g., from the base station) DCI 2004. The DCI 2004 may schedule a TB. Scheduling the TB may comprise scheduling a plurality of repetitions of the TB. The TB may be for a downlink reception (e.g., via a PDSCH) at the wireless device. The wireless device may receive the TB in a slot (e.g., slot n as shown in FIG. 20). The TB may be for an uplink reception (e.g., via a PUSCH) at the base station. The wireless device may send/transmit the TB in a slot (e.g., slot n as shown in FIG. 20).

The base station may send the TB (e.g., at least some repetitions of the TB) within a threshold 2012 (e.g., timeDurationForQCL, DCI decoding delay) following sending of the DCI 2004. The wireless device and/or TB may correspond to a service that may be associated with low latency (e.g., URLLC service). The base station may not wait until the end of the threshold 2012 in order to transmit the TB.

The wireless device may determine that a time offset 2008 between a reception of the DCI 2004 and a reception of the TB is less than the threshold 2012 (e.g., timeDurationForQCL, DCI decoding delay). The determining that the time offset 2008 between the reception of the DCI 2004 and the reception of the TB is less than the threshold 2012 may comprise determining that a time offset between the reception of the DCI 2004 (or a last symbol for the reception of the DCI 2004) and the first symbol of a first PDSCH transmission occasion 2016 of the TB is less than the threshold.

The wireless device may determine at least two PDSCH transmission occasions of/for the TB. The wireless device may determine the at least two PDSCH transmission occasions of/for the TB, for example, based on the one or more configuration parameters indicating the transmission scheme (e.g., TDMSchemeA). The wireless device may determine the at least two PDSCH transmission occasions of the TB, for example, based on the one or more configuration parameters indicating the transmission scheme (e.g., TDMSchemeA) and the determining that the time offset is less than the threshold. The at least two PDSCH transmission occasions may comprise a first PDSCH transmission occasion 2016 and a second PDSCH transmission occasion 2020.

The determining the at least two PDSCH transmission occasions of/for the TB may be based on one or more conditions. For example, the determining the at least two PDSCH transmission occasions of/for the TB may be based on determining the one or more configuration parameters indicating at least one time domain resource allocation, among the one or more time domain resource allocations, comprising a repetition quantity parameter (e.g., as described with reference to FIGS. 18A and 18B). The determining the at least two PDSCH transmission occasions of/for the TB may be based on determining the one or more configuration parameters not indicating at least one time domain resource allocation, among the one or more time domain resource allocations, comprising a repetition quantity parameter.

Figure 24:
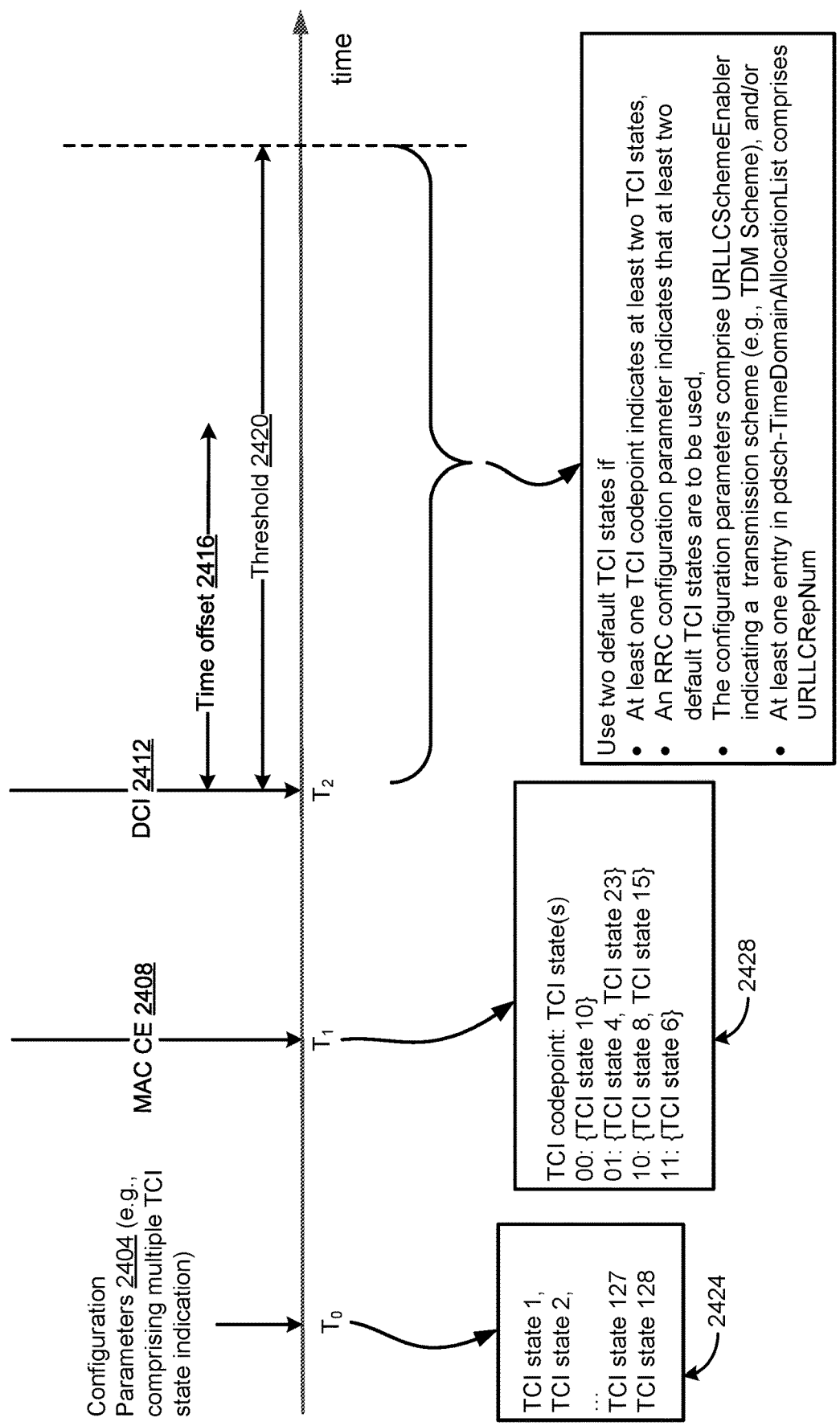
FIG. 24 shows an example of a PDSCH transmission repetition.

The determining the at least two PDSCH transmission occasions of/for the TB may be based on determining that at least one codepoint indicates at least two TCI states (as discussed further in FIG. 24). The at least one codepoint may be activated by a message from the base station (e.g., a TCI states activation/deactivation for wireless device-specific PDSCH MAC CE)

The determining the at least two PDSCH transmission occasions of/for the TB may be based on determining the one or more configuration parameters indicating a second transmission scheme (e.g., FDMSchemeA, FDMSchemeB) different from the transmission scheme. The determining the at least two PDSCH transmission occasions of/for the TB may be based on determining the one or more configuration parameters not indicating a second transmission scheme (e.g., FDMSchemeA, FDMSchemeB) different from the transmission scheme.

The determining the at least two PDSCH transmission occasions of/for the TB may be based on determining that at least one codepoint (activated by a TCI state activation/deactivation for wireless device-specific PDSCH MAC CE) does not indicate at least two TCI states (e.g., such as described with respect to FIG. 24). The determining the at least two PDSCH transmission occasions of/for the TB may be based on determining that no codepoint (activated by a TCI state activation/deactivation for wireless device-specific PDSCH MAC CE) indicates at least two TCI states (e.g., all codepoints indicate a single TCI state).

The wireless device may determine a first symbol (e.g., symbol 2), as a starting symbol, for the first PDSCH transmission occasion 2016 of the TB. The wireless device may determine the first symbol as a starting symbol for the first PDSCH transmission occasion 2016 of the TB, for example, based on determining that the time offset 2008 is less than the threshold 2012. The wireless device may determine a first duration (e.g., 6 symbols comprising symbol 2, 3, 4, 5, 6 and 7) for the first PDSCH transmission occasion 2008 of the TB, for example, based on the determining that the time offset 2008 is less than the threshold 2012. The first duration may correspond to any other quantity of symbols. The wireless device may determine a first symbol for the first PDSCH transmission occasion 2016 of the TB, for example, based on the one or more configuration parameters indicating the transmission scheme (e.g., TDMSchemeA). The wireless device may determine a first duration for the first PDSCH transmission occasion 2016 of the TB, for example, based on the one or more configuration parameters indicating the transmission scheme (e.g., TDMSchemeA). The wireless device may determine a first symbol for the first PDSCH transmission occasion 2016 of the TB based on the determining that the time offset 2008 is less than the threshold 2012 and based on the one or more configuration parameters indicating the transmission scheme. The wireless device may determine a first duration for the first PDSCH transmission occasion 2016 of the TB based on the determining that the time offset 2008 is less than the threshold 2012 and based on the one or more configuration parameters indicating the transmission scheme. The wireless device may determine a first symbol for the first PDSCH transmission occasion 2016 of the TB based on the determining the at least two PDSCH transmission occasions of/for the TB. The wireless device may determine a first duration for the first PDSCH transmission occasion 2016 of the TB based on the determining the at least two PDSCH transmission occasions of/for the TB. The first symbol may be a starting symbol for the first PDSCH transmission occasion 2016. The first duration may comprise a quantity of symbols in the first PDSCH transmission occasion.

The wireless device may determine a second symbol (e.g., symbol 8), as a starting symbol for the second PDSCH transmission occasion 2020, for example, based on a last symbol of the first PDSCH transmission occasion 2016 (e.g., symbol 7) and a value of a higher layer parameter (e.g., StartingSymbolOffsetK, K as shown in FIG. 19). The one or more configuration parameters may indicate the value of K. The wireless device may determine K to be equal to 0 (or any other value), for example, if the one or more configuration parameters do not comprise/indicate a value of K. The second symbol may be K symbols after the last symbol of the first PDSCH transmission occasion 2016. The wireless device may determine the last symbol of the first PDSCH transmission occasion 2016 based on the first symbol and the first duration. An indicator/index of the last symbol of the first PDSCH transmission occasion 2016 may be equal to a sum of an indicator/index of the first symbol and the first duration. An indicator/index of the last symbol of the first PDSCH transmission occasion 2016 may be equal to one less than a sum of an indicator/index of the first symbol and the first duration.

The wireless device may determine a second symbol as a starting symbol for the second PDSCH transmission occasion 2020, for example, based on a last symbol of the first PDSCH transmission occasion 2016 (e.g., symbol 7) and a value. The one or more configuration parameters may indicate the value (e.g., 0, 1, 2, 7, or any other value). The value may be fixed/predefined/preconfigured. The second symbol may follow the last symbol and/or may be separated from the last symbol by a quantity of symbols that is equal to the value. The second symbol may follow a symbol with an indicator/index that is equal to a sum of an indicator/index of the last symbol and the value.

The wireless device may determine a second symbol as a starting symbol for the second PDSCH transmission occasion 2020 based on a last symbol of the first PDSCH transmission occasion 2016 (e.g., symbol 7). The second symbol (e.g., symbol 8) may follow the last symbol. The second symbol may be a symbol immediately following the last symbol, or may be separated from the last symbol by one or more symbols.

The wireless device may determine a second symbol as a starting symbol for the second PDSCH transmission occasion 2020. The wireless device may determine a second symbol as a starting symbol for the second PDSCH transmission occasion 2020, for example, based on the first symbol of the first PDSCH transmission occasion 2016 (e.g., symbol 2) and a value. The one or more configuration parameters may indicate the value (e.g., 0, 1, 2, 5, 6, 7, or any other value). The value may be fixed/predefined/preconfigured. The second symbol may follow the first symbol and may be separated from the first symbol by a quantity of symbols that is equal to the value. The second symbol may follow a symbol with an indicator/index that is equal to a sum of an indicator/index of the first symbol and the value. A second duration (e.g., six symbols comprising symbols 8, 9, 10, 11, 12 and 13) of the second PDSCH transmission occasion 2020 may be the same as the first duration (e.g., six symbols comprising symbols 2, 3, 4, 5, 6 and 7) of the first PDSCH transmission occasion 2016. The first duration and the second duration. The first duration and/or the second duration may correspond to any other quantity of symbols. The second duration may be different from the first duration.

The wireless device may receive/buffer the TB in the first PDSCH transmission occasion 2016 based on a first default TCI state (e.g., default TCI 1). The wireless device may receive/buffer the TB in the first PDSCH transmission occasion 2016 based on a first default TCI state (e.g., default TCI 1), for example, based on the determining the first symbol and the first duration and/or based on the determining that the time offset 2008 is lower than the threshold 2012. The wireless device may receive/buffer the TB in the second PDSCH transmission occasion 2020 based on a second default TCI state (e.g., default TCI 2), for example, based on the determining the second symbol and the second duration and/or based on the determining that the time offset 2008 is less than the threshold 2012. The wireless device may receive/buffer a first repetition of the TB in the first PDSCH transmission occasion 2016 based on the first default TCI state, and may receive/buffer a second repetition of the TB in the second PDSCH transmission occasion 2020 based on the second default TCI state. The second PDSCH transmission occasion 2020 may be within or outside the threshold 2012.

The wireless device may determine the first PDSCH transmission occasion 2016 and the second PDSCH transmission occasion 2020 based on decoding the DCI 2004 (e.g., based on a time domain resource allocation indicated in the DCI 2004). The receiving/buffering the TB in the first PDSCH transmission occasion 2016 based on the first default TCI state may comprise: receiving/buffering PDSCH transmissions in the first PDSCH transmission occasion 2016 based on both the first default TCI state and the second default TCI state, and/or dumping buffered data corresponding to a PDSCH transmission received/buffered based on the second default TCI state in the first PDSCH transmission occasion 2016. The receiving/buffering the TB in the second PDSCH transmission occasion 2020 based on the second default TCI state may comprise: receiving/buffering PDSCH transmissions in the second PDSCH transmission occasion 2020 based on both the first default TCI state and the second default TCI state, and/or dumping buffered data corresponding to a PDSCH transmission received/buffered based on the first default TCI state in the second PDSCH transmission occasion 2020. The second PDSCH transmission occasion 2020 may be within or outside the threshold 2012.

The wireless device may determine the first default TCI state based on a TCI state of a CORESET. The one or more configuration parameters may indicate the TCI state for the CORESET. The wireless device may receive an activation command (e.g., MAC CE, TCI state indication for wireless device-specific PDCCH MAC CE) activating/indicating the TCI state for the CORESET. The CORESET may be indicated (e.g., identified) with a CORESET indicator/index that is lowest among one or more CORESET indicators/indices of one or more CORESETs (associated) with search space sets that are monitored in a latest slot. The wireless device may monitor the search space sets of the one or more CORESETs in the latest slot. The one or more CORESETs may comprise the CORESET. The (active) downlink BWP of the cell may comprise the one or more CORESETs. The one or more configuration parameters may indicate the one or more CORESET indicators/indices for the one or more CORESETs. Each CORESET indicator/index of the one or more CORESET indicators/indices may indicate/identify a respective one CORESET of the one or more CORESETs. The one or more CORESET indicators/indices may comprise the CORESET indicator/index of the CORESET. The wireless device may receive the DCI (e.g., the DCI 2004) via the CORESET.

At least one TCI codepoint of one or more TCI codepoints may comprise/indicate at least two TCI states (e.g., TCI codepoint 01 and TCI codepoint 10 as discussed with reference to FIG. 24). The wireless device may determine the second default TCI state based on a TCI codepoint among the at least one TCI codepoint. The TCI codepoint may be a lowest (or highest) TCI codepoint among TCI codepoints of the at least one TCI codepoint. The wireless device may select TCI codepoint 01, for example, based on the at least one TCI codepoint comprising TCI codepoint 01 and TCI codepoint 10 and based on TCI codepoint 01 having a lower TCI codepoint that TCI codepoint 10. The wireless device may select TCI codepoint 10, for example, based on the at least one TCI codepoint comprising TCI codepoint 01 and TCI codepoint 10 and based on TCI codepoint 01 having a lower TCI codepoint that TCI codepoint 10. The TCI codepoint may comprise/indicate a TCI state with a lowest (or highest) TCI state indicator/index among one or more TCI state indicators/indices of one or more second TCI states (e.g., TCI state 23, TCI state 15 as discussed with reference to FIG. 24) indicated by the at least one TCI codepoint. The wireless device may select TCI codepoint 01, for example, based on a first TCI state index of TCI state 23 in TCI codepoint 01 being lower (or higher) than a second TCI state index of TCI state 15 in TCI codepoint 10. The wireless device may select TCI codepoint 10, for example, based on a first TCI state index of TCI state 23 in TCI codepoint 01 being lower (or higher) than a second TCI state index of TCI state 15 in TCI codepoint 10. The second default TCI state may be a second TCI state (e.g., TCI state 23 if TCI codepoint 01 is selected, TCI state 15 if TCI codepoint 10 is selected) in the TCI codepoint. A first TCI state in the TCI codepoint may be TCI state 4 if the TCI codepoint is TCI codepoint 01. A first TCI state in the TCI codepoint may be TCI state 8 if the TCI codepoint is TCI codepoint 10.

The one or more configuration parameters may indicate the second default TCI state for the CORESET via which the DCI (e.g., the DCI 2004) is received. The wireless device may or may not monitor, for the DCI, at least one PDCCH in the CORESET based on the second default TCI state. The wireless device may or may not monitor, for the DCI, at least one PDCCH in the CORESET based on the first default TCI state.

Receiving a TB based on (e.g., using, applying, and/or with) a TCI state may comprise at least one DM-RS port of the TB is quasi co-located with a reference signal (e.g., CSI-RS) indicated by the TCI state. The TCI state indicating the reference signal may comprise that the TCI state may comprise a reference signal indicator/index indicating (e.g., identifying) the reference signal. The one or more configuration parameters may indicate the reference signal index for the TCI state. The receiving the TB based on (e.g., using, applying, and/or with) the TCI state may comprise at least one DM-RS port of the TB is quasi co-located with a reference signal indicated by the TCI state with respect to a quasi co-location type (e.g., QCL type D, QCL type A) indicated by the TCI state. The receiving the TB based on (e.g., using, applying, and/or with) the TCI state may comprise using/applying the TCI state for a reception of the TB in a PDSCH transmission occasion.

The determining the first symbol for the first PDSCH transmission occasion 2016 of the TB may be based on a last symbol that the wireless device receives the DCI 2004 scheduling the TB (e.g., symbol 1). The first symbol may follow the last symbol of the DCI 2004 and may be separated from the first symbol by a quantity of symbols. The quantity may be fixed/predefined/preconfigured (e.g., 0, 1, or any other quantity). The one or more configuration parameters may indicate the quantity. The first symbol (e.g., symbol 2) may be a first symbol starting after the last symbol (e.g., symbol 1).

The determining the first symbol for the first PDSCH transmission occasion 2016 of the TB may be based on a fixed/preconfigured/predefined value. The fixed/preconfigured/predefined value may be zero and the first symbol for the first PDSCH transmission occasion 2016 may correspond to symbol 0. The fixed/preconfigured/predefined value may be one and the first symbol for the first PDSCH transmission occasion 2016 may correspond to symbol 1. The fixed/preconfigured/predefined value may be two and the first symbol for the first PDSCH transmission occasion 2016 may correspond to symbol 2), and so on. The first symbol may be a first symbol of the slot (e.g., symbol 0). The first symbol of the first PDSCH transmission occasion 2016 may start at/from a symbol indicated by the fixed/preconfigured/predefined value. The first symbol may be symbol 0 (e.g., the first symbol of the slot), for example, based on the fixed/preconfigured/predefined value being zero. The one or more configuration parameters may indicate the fixed/preconfigured/predefined value for the first symbol.

The determining the first duration for the first PDSCH transmission occasion 2016 of the TB may be based on a fixed/preconfigured/predefined value. The fixed/preconfigured/predefined value may be seven and the first duration may be equal to seven symbols (or any other quantity of the value and corresponding quantity of symbols). The fixed/preconfigured/predefined value may be five and the first duration may be equal to five symbols. The fixed/preconfigured/predefined value may be three and the first duration may be equal to three symbols, and so on. The fixed/preconfigured/predefined value may be six and the first duration may be six symbols. The fixed/preconfigured/predefined value may be any other value. In an example, the one or more configuration parameters may indicate the fixed/preconfigured/predefined value for the first duration. The first symbol of the first PDSCH transmission occasion 2016 may be symbol 2, and the first PDSCH transmission occasion 2012 may further comprise symbol 3, symbol 4, . . . , symbol 7 as shown in FIG. 20, for example, if the fixed/preconfigured/predefined value is six.

The slot (e.g., slot n) may comprise a first half of the slot (e.g., symbol 0, symbol 1, . . . , symbol 6) and a second half of the slot (e.g., symbol 7, symbol 8, . . . , symbol 13). The first PDSCH transmission occasion 2016 may comprise the first half of the slot (e.g., symbol 0, symbol 1, . . . , symbol 6). The first PDSCH transmission occasion 2016 comprising the first half of the slot may comprise that the first PDSCH transmission occasion 2016 and the first half of the slot are the same. The first symbol of the first PDSCH transmission occasion 2016 may be a first symbol of the first half of the slot (e.g., symbol 0) and the first duration may be equal to a quantity of symbols in the first half of the slot (e.g., 7 symbols comprising symbol 0, symbol 1, . . . , symbol 6 in FIG. 20), for example, based on the first PDSCH transmission occasion 2016 comprising the first half of the slot. The quantity of symbols in the first PDSCH transmission occasion 2016 may be equal to half of a quantity of symbols in the slot (e.g., rounded down or up to an integer if the quantity of symbols in the slot is an odd number.

The second symbol of the second PDSCH transmission occasion 2020 may be a fixed/preconfigured/predefined value. The fixed/preconfigured/predefined value may be zero and the second symbol for the second PDSCH transmission occasion 2020 may correspond to symbol 0. The fixed/preconfigured/predefined value may be one and the second symbol for the second PDSCH transmission occasion 2020 may correspond to symbol 1. The fixed/preconfigured/predefined value may be two and the second symbol for the second PDSCH transmission occasion 2020 may correspond to symbol 2, and so on. The one or more configuration parameters may indicate the fixed/preconfigured/predefined value for the second symbol. The second symbol of the second PDSCH transmission occasion 2020 may start at/from a symbol indicated by the fixed/preconfigured/predefined value. The second symbol may be symbol 7 (e.g., the first symbol of the second half of the slot), for example, based on fixed/preconfigured/predefined value being zero. The second symbol may be symbol (7+x), for example, based on fixed/preconfigured/predefined value being x. The second symbol may be symbol 7 in (e.g., the seventh symbol of the slot), for example, based on fixed/preconfigured/predefined value being seven.

The second duration of the second PDSCH transmission occasion 2020 may be a fixed/preconfigured/predefined value. The one or more configuration parameters may indicate the fixed/preconfigured/predefined value for the second duration.

The wireless device may determine that the second symbol of the second PDSCH transmission occasion 2020 is a first symbol after the first half of the slot (e.g., symbol 7). The second duration of the second PDSCH transmission occasion 2020 may be seven symbols (e.g., the second PDSCH transmission occasion 2020 may comprise symbol 7, symbol 8, . . . , symbol 13). The second duration may be equal to the first duration (e.g., 7 symbols). The second PDSCH transmission occasion 2020 may comprise the second half of the slot (e.g., symbol 7, symbol 8, . . . , symbol 13). The second PDSCH transmission occasion 2020 comprising the second half of the slot may comprise that the second PDSCH transmission occasion 2020 and the second half of the slot are the same. The second symbol of the second PDSCH transmission occasion 2020 may be a first symbol in the second half of the slot (e.g., symbol 7) and the second duration may comprise a quantity of symbols in the second half of the slot (e.g., 7 symbols comprising symbol 7, symbol 8, . . . , symbol 13), for example, based on the second PDSCH transmission occasion 2020 comprising the second half of the slot. The quantity of symbols in the second PDSCH transmission occasion 2020 may be equal to half of a quantity of symbols in the slot (e.g., rounded down or up to an integer if the quantity of symbols in the slot is an odd number).

The slot may comprise one or more uplink symbols. The slot may comprise one or more flexible symbols (e.g., symbols that may be used for uplink and/or downlink). The determining the first symbol (or the second symbol) may be based on the one or more uplink symbols in the slot. The determining the first duration (or the second duration) may be based on the one or more uplink symbols in the slot. The wireless device may skip/exclude (not monitor/not receive) the TB in the one or more uplink symbols. The determining the first symbol (or the second symbol) may be based on the one or more flexible symbols in the slot. The determining the first duration (or the second duration) may be based on the one or more flexible symbols in the slot. The wireless device may skip/exclude (not monitor/not receive) the TB in the one or more flexible symbols.

Figure 21:
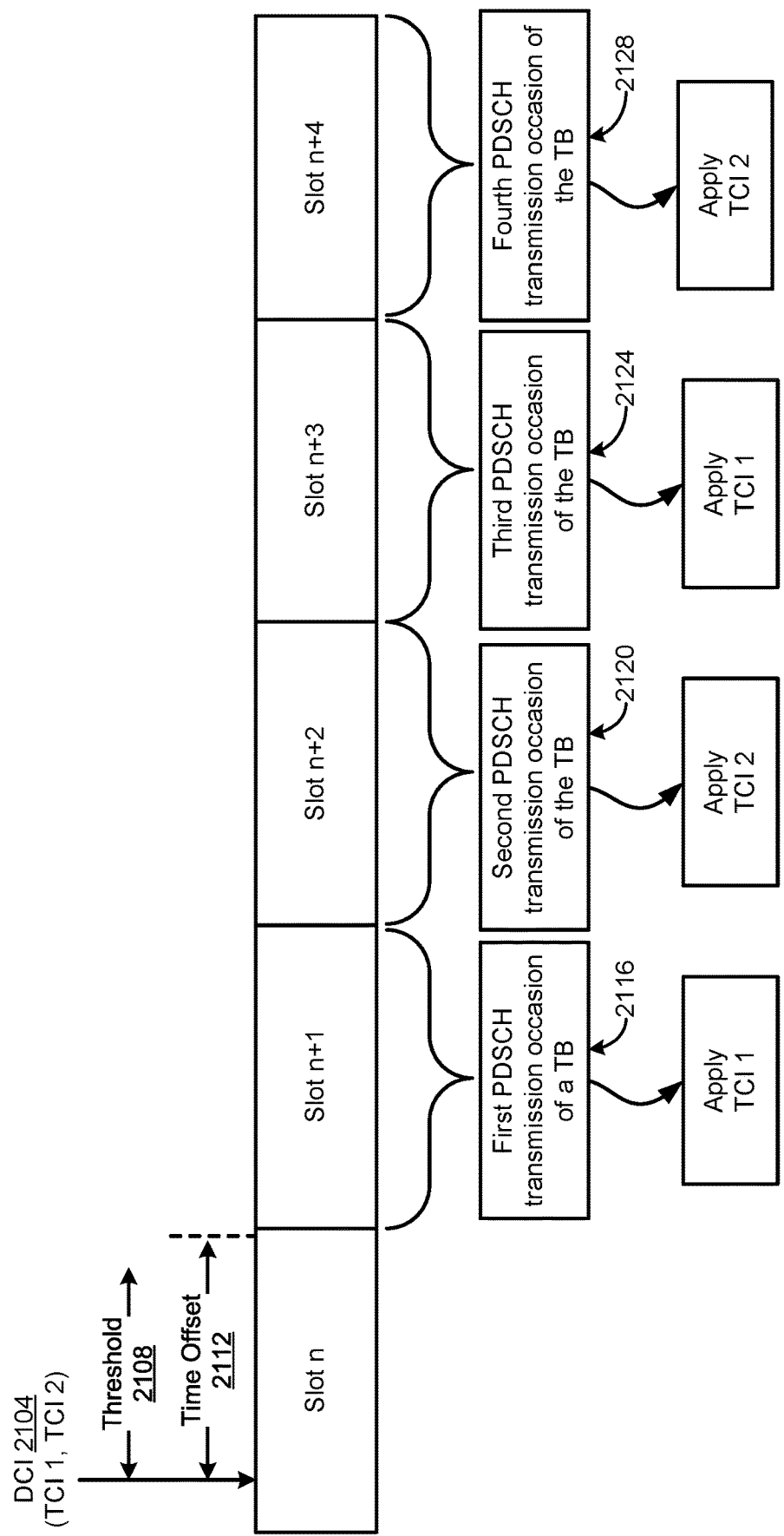
FIG. 21 shows an example of an inter-slot PDSCH transmission repetition.

FIG. 21 shows an example of inter-slot PDSCH transmission repetition in multiple slots. The PDSCH transmission repetition may correspond to multiple repetitions of a PDSCH transmission (e.g., a TB) across multiple slots. A time offset between receiving DCI (e.g., scheduling a TB) and receiving a first repetition of the TB (e.g., among multiple repetitions of the TB) may be greater than or equal to a threshold.

A wireless device may receive DCI 2104 (e.g., in slot n). The DCI 2104 may schedule a TB. Scheduling the TB may comprise scheduling a plurality of repetitions of the TB. The TB may be for a downlink reception (e.g., via a PDSCH) at the wireless device. The wireless device may receive the TB in one or more slots (e.g., slot n+1, slot n+2, slot n+3, and slot n+4). The wireless device may receive the TB in each of the one or more slots. The TB may be for an uplink reception (e.g., via a PUSCH) at a base station. The wireless device may send/transmit the TB in one or more slots (e.g., slot n+1, slot n+2, slot n+3, and slot n+4). The wireless device may send/transmit the TB in each of the one or more slots. The DCI 2104 may comprise a TCI field indicating at least two TCI states. The at least two TCI states may comprise a first TCI state (e.g., TCI 1) and a second TCI state (e.g., TCI 2).

The wireless device may receive one or more configuration parameters. The one or more configuration parameters may indicate one or more time domain resource allocations (e.g., PDSCH-TimeDomainResourceAllocation in pdsch-TimeDomainResourceAllocationList as described with reference to FIG. 18A). The one or more configuration parameters may comprise a higher layer parameter (e.g., PDSCH-config). The higher layer parameter (e.g., PDSCH-config) may comprise one or more higher layer parameters (e.g., pdsch-TimeDomainResourceAllocationList). A higher layer parameter (e.g., pdsch-TimeDomainResourceAllocationList) may comprise the one or more time domain resource allocations (e.g., corresponding to row indicator/index 1, row indicator/index 2, and row indicator/index 3 in FIG. 18B).

At least one time domain resource allocation (e.g., corresponding to row indicator/index 1 and row indicator/index 3 in FIG. 18B, or at least one entry in the higher layer parameter pdsch-TimeDomainResourceAllocationList) of the one or more time domain resource allocations may indicate a quantity of a plurality of PDSCH transmission occasions (e.g., may comprise a repetition quantity parameter). The quantity of a plurality of PDSCH transmission occasions may be greater than one (e.g., the at least one time domain resource allocation may comprise the repetition quantity parameter indicating a value greater than one, such as n2, n4, n8 as shown in FIG. 18A and FIG. 18B).

The DCI 2104 may comprise a time domain resource assignment field indicating a time domain resource allocation (e.g., corresponding to row indicator/index 3 in FIG. 18B) among the at least one time domain resource allocations. The time domain resource allocation may indicate a quantity of a plurality of PDSCH transmission occasions that is greater than one (e.g., the time domain resource allocation may comprise a repetition quantity parameter equal to n4, indicating 4 PDSCH transmission occasions).

The wireless device may determine at least two PDSCH transmission occasions of/for the TB. The wireless device may determine the at least two PDSCH transmission occasions of/for the TB, for example, based on the time domain resource assignment field indicating the time domain resource allocation comprising the repetition quantity parameter. The wireless device may determine the at least two PDSCH transmission occasions of/for the TB, for example, based on the time domain resource assignment field indicating the time domain resource allocation (e.g., comprising repetition quantity parameter) and/or the TCI field (e.g., in the DCI 2104) indicating the at least two TCI states. The determining the at least two PDSCH transmission occasions of/for the TB may comprise that the wireless device receives the TB in the at least two PDSCH transmission occasions. The receiving the TB in the at least two PDSCH transmission occasions may comprise receiving a repetition of the TB in each of the at least two PDSCH transmission occasions. The determining the at least two PDSCH transmission occasions of/for the TB may comprise that the base station sends/transmits the TB in the at least two PDSCH transmission occasions. The sending the TB in the at least two PDSCH transmission occasions may comprise sending a repetition of the TB in each of the at least two PDSCH transmission occasions. The value of the repetition quantity parameter may indicate a quantity of the at least two PDSCH transmission occasions (e.g., 2, 4, 8).

The one or more configuration parameters may comprise a higher layer parameter (e.g., RepTCIMapping, mapping parameter). The higher layer parameter (e.g., RepTCIMapping, mapping parameter) may be set to (or indicate) a first type of mapping (e.g., CycMapping).

The wireless device may determine that a time offset 2112 between a reception of the DCI 2104 and a reception of the TB is equal to or greater than a threshold 2108 (e.g., timeDurationForQCL, DCI decoding delay). The time offset 2112 may be a time offset between the reception of the DCI 2104 and a first PDSCH transmission occasion 2116 of the at least two PDSCH transmission occasions of the TB. The time offset 2112 may be a time offset between a last symbol of the DCI 2104 (e.g., symbol in slot n) and a first symbol of the TB (e.g., symbol in a lot n+1). A first PDSCH transmission occasion 2116 of the at least two PDSCH transmission occasions of the TB may comprise the first symbol. The first symbol may be a first symbol of the first PDSCH transmission occasion 2116. The at least two PDSCH transmission occasions may comprise a first PDSCH transmission occasion in a first slot of the one or more slots (e.g., slot n+1) and a second PDSCH transmission occasion 2120 in a second slot, of the one or more slots, different from the first slot (e.g., slot n+2).

The value of the repetition quantity parameter may be equal to four (e.g., n4) or any other quantity. The at least two PDSCH transmission occasions may comprise a first PDSCH transmission occasion 2116 a second PDSCH transmission occasion 2120, a third PDSCH transmission occasion 2124, and a fourth PDSCH transmission occasion 2128. The wireless device may receive the TB in the first PDSCH transmission occasion 2116 and in the third PDSCH transmission 2124 based on (or with) the first TCI state, and in the second PDSCH transmission occasion 2120 and in the fourth PDSCH transmission occasion 2128 based on (or with) the second TCI state, for example, based on the mapping parameter being set to (or indicating) the first type of mapping and/or the time offset 2112 being equal to or greater than the threshold. The wireless device may receive the TB in the first PDSCH transmission occasion 2116 and in the third PDSCH transmission 2124 based on (or with) the first TCI state; and in the second PDSCH transmission occasion 2120 and in the fourth PDSCH transmission occasion 2128 based on (or with) the second TCI state, for example, based on the time offset 2112 being equal to or greater than the threshold.

The value of the repetition quantity parameter may be equal to two (e.g., n2). The at least two PDSCH transmission occasions may comprise the first PDSCH transmission occasion 2116 and a second PDSCH transmission occasion 2120. The wireless device may receive the TB in the first PDSCH transmission occasion 2116 based on (e.g., using, applying, and/or with) the first TCI state and in the second PDSCH transmission occasion 2120 based on (e.g., using, applying, and/or with) the second TCI state, for example, based on the mapping parameter being set to (and/or indicating) the first type of mapping and/or the time offset 2112 being equal to or greater than the threshold. The wireless device may receive the TB in the first PDSCH transmission occasion 2116 based on (e.g., using, applying, and/or with) the first TCI state and in the second PDSCH transmission occasion 2120 based on (e.g., using, applying, and/or with) the second TCI state, for example, based on the time offset being equal to or greater than the threshold.

Figure 22A:
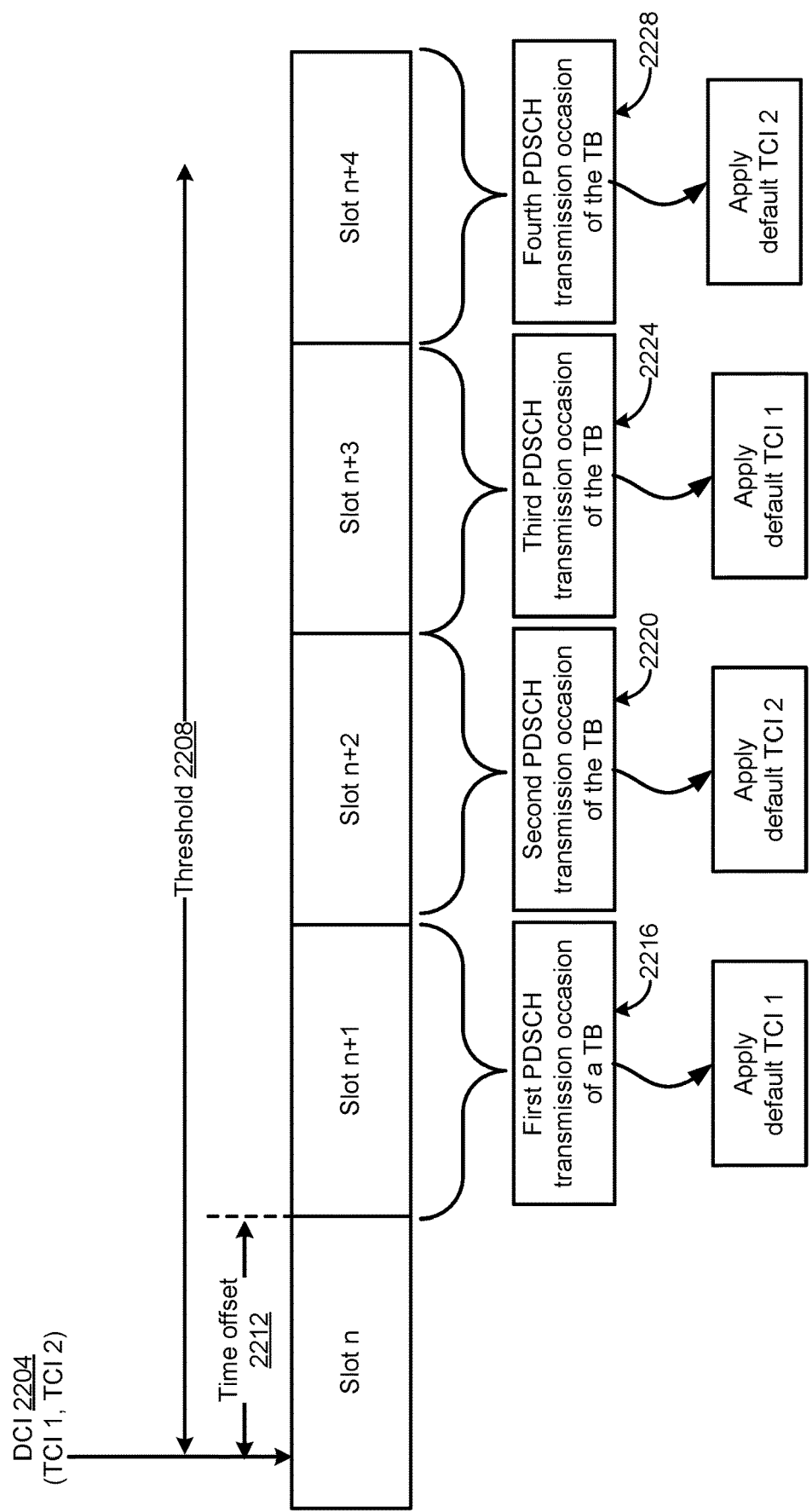
FIGS. 22A and 22B show examples of inter-slot PDSCH transmission repetition.
Figure 22B:
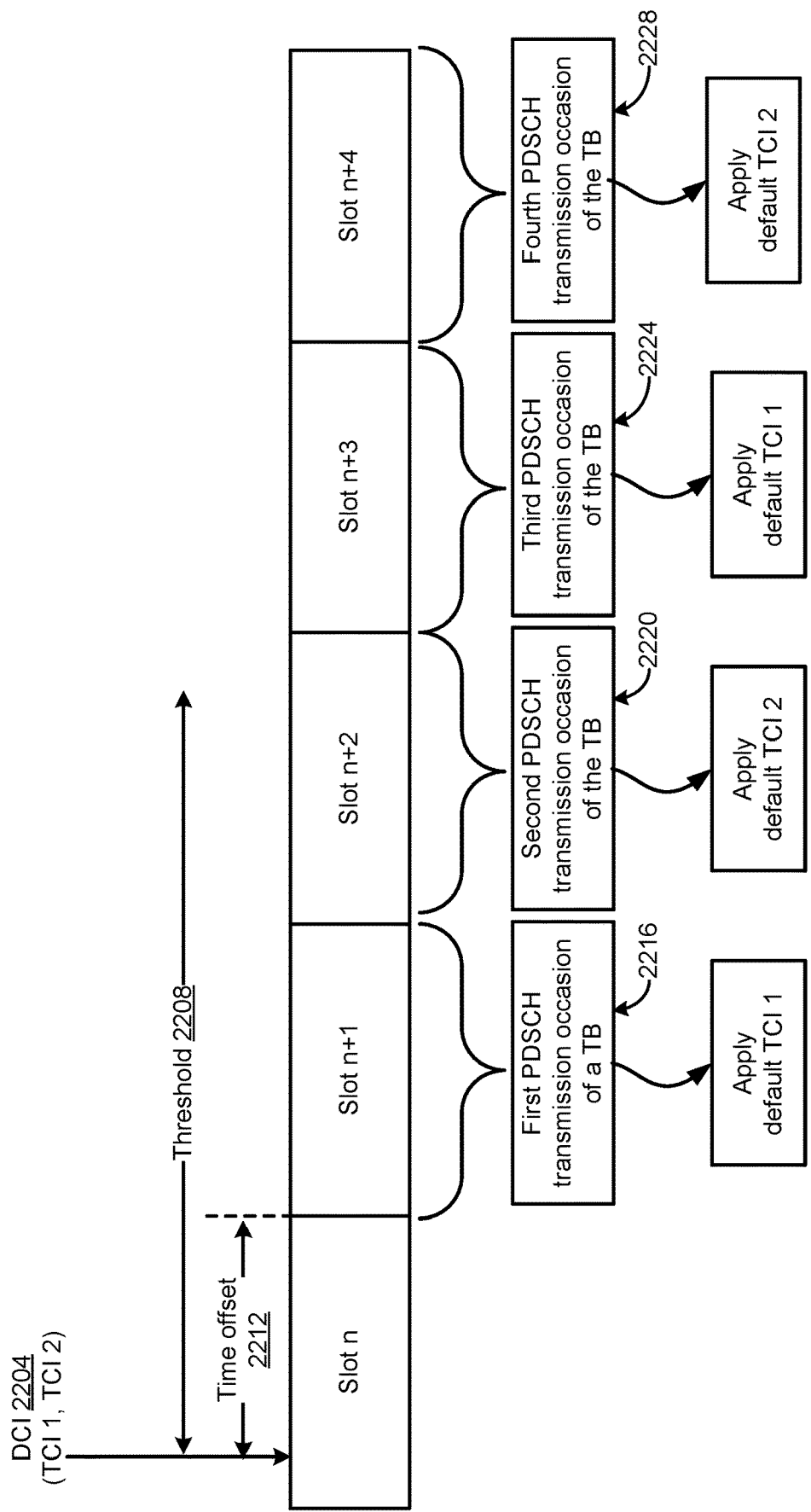

FIGS. 22A and 22B show examples of inter-slot PDSCH transmission repetition. The PDSCH transmission repetition may correspond to multiple repetitions of a PDSCH transmission (e.g., a TB) across multiple time slots. A time offset between receiving DCI (e.g., scheduling a TB) and receiving a first repetition of the TB (e.g., among multiple repetitions of the TB) may be less than a threshold.

A wireless device may receive one or more configuration parameters. The one or more configuration parameters may be similar to the one or more configuration parameters as described with reference to FIG. 21.

The wireless device may receive DCI 2204. The DCI 2204 may similar to the DCI 2104 as described with reference to FIG. 21. The wireless device may determine that a time offset 2212 between a reception of the DCI 2204 and a reception of the TB is less than a threshold 2208 (e.g., timeDurationForQCL, DCI decoding delay). The wireless device may determine the time offset 2212 in a manner similar to the time offset 2112 as described with reference to FIG. 21.

The wireless device may determine at least two PDSCH transmission occasions of/for the TB. The wireless device may determine the at least two PDSCH transmission occasions of/for the TB, for example, based on one or more time domain resource allocations (indicated by the one or more configuration parameters) comprising at least one time domain resource allocation with the repetition quantity parameter. The wireless device may determine the at least two PDSCH transmission occasions of the TB, for example, based on the one or more time domain resource allocations comprising at least one time domain resource allocation with the repetition quantity parameter and the determining that the time offset 2212 is less than the threshold 2208.

The one or more configuration parameters may indicate a transmission scheme (e.g., FDMSchemeA, FDMSchemeB, TDMSchemeA). The determining the at least two PDSCH transmission occasions of/for the TB may be based on the one or more configuration parameters indicating the transmission scheme.

The one or more configuration parameters may not indicate a transmission scheme (e.g., FDMSchemeA, FDMSchemeB, TDMSchemeA). The determining the at least two PDSCH transmission occasions of/for the TB may be based on the one or more configuration parameters not indicating transmission scheme. The determining the at least two PDSCH transmission occasions of/for the TB may be based on determining that the one or more configuration parameters do not indicate a second transmission scheme (e.g., TDMSchemeA, FDMSchemeA, FDMSchemeB) different from the transmission scheme.

The determining the at least two PDSCH transmission occasions of/for the TB may be based on determining that at least one codepoint (activated by a TCI states activation/deactivation for wireless device-specific PDSCH MAC CE) indicates at least two TCI states (as discussed further with reference to FIG. 24). The determining the at least two PDSCH transmission occasions of/for the TB may be based on determining the one or more configuration parameters indicating a second transmission scheme (e.g., FDMSchemeA, FDMSchemeB) different from the transmission scheme.

The determining the at least two PDSCH transmission occasions of/for the TB may be based on determining that at least one codepoint (activated by a TCI state activation/deactivation for wireless device-specific PDSCH MAC CE) does not indicate at least two TCI states (as further discussed further in FIG. 24). The determining the at least two PDSCH transmission occasions of/for the TB may be based on determining that no codepoint (activated by a TCI state activation/deactivation for wireless device-specific PDSCH MAC CE) indicates at least two TCI states (e.g., all codepoints indicate a single TCI state).

With reference to FIG. 22A, the at least two PDSCH transmission occasions may occur, in time, between the reception of the DCI 2204 and an end of the threshold 2208. The at least two PDSCH transmission occasions may comprise a slot at which the threshold 2208 ends. The at least two PDSCH transmission occasions may comprise the first PDSCH transmission occasion 2216 (e.g., slot n+1), the second PDSCH transmission occasion 2220 (e.g., slot n+2), the third PDSCH transmission occasion 2224 (e.g., slot n+3), and the fourth PDSCH transmission occasion 2228 (e.g., slot n+4).

With reference to FIG. 22B, the at least two PDSCH transmission occasions may comprise a first set of the at least two PDSCH transmission occasions and a second set of the at least two PDSCH transmission occasions. The first set of the at least two PDSCH transmission occasions may occur, in time, between the reception of the DCI 2204 and an end of the threshold 2208. The first set of the at least two PDSCH transmission occasions may comprise a slot at which the threshold 2208 ends. The first set of the at least two PDSCH transmission occasions may comprise the first PDSCH transmission occasion 2216 (e.g., slot n+1) and the second PDSCH transmission occasion 2220 (e.g., slot n+2). The second set of the at least two PDSCH transmission occasions may occur, in time, after the end of the threshold 2208. The second set of the at least two PDSCH transmission occasions may comprise the third PDSCH transmission occasion 2224 (e.g., slot n+3) and the fourth PDSCH transmission occasion 2228 (e.g., slot n+4).

The at least two PDSCH transmission occasions may comprise a first PDSCH transmission occasion 2216, a second PDSCH transmission occasion 2220, a third PDSCH transmission occasion 2224, and a fourth PDSCH transmission occasion 2228. The wireless device may receive the TB in the first PDSCH transmission occasion 2216 and in the third PDSCH transmission 2224 based on (or with) a first default TCI state; and in the second PDSCH transmission occasion 2220 and in the fourth PDSCH transmission occasion 2228 based on (e.g., using, applying, and/or with) a second default TCI state, for example, based on the mapping parameter being set to (and/or indicating) the first type of mapping and/or the time offset 2212 being lower than the threshold 2208. The wireless device may receive the TB in the first PDSCH transmission occasion 2216 and in the third PDSCH transmission 2224 based on (e.g., using and/or with) a first default TCI state; and in the second PDSCH transmission occasion 2220 and in the fourth PDSCH transmission occasion 2228 based on (e.g., using, applying, and/or with) a second default TCI state, for example, based on the time offset 2212 being less than the threshold 2208.

The wireless device may receive the TB in the first PDSCH transmission occasion 2216 and in the third PDSCH transmission 2224 based on (e.g., using, applying, and/or with) the second default TCI state, for example, based on the mapping parameter being set to (and/or indicating) the first type of mapping and/or the time offset 2212 being less than the threshold 2208. The wireless device may receive the TB in the second PDSCH transmission occasion 2220 and in the fourth PDSCH transmission occasion 2228 based on (e.g., using, applying, and/or with) the first default TCI state, for example, based on the mapping parameter being set to (and/or indicating) the first type of mapping and/or the time offset 2212 being less than the threshold 2208. The wireless device may receive the TB in the first PDSCH transmission occasion 2216 and in the third PDSCH transmission 2224 based on (e.g., using, applying, and/or with) the second default TCI state, for example, based on the time offset 2212 being less than the threshold 2208. The wireless device may receive the TB in the second PDSCH transmission occasion 2220 and in the fourth PDSCH transmission occasion 2228 based on (e.g., using, applying, and/or with) the first default TCI state, for example, based on the time offset 2212 being less than the threshold 2208.

The wireless device may use the first default TCI state and the second default TCI state to receive the TB in the first PDSCH transmission occasion 2216, the second PDSCH transmission occasion 2220, the third PDSCH transmission 2224, and the fourth PDSCH transmission occasion 2228 regardless of whether or not one or more of PDSCH transmission occasions 2216, 2220, 2224, and 2228 occur after the threshold 2208. The receiving the TB in the at least two PDSCH transmission occasions may comprise receiving a repetition of the TB in each of the at least PDSCH transmission occasions. The first default TCI state and the second default TCI state may be determined in a manner similar to as described with reference to FIG. 20.

The wireless device may determine a quantity of the at least two PDSCH transmission occasions based on a maximum (and/or a minimum) value of a repetition quantity parameter among values of repetition quantity parameters of the at least one at least one time domain resource allocation. With reference to FIG. 18B, for example, the wireless device may determine the quantity as four (e.g., n4) based on n4 of row indicator/index 3 being greater than n2 of row indicator/ index 1. For example, the wireless device may determine the number as two (e.g., n2) based on n4 of row indicator/index 3 being greater than n2 of row indicator/index 1.

The wireless device may determine a quantity of the at least two PDSCH transmission occasions based on a quantity of slots between a reception of the DCI 2204 and an end of the threshold 2208. The end of the threshold may comprise a last slot within which the threshold 2208 ends (e.g., slot n+4). With reference to FIG. 22A, the wireless device may determine that there are four slots between a reception of the DCI 2204 and an end of the threshold 2208. The wireless device may determine that the quantity of at least two PDSCH transmission occasions is equal to four, for example, based on determining that there are four slots between a reception of the DCI 2204 and an end of the threshold 2208.

The at least two PDSCH transmission occasions may comprise a first PDSCH transmission occasion 2216 and a second PDSCH transmission occasion 2220. The wireless device may receive the TB in the first PDSCH transmission occasion 2216 based on (e.g., using, applying, and/or with) a first default TCI state, and in the second PDSCH transmission occasion 2220 based on (e.g., using, applying, and/or with) a second default TCI state, for example, based on the mapping parameter being set to (or indicating) the first type of mapping and/or the time offset being less than the threshold. The wireless device may receive the TB in the first PDSCH transmission occasion 2216 based on (e.g., using, applying, and/or with) a first default TCI state, and in the second PDSCH transmission occasion 2220 based on (e.g., using, applying, and/or with) a second default TCI state, for example, based on the time offset being less than the threshold.

A base station may determine to send/transmit, to the wireless device, DCI scheduling a TB. The DCI may comprise a time domain resource assignment field indicating a time domain resource allocation (e.g., corresponding to row indicator/index 3 in FIG. 18B), among the at least one time domain resource allocation, comprising a repetition quantity parameter. The base station may send/transmit the DCI scheduling the TB such that a time offset between a reception of the DCI and a reception of the TB (e.g., by the wireless device) is equal to or greater than a threshold (e.g., timeDurationForQCL, DCI decoding delay).

The base station may determine to send/transmit, to the wireless device, DCI scheduling a TB. The DCI may comprise a time domain resource assignment field indicating a time domain resource allocation (e.g., corresponding to row indicator/index 2 in FIG. 18B), among the one or more time domain resource allocations, not comprising a repetition quantity parameter. The at least one time domain resource allocation may not comprise the time domain resource allocation.

The base station may send/transmit the DCI scheduling the TB, for example, based on the determining to transmit the DCI indicating the time domain resource allocation not comprising the repetition quantity parameter. A time offset between a reception of the DCI and a reception of the TB (e.g., by the wireless device) may or may not be equal to or greater than a threshold (e.g., timeDurationForQCL, DCI decoding delay).

The one or more configuration parameters may indicate the transmission scheme (e.g., TDMSchemeA). The base station may determine to send/transmit, to the wireless device, DCI scheduling a TB. The DCI may comprise a TCI field indicating at least two TCI states. The at least two TCI states may comprise a first TCI state and a second TCI state.

The base station may transmit the DCI scheduling the TB such that a time offset between a reception of the DCI and a reception of the TB (e.g., by the wireless device) is equal to or greater than a threshold (e.g., timeDurationForQCL, DCI decoding delay), for example, based on the one or more configuration parameters indicating the transmission scheme (e.g., TDMSchemeA). The base station may transmit the DCI scheduling the TB such that a time offset between a reception of the DCI and a reception of the TB (e.g., by the wireless device), is equal to or greater than a threshold (e.g., timeDurationForQCL, DCI decoding delay), for example, based on the TCI field indicating the at least two TCI states. The base station may send/transmit the DCI scheduling the TB such that a time offset between a reception of the DCI and a reception of the TB (e.g., by the wireless device) is equal to or greater than a threshold (e.g., timeDurationForQCL), for example, based on the one or more configuration parameters indicating the transmission scheme (e.g., TDMSchemeA) and/or the TCI field indicating the at least two TCI states.

The one or more configuration parameters may indicate a second transmission scheme (e.g., TDMSchemeA, FDMSchemeB) different from the transmission scheme. The base station may determine to send/transmit, to the wireless device, DCI scheduling a TB. The DCI may comprise a TCI field indicating at least two TCI states. The at least two TCI states may comprise a first TCI state and a second TCI state.

The base station may send/transmit the DCI scheduling the TB, for example, based on the one or more configuration parameters indicating the second transmission scheme different from the transmission scheme. A time offset between a reception of the DCI and a reception of the TB (e.g., by the wireless device) may or may not be equal to or greater than a threshold (e.g., timeDurationForQCL, DCI decoding delay). The base station may send/transmit the DCI scheduling the TB, for example, based on the one or more configuration parameters indicating the second transmission scheme different from the transmission scheme and/or the TCI field indicating the at least two TCI states. A time offset between a reception of the DCI and a reception of the TB (e.g., by the wireless device) may or may not be equal to or greater than a threshold (e.g., timeDurationForQCL, DCI decoding delay).

Figure 23:
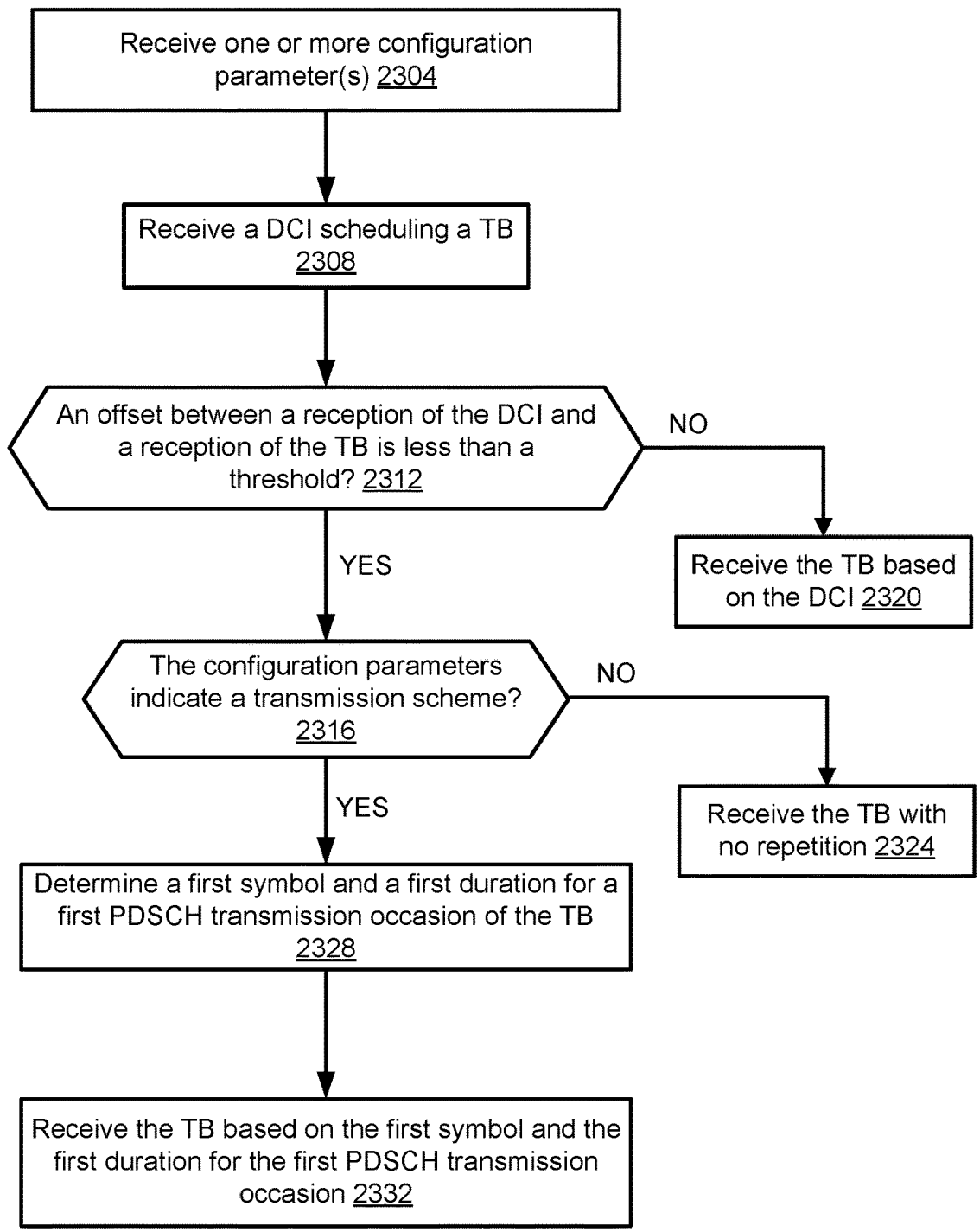
FIG. 23 shows an example method for receiving repeated PDSCH transmissions.

FIG. 23 shows an example method for a PDSCH transmission repetition. A wireless device may perform the example method 2300 of FIG. 23. At step 2304, the wireless device may receive one or more messages comprising one or more configuration parameters. The one or more configuration parameters may indicate a transmission scheme for a service (e.g., a URLLC service, or any other service).

At step 2308, the wireless device may receive DCI scheduling a TB. At step 2320, the wireless device may receive a TB based on the DCI, for example, based on determining (e.g., at step 2312) that an offset between the reception of the DCI and the reception of the TB is greater than or equal to a threshold. The wireless device may receive the TB based on beam(s) and/or transmission occasion(s) indicated by the DCI. At step 2316, the wireless device may determine whether the configuration parameters indicate a transmission scheme (e.g., FDMSchemeA, FDMSchemeB, TDMSchemeA), for example, based on determining (e.g., at step 2312) that an offset between the reception of the DCI and the reception of the TB is less than a threshold. At step 2324, the wireless device may determine that the TB is not repeated and receive the TB, for example, if the configuration parameters do not indicate a transmission scheme.

At step 2328, the wireless device may determine a first symbol and a first duration for a first PDSCH transmission occasion of the TB, for example, based on the offset between a reception of the DCI and a reception of the TB being less than a threshold, and/or based on the one or more configuration parameters indicating the transmission scheme. At step 2332, the wireless device may receive the TB (e.g., a first repetition of the TB) based on the first symbol and the first duration in the first PDSCH transmission occasion. The wireless device may determine a second symbol and a second duration for a second PDSCH transmission occasion of the TB based on the first symbol and/or the first duration. The wireless device may receive the TB (e.g., a second repetition of the TB) based on the second symbol and the second duration in the second PDSCH transmission occasion.

A wireless device may use multiple default receiving beams for receiving data (e.g., TB, repetitions of a TB) within a threshold period of time (e.g., DCI decoding delay) following reception of DCI (e.g., as described with reference to FIGS. 20 and 22). Each default receiving beam may correspond to a TRP of multiple TRPs sending the data. For example, the wireless device may use multiple default receiving beams (e.g., multiple spatial domain transmission filters and/or multiple default TCI states) to receive the data if the time offset between DCI (e.g., scheduling the data) and the receiving of the data is less than a threshold (e.g., DCI decoding delay). Using multiple default receiving beams may increase complexity and power consumption at the wireless device. Each default receiving beam may be associated with one of the antenna panels at the wireless device. The wireless device may have to activate multiple antenna panels to be able to use multiple default receiving beams. Activating multiple antenna panels may increase power consumption at the wireless device. The base station may not schedule any data within the DCI decoding delay, for example, if the data is not associated with urgent transmissions (e.g., URLLC services). The wireless device may need not buffer data, for example, if the base station may not schedule any data within the DCI decoding delay. Receiving/buffering data received via multiple antenna panels within the DCI decoding delay (e.g., even if the base station may not schedule any data within the DCI decoding delay) may result in inefficiencies at the wireless device.

Various examples herein describe an enhanced procedure for determining default beam(s) to be used for data reception. The enhanced procedure may be used to determine whether to apply/use a single default beam or multiple default beams for receiving/buffering data (e.g., TB, a plurality of repetitions of a TB), for example, if at least some of the data is received within a threshold period of time following reception of DCI (e.g., DCI decoding delay). The wireless device may determine whether to apply/use a single default beam or multiple default beams based on configuration parameter(s) sent/transmitted by the base station. The wireless device may determine whether to apply/use a single default beam or multiple default beams based on TCI states (or TCI codepoints) activated by a MAC CE (e.g., sent/transmitted by the base station). A base station may configure a parameter (e.g., an RRC parameter) for the wireless device. The wireless device may use the parameter to determine whether to receive the data via a single default receiving beam or multiple default receiving beams. The wireless device may receive the data via multiple default receiving beams, for example, if the parameter is configured. The wireless device may receive data via a single default receiving beam, for example, if the parameter is not configured. The enhanced procedures described herein may enable the base station to advantageously control a quantity of default receiving beams and/or reduce power consumption at the wireless device.

FIG. 24 shows an example of PDSCH transmission repetition. A wireless device may receive one or more messages (e.g., at or after time T0). The wireless device may receive the one or more messages from a base station. The one or more messages may comprise one or more configuration parameters 2404. The one or more configuration parameters 2404 may indicate one or more TCI states 2424 (e.g., TCI state 1, TCI state 2, . . . , TCI state 128) for (decoding) PDSCH transmission(s) of/for the cell. The one or more configuration parameters may indicate the one or more TCI states 2424 for decoding PDSCH transmission(s) of/for a downlink BWP of the cell.

A TCI state of the one or more TCI states 2424 may indicate/comprise one or more quasi co-location information parameters (e.g., QCL-Info as shown in FIG. 17). Each quasi co-location information parameter of the one or more quasi co-location information parameters may comprise/indicate a respective reference signal (e.g., referenceSignal as shown in FIG. 17) and/or a respective quasi co-location type (e.g., qcl-Type as shown in FIG. 17). A quasi co-location information parameter of the one or more quasi co-location information parameters may comprise/indicate a reference signal (e.g., ReferenceSignal as shown in FIG. 17). A quasi co-location information parameter of the one or more quasi co-location information parameters may comprise/indicate a quasi co-location type (e.g., qcl-Type as shown in FIG. 17). The quasi co-location type may be QCL type A, QCL type B, QCL type C, or QCL type D.

The wireless device may receive/decode a PDSCH transmission, for the cell, based on the TCI state of the one or more TCI states. The wireless device may receive DCI scheduling the PDSCH transmission (e.g., one or more TBs). The DCI may indicate the TCI state. The DCI may comprise a TCI field indicating the TCI state. Receiving/decoding the PDSCH transmission based on the TCI state may comprise that (e.g., the wireless device may determine that) a respective DM-RS port (of at least one DM-RS port of the PDSCH transmission) is quasi co-located with the respective reference signal with respect to the respective quasi co-location type. The respective reference signal and the respective quasi co-location type may be indicated by a respective quasi co-location information parameter of the one or more quasi co-location information parameters. Receiving/decoding the PDSCH transmission based on the TCI state may comprise that (e.g., the wireless device may determine that) at least one DM-RS port of the PDSCH transmission is quasi co-located with the reference signal with respect to the quasi co-location type. The reference signal and the quasi co-location type may be indicated by the quasi co-location information parameter.

The one or more configuration parameters 2404 may indicate TCI state indicators/indices (e.g., provided by a higher layer parameter tci-StateID as shown in FIG. 17) for the one or more TCI states. Each TCI state of the one or more TCI states may be indicated (e.g., identified) by a respective one TCI state indicator/index of the TCI state indicators/indices. A first TCI state of the one or more TCI states may be indicated (e.g., identified) by a first TCI state indicator/index of the TCI state indicators/indices. A second TCI state of the one or more TCI states may be indicated (e.g., identified) by a second TCI state indicator/index of the TCI state indicators/indices.

The wireless device may receive a MAC CE 2408 (e.g., TCI states activation/deactivation for wireless device-specific PDSCH MAC CE) activating at least one TCI state (e.g., TCI state 10, TCI state 4, TCI state 23, TCI state 8, TCI state 15 and TCI state 6 in FIG. 24) of the one or more TCI states 2424. For example, the at least one TCI state may comprise TCI state 10, TCI state 4, TCI state 23, TCI state 8, TCI state 15 and TCI state 6 as shown in FIG. 24. The MAC CE may have a field indicating at least one TCI state indicator/index of the at least one TCI state. The field may be set to a value (e.g., one, or any other value) indicating activation of the at least one TCI state. The wireless device may activate the at least one TCI state, for example, based on the field indicating the at least one TCI state and being set to the value. The wireless device may map the at least one TCI state to one or more TCI codepoints 2428, for example, based on the receiving the MAC CE 2408 activating the at least one TCI state. The one or more TCI codepoints 2428 may comprise TCI codepoint 00, TCI codepoint 01, TCI codepoint 10, and/or TCI codepoint 11. The one or more TCI codepoints 2428 may be equal to (e.g., correspond to) a value of a TCI field in DCI. The TCI field in the DCI may indicate (or be equal to) a TCI codepoint of the one or more TCI codepoints 2428. The TCI codepoint may comprise/indicate TCI state(s) of the at least one TCI state activated by the MAC CE 2408. The mapping the at least one TCI state to the one or more TCI codepoints may comprise grouping the at least one TCI state into the one or more TCI codepoints 2428. For example, TCI state 10 may be mapped to TCI codepoint 00, TCI state 4 and TCI state 23 may be mapped to TCI codepoint 01, TCI state 8 and TCI state 15 may be mapped to TCI codepoint 10, and TCI state 6 may be mapped to TCI codepoint 11.

The at least one TCI state may comprise a first TCI state (e.g., TCI state 10 or TCI state 6). The wireless device may map the first TCI state (e.g., TCI state 10 or TCI state 6) to a TCI codepoint (e.g., 00 or 11) of the one or more TCI codepoints 2428. The TCI codepoint (e.g., TCI codepoint 00 and TCI codepoint 11) may comprise a single TCI state (e.g., the first TCI state)

The at least one TCI state may comprise a first TCI state (e.g., TCI state 4 or TCI state 8) and a second TCI state (e.g., TCI state 23 or TCI state 15). The wireless device may map the first TCI state (e.g., TCI state 4 or TCI state 8) and the second TCI state (e.g., TCI state 23 or TCI state 15) to a TCI codepoint (e.g., 01, 10) of the one or more TCI codepoints 2428. The TCI codepoint (e.g., TCI codepoint 00 and TCI codepoint 11) may comprise at least two TCI states (e.g., the first TCI state and the second TCI state).

A TCI codepoint (e.g., TCI codepoint 01 and TCI codepoint 10) of the one or more TCI codepoints 2428 may comprise/indicate at least two TCI states). At least one TCI codepoint (e.g., TCI codepoint 01 and TCI codepoint 10) of the one or more TCI codepoints 2428 may comprise/indicate at least two TCI states.

The (activated) at least one TCI state may be applicable to PDSCH transmission in the cell. The (activated) at least one TCI state may be applicable to PDSCH transmission in the active downlink BWP of the cell. The (activated) at least one TCI state being applicable to PDSCH transmission in the active downlink BWP of the cell may comprise that DCI scheduling a PDSCH transmission for the active downlink BWP of the cell may indicate TCI state(s), of the at least one TCI state, for reception/decoding of the PDSCH transmission. The (activated) at least one TCI state being applicable to PDSCH transmission in the active downlink BWP of the cell may comprise that DCI scheduling a PDSCH transmission for the active downlink BWP of the cell may not indicate a TCI state, that is not among the at least one TCI state, for reception/decoding of the PDSCH transmission. The wireless device may receive/decode a PDSCH transmission, for the active downlink BWP of the cell, based on TCI state(s) of the at least one TCI state, for example, if DCI scheduling the PDSCH transmission indicates the TCI state(s) for reception/decoding of the PDSCH transmission. The receiving/decoding the PDSCH transmission based on the TCI state(s) may comprise that (e.g., the wireless device may determine that) at least one DM-RS port of the PDSCH transmission is quasi co-located with reference signal(s) indicated by the TCI state(s) with respect to quasi co-location type(s) (e.g., QCL type D) indicated by the TCI state(s).

The wireless device may receive DCI scheduling a PDSCH transmission (and/or a TB). The wireless device may receive the DCI via a scheduling cell. The DCI may schedule the PDSCH transmission for the active downlink BWP of the cell. The DCI may indicate TCI state(s) of the at least one TCI state. The DCI may comprise a TCI field indicating the TCI state(s) (or indicating a TCI codepoint of the TCI state(s)). The wireless device may receive/decode the PDSCH transmission, for the active downlink BWP of the cell, based on the TCI state(s)/TCI codepoint indicated by the TCI field.

The wireless device may receive (e.g., at or after time T2) DCI 2412 scheduling a PDSCH transmission (e.g., a TB). The wireless device may receive (e.g., at or after time T2) the TB. The wireless device receiving the TB may comprise that the wireless device receives the TB from each of at least two TRPs. The wireless device may receive the TB from each of at least two TRPs in one transmission occasion. The wireless device may receive the TB from each of at least two TRPs in a plurality of PDSCH transmission occasions (e.g., as described with reference to FIGS. 19-22).

The wireless device may determine that at least one TCI codepoint (e.g., TCI codepoint 01 and TCI codepoint 10) of the one or more TCI codepoints indicates at least two TCI states (e.g., TCI state 4 and TCI state 23 for TCI codepoint 01 and TCI state 8 and TCI state 15 for TCI codepoint 10). The wireless device may receive the TB based on (or with) at least two default TCI states, for example, based on the determining that the at least one TCI codepoint indicates at least two TCI states. The at least two default TCI states may be indicated by a TCI codepoint that has a lowest TCI codepoint indicator (e.g., index) among TCI codepoint indicator(s) associated with the at least one TCI codepoint. The wireless device may receive the TB based on (or with) a single default TCI state, for example, based on the determining that no TCI codepoint of the one or more TCI codepoints indicates at least two TCI states.

The one or more configuration parameters 2404 may comprise a parameter (e.g., an RRC parameter, multiple TCI state indication) indicating whether a single default TCI state or a plurality of default TCI states are to be used/applied for a reception of a TB. The parameter may indicate that a plurality of default TCI states are to be used/applied for a reception of the TB. The wireless device may receive the TB based on (or with) at least two default TCI states, for example, based on the parameter indicating that a plurality of default TCI states are to be used/applied for a reception of the TB. The parameter may indicate that a single default TCI state is to be used/applied for a reception of the TB. The wireless device may receive the TB based on (or with) a single default TCI state (e.g., a first default TCI state), for example, based on the parameter indicating that a single default TCI state is to be used/applied for a reception of the TB.

The one or more configuration parameters 2404 may indicate a transmission scheme for a communication service (e.g., a URLLC service, an eMBB service, and/or any other type of service). The one or more configuration parameters 2404 indicating the transmission scheme may comprise that the one or more configuration parameters 2404 comprise a higher layer parameter (e.g., URLLSchemeEnabler) being set to (or indicating) the transmission scheme (e.g., FDMSchemeA, FDMSchemeB, TDMSchemeA). The wireless device may receive the TB based on (e.g., using, applying, and/or with) at least two default TCI states, for example, based on the one or more configuration parameters 2404 indicating the transmission scheme. The wireless device may receive the TB based on (e.g., using, applying, and/or with) a single default TCI state, for example, based on the one or more configuration parameters 2404 not indicating the transmission scheme.

The one or more configuration parameters 2404 may indicate one or more time domain resource allocations (e.g., PDSCH-TimeDomainResourceAllocation in pdsch-TimeDomainResourceAllocationList as shown in FIG. 18A). At least one time domain resource allocation (e.g., row index 1 and row index 3 in FIG. 18B, or at least one entry in the higher layer parameter pdsch-TimeDomainResourceAllocationList) of the one or more time domain resource allocations may comprise a repetition quantity parameter. The wireless device may receive the TB based on (e.g., using, applying, and/or with) at least two default TCI states, for example, based on the at least one time domain resource allocation of the one or more time domain resource allocations comprising the higher layer parameter. The wireless device may receive the TB based on (e.g., using, applying, and/or with) a single default TCI state, for example, if no time domain resource allocation of the one or more time domain resource allocations comprises the higher layer parameter The one or more configuration parameters 2404 may indicate at least two values (e.g., 0 and 1) for a higher layer parameter (e.g., CORESETPoolIndex). The at least two values may comprise a first value (e.g., 0) for one or more first CORESETs of the downlink BWP of the cell. The at least two values may comprise a second value (e.g., 1), different from the first value, for one or more second CORESETs of the downlink BWP of the cell. The one or more first CORESETs may further comprise a CORESET without a value for the higher layer parameter CORESETPoolIndex. The one or more configuration parameters 2404 may not comprise the higher layer parameter CORESETPoolIndex for the CORESET. The wireless device may receive the TB based on (e.g., using, applying, and/or with) at least two default TCI states, for example, based on the one or more configuration parameters 2404 indicating the at least two values for the higher layer parameter CORESETPoolIndex.

The wireless device may determine that a time offset 2416 between a reception of the DCI 2412 and a reception of the TB is less than a threshold 2420 (e.g., timeDurationForQCL, DCI decoding delay). The receiving the TB based on (e.g., using, applying, and/or with) the at least two default TCI states may be based on the time offset 2416 between the reception of the DCI 2412 and the reception of the TB being lower than the threshold 2420. The receiving the TB based on (e.g., using, applying, and/or with) the single default TCI state may be based on the time offset 2416 between the reception of the DCI 2412 and the reception of the TB being less than the threshold 2420.

The receiving the DCI 2412 may comprise receiving the DCI 2412 via a CORESET. The downlink BWP of the cell may comprise the CORESET. The one or more configuration parameters 2404 may not indicate/comprise a higher layer parameter (e.g., tci-PresentInDCI) for the CORESET. The one or more configuration parameters 2404 not indicating/comprising the higher layer parameter for the CORESET may indicate that the higher layer parameter is not configured for the CORESET. The one or more configuration parameters 2404 not indicating/comprising the higher layer parameter for the CORESET may indicate that the higher layer parameter is absent in the configuration of the CORESET. The receiving the TB based on (e.g., using, applying, and/or with) the at least two default TCI states may be based on the one or more configuration parameters not indicating/comprising the higher layer parameter for the CORESET via which the wireless device receives the DCI 2412. The receiving the TB based on (e.g., using, applying, and/or with) the single default TCI state may be based on the one or more configuration parameters not indicating/comprising the higher layer parameter for the CORESET via which the wireless device receives the DCI 2412.

The receiving the TB may comprise receiving a plurality of repetitions of TB in a plurality of PDSCH transmission occasions (e.g., such as described with reference to FIGS. 19-21, 22A, and 22B). The receiving the TB based on (e.g., using, applying, and/or with) the single default TCI state may comprise receiving the plurality of repetitions of the TB based on the single default TCI state. The receiving the TB based on (e.g., using, applying, and/or with) the at least two default TCI states may comprise receiving the repetitions of the TB in different PDSCH transmission occasions based on different corresponding default TCI states (e.g., such as described with reference to FIGS. 20, 22A, and 22B). The receiving the TB based on (e.g., using, applying, and/or with) the at least two default TCI states may comprise receiving the repetitions of the TB in each of the plurality of PDSCH transmission occasions based on the at least two default TCI states.

The at least two default TCI states may comprise a first default TCI state and/or a second default TCI state. The receiving the TB based on the at least two default TCI states may comprise that the wireless device receives the TB in a first PDSCH transmission occasion in a first slot based on the first default TCI state. The receiving the TB based on the at least two default TCI states may comprise that the wireless device receives the TB in a second PDSCH transmission occasion in a second slot based on the second default TCI state. The first slot and the second slot may be the same. For example, the configuration parameters 2404 may indicate a transmission scheme associated with intra-slot repetition (e.g., TDMSchemeA). A PDSCH transmission may comprise two different layer combinations of the TB. Each TCI state of the at least two TCI states may correspond to a respective layer of the two different layer combinations. The first slot and the second slot may be different (e.g., inter-slot repetition).

Figure 25:
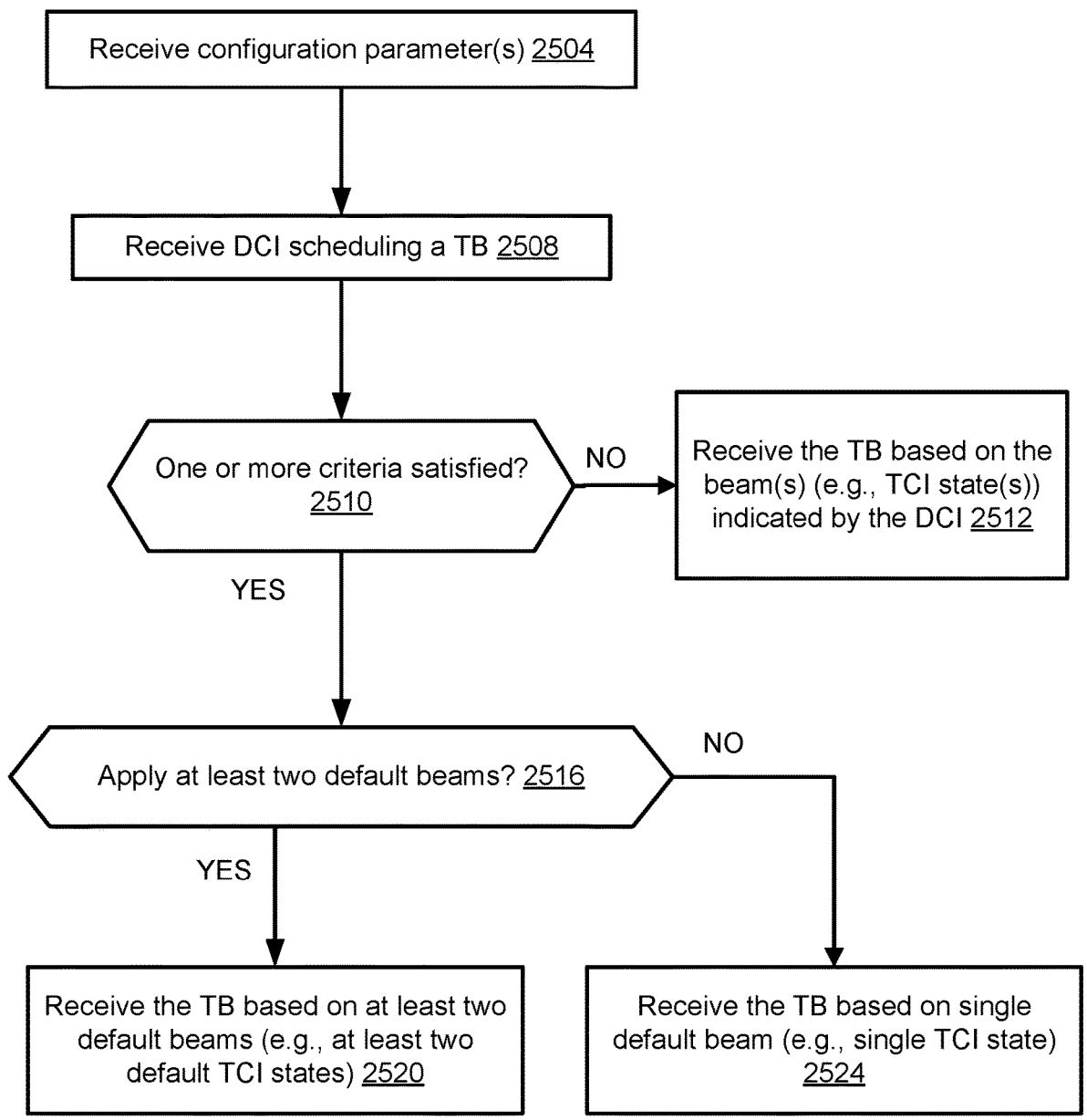
FIG. 25 shows an example method for receiving a PDSCH transmission.

FIG. 25 shows an example method for receiving a PDSCH transmission. A wireless device may perform the example method 2500 shown in FIG. 25. At step 2504, the wireless device may receive one or more messages. The one or more messages may comprise one or more configuration parameters. The one or more messages may indicate a plurality of TCI states.

At step 2508, the wireless device may receive DCI scheduling a TB. At step 2510, the wireless device may determine whether one or more criteria are satisfied. The one or more criteria being satisfied may comprise that an offset between a reception of the DCI and a reception of the TB is less than a threshold (e.g., timeDurationForQCL, DCI decoding delay). The one or more criteria being satisfied may comprise receiving the DCI via a CORESET, wherein the one or more configuration parameters do not indicate a higher layer parameter (e.g., tci-PresentInDCI) for the CORESET.

At step 2512, the wireless device may receive the TB based on one or more beams indicated by the DCI, for example, if the one or more criteria are not satisfied. Receiving the TB based on one or more beams indicated by the DCI may comprise using/applying one or more TCI states indicated by the DCI.

At step 2516, the wireless device may determine whether to apply at least two default beams (e.g., at least two default TCI states) for the TB, for example, if the one or more first criteria are satisfied. The wireless device may determine whether to apply at least two of default beams for the TB based on one or more considerations described with reference to FIG. 24.

The wireless device may receive an activation command (e.g., MAC CE 2408) activating/selecting at least one TCI state among the plurality of TCI states. The wireless device may group/map the at least one TCI state into one or more TCI codepoints. The one or more considerations may comprise determining that at least one TCI codepoint, of the one or more TCI codepoints, indicate/comprise at least two TCI states. The plurality of TCI states may comprise the at least two TCI states. The at least one TCI state may comprise the at least two TCI states. The wireless device may determine to apply at least two of default beams, for example, if at least one TCI codepoint, of the one or more TCI codepoints, indicates/comprises at least two TCI states. The wireless device may determine to apply at least two of default beams, for example, if configuration parameters comprise a multiple TCI state indication (e.g., indicating multiple default beams are to be applied).

At step 2520, the wireless device may receive the TB based on at least two default beams, for example, if the wireless device determines (e.g., at step 2516) to apply at least two default beams. Receiving the TB based on at least two default beams may comprise using/applying at least two default TCI states. At step 2524, the wireless device may receive the TB based on a single default beam, for example, if the wireless device determines (e.g., at step 2516) to not apply at least two default beams. Receiving the TB based on a single default beam may comprise using/applying a single default TCI state. The plurality of TCI states may comprise the default TCI states.

A wireless device may receive one or more messages comprising one or more configuration parameters. The one or more configuration parameters may indicate a plurality of default TCI states. The plurality of default TCI states comprising a first default TCI state and a second default TCI state.

The wireless device may receive, via a first CORESET, first DCI scheduling a first TB. The first CORESET may correspond to a first CORESET pool indicator/index (e.g., provided by higher layer parameter CORESETPoolIndex). The wireless device may determine a third default TCI state, for example, based on the receiving the first DCI via the first CORESET with the first CORESET group indicator/index. The wireless device may receive the first TB based on the third default TCI state and the second default TCI state.

The wireless device may determine/select the second default TCI state, for example, based on the receiving the first DCI via the first CORESET corresponding to the first CORESET group indicator/index. The one or more configuration parameters may indicate the first CORESET pool indicator/index for the second default TCI state. The one or more configuration parameters may indicate a second CORESET pool indicator/index for the second default TCI state. The determining the third default TCI state may be further based on determining that an offset between a reception of the first DCI and the first TB is lower than a threshold (e.g., timeDurationForQCL).

The wireless device may receive, via a second CORESET, a second DCI scheduling a second TB. The second CORESET may correspond to CORESET pool indicator/index (e.g., provided higher layer parameter CORESETPoolIndex). The wireless device may determine a fourth default TCI state, for example, based on the receiving the second DCI via the second CORESET with the second CORESET group indicator/index. The wireless device may receive the second TB based on the fourth default TCI state and the first default TCI state.

The wireless device may determine/select the first default TCI state, for example, based on the receiving the second DCI via the second CORESET with the second CORESET group indicator/index. The one or more configuration parameters may indicate the first CORESET pool indicator/index for the first default TCI state. The one or more configuration parameters may indicate the second CORESET pool indicator/index for the first default TCI state.

The first CORESET pool indicator/index and the second CORESET pool indicator/index may be different. The first default TCI state and the second default TCI state may be different. The third default TCI state and the fourth default TCI state may be different.

The wireless device may determine at least two PDSCH transmission occasions of/for the TB. The wireless device may determine the at least two PDSCH transmission occasions of/for the TB, for example, based on the one or more time domain resource allocations comprising at least one time domain resource allocation with a repetition quantity parameter. The wireless device may determine the at least two PDSCH transmission occasions of the TB, for example, based on the one or more time domain resource allocations comprising at least one time domain resource allocation with the repetition quantity parameter and/or the determining that the time offset is less than the threshold.

The at least two PDSCH transmission occasions may occur, in time, between the reception of the DCI and an end of the threshold. With reference to FIG. 22A, for example, the at least two PDSCH transmission occasions may comprise a first PDSCH transmission occasion (e.g., slot n+1), a second PDSCH transmission occasion (e.g., slot n+2), a third PDSCH transmission occasion (e.g., slot n+3), and a fourth PDSCH transmission occasion (e.g., slot n+4).

The wireless device may receive, in the at least two PDSCH transmission occasions, the TB based on an RV value. The RV value may be 0, 2, or any other value. The RV value may be preconfigured/fixed/predefined. The one or more configuration parameters may indicate the RV value. The wireless device may receive, in the at least two PDSCH transmission occasions, the TB with an RV that is equal to the RV value. The wireless device may receive, in the first PDSCH transmission occasion, the second PDSCH transmission occasion, the third PDSCH transmission occasion, and the fourth PDSCH transmission occasion, the TB with an RV that is equal to the RV value.

The one or more configuration parameters may comprise a higher layer parameter (e.g., RepTCIMapping, mapping parameter). The mapping parameter may be set to (and/or indicate) a first type of mapping (e.g., CycMapping). The wireless device may ignore the mapping parameter, for example, if the higher layer parameter is set to (and/or indicate) the first type of mapping. The wireless device may ignore the mapping parameter if the mapping parameter is set to (and/or indicate) the first type of mapping, for example, based on the determining that the time offset is lower than the threshold. The wireless device may apply an RV sequence {0, 2, 3, 1} for the at least two PDSCH transmission occasions, for example, based on the ignoring the mapping parameter. The wireless device may apply the first default TCI state for a reception of the TB in the at least two PDSCH transmission occasions, for example, based on the ignoring the mapping parameter. The wireless device may not receive the TB based on the second default TCI state, for example, based on the ignoring the mapping parameter.

The wireless device may stop ignoring (and/or considering) the first type of mapping, for example, after the threshold ends (e.g., a first slot after then end of the threshold). The wireless device may apply a first RV sequence (e.g., {0, 2, 3, 1}) for the one or more first PDSCH transmission occasions with the first TCI state and a second RV sequence (e.g., (first RV sequence+the value for the RV offset) modulo 4) for the one or more second PDSCH transmission occasions with the second TCI state, for example, based on the stopping ignoring the mapping parameter. The wireless device may apply/use the first default TCI state for a reception of the TB in the one or more first PDSCH transmission occasions corresponding to the first TCI state and the second default TCI state for a reception of the TB in the one or more second PDSCH transmission occasions corresponding to the second TCI state, for example, based on the stopping ignoring the first type of mapping.

The wireless device may receive, in the at least two PDSCH transmission occasions, the TB based on an RV value. The RV value may be 0, 2, or any other value. The RV value may be preconfigured/fixed/predefined. The one or more configuration parameters may indicate the RV value. The wireless device may receive the TB in the first PDSCH transmission occasion with an RV that is equal to zero (RV=0), in the second PDSCH transmission occasion with an RV that is equal to two (RV=2), in the third PDSCH transmission occasion with an RV that is equal to three (RV=3), and in the fourth PDSCH transmission occasion with an RV that is equal to one (RV=1), for example, based on the RV value being equal to zero.

The wireless device may receive, in one or more first PDSCH transmission occasions of the at least two PDSCH transmission occasions, the TB based on an RV value. The RV value may be 0, 2, or any other value. The RV value may be preconfigured/fixed/predefined. The one or more configuration parameters may indicate the RV value. The wireless device may receive the TB in the one or more first PDSCH transmission occasions based on (e.g., and/or with) the first TCI state. The wireless device may receive, in one or more second PDSCH transmission occasions of the at least two PDSCH transmission occasions, the TB based on a second RV value. The second RV value may be determined based on the RV value and a value for an RV offset (e.g., RVSchOffset). The one or more configuration parameters may indicate the value for the RV offset. The wireless device may receive the TB in the one or more second PDSCH transmission occasions based on (e.g., using, applying, and/or with) the second TCI state. The second RV value may be equal to a sum of the first RV value and the value for the RV offset. The second RV value may be equal to ((RV value+RV offset) modulo 4). With reference to FIG. 22, for example, the wireless device may receive, in the first PDSCH transmission occasion and the third PDSCH transmission occasion, the TB with an RV that is equal to the RV value. The wireless device may receive, in the second PDSCH transmission occasion and the fourth PDSCH transmission occasion, the TB with an RV that is equal to the second RV value.

Various examples herein describe procedures for PDSCH transmissions and/or TB transmissions merely for illustrative purposes. Various example procedures described with reference to FIGS. 17-25 may apply for other types of transmissions (e.g., uplink transmissions, PUSCH transmissions, PUCCH transmissions, sidelink transmissions, other types of downlink transmissions, etc.).

A wireless device may perform a method comprising multiple operations. The wireless device may receive one or more configuration parameters indicating application of at least two default transmission configuration indicator (TCI) states for a physical downlink shared channel (PDSCH). The wireless device may receive downlink control information (DCI) for the PDSCH. The DCI may schedule a reception of a transport block via the PDSCH. The wireless device may receive, based on two default TCI states, a PDSCH transmission (e.g., a transport block). The one or more configuration parameters may indicate application of at least two default TCI states. An offset, between the PDSCH transmission and the receiving the DCI, may be less than a threshold. The wireless device may also perform one or more additional operations. The DCI may further schedule repetition of the transport block in a plurality of transmission occasions. The receiving the transport block may comprise receiving repetitions of the transport block in the plurality of transmission occasions. The receiving the PDSCH transmission based on the two default TCI states may be further based on at least one TCI codepoint indicating two TCI states. The wireless device may receive one or more second configuration parameters indicating application of a single default TCI state for the PDSCH. The wireless device may receive second DCI for the PDSCH. The wireless device may receive, based on one default TCI state, a second PDSCH transmission (e.g., a second transport block). The one or more second configuration parameters may indicate application of a single default TCI state. An offset, between the receiving the second PDSCH transmission and the receiving the second DCI, may be less than the threshold. The receiving the PDSCH transmission based on the two default TCI states may comprise receiving repetitions of a transport block. At least one first demodulation reference signal (DM-RS) port of the transport block may be quasi co-located with a first reference signal indicated by a first default TCI state of the two default TCI states. At least one second DM-RS port of the transport block may be quasi co-located with a second reference signal indicated by a second default TCI state of the two default TCI states. The at least one first DM-RS port and the at least one second DM-RS port may be the same. The at least one first DM-RS port and the at least one second DM-RS port may be different. The threshold may comprise a time duration for decoding the DCI at the wireless device. The threshold may comprise a second time duration for applying spatial relation information indicated by the DCI. The offset may comprise a time offset between the receiving the DCI and the receiving the PDSCH transmission. The receiving the second PDSCH transmission based on the single default TCI state may comprise at least one demodulation reference signal (DM-RS) port of the second PDSCH transmission being quasi co-located with a third reference signal indicated by the default TCI state. The wireless device may transmit wireless device capability information indicating a value for the threshold. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the DCI. A computer-readable medium may store instructions that, when executed, cause performance of the described method, additional operations and/or include the additional elements.

A wireless device may perform a method comprising multiple operations. The wireless device may receive an activation command indicating one or more transmission configuration indicator (TCI) codepoints. The wireless device may receive downlink control information (DCI) for a physical downlink shared channel (PDSCH) repetition (e.g., repetitions of a transport block) in a plurality of transmission occasions, wherein the plurality of transmission occasions comprises a first transmission occasion. The plurality of transmission occasions may start with the first transmission occasion. The wireless device may receive, using two default TCI states, the PDSCH repetition. The receiving the PDSCH repetition may be based on: a determination that at least one TCI codepoint of the one or more TCI codepoints indicates at least two TCI states; and an offset, between the first transmission occasion and the receiving the DCI, being less than a threshold. The wireless device may also perform one or more additional operations. The wireless device may receive one or more configuration parameters indicating application of at least two default TCI states for the PDSCH repetition, wherein the receiving the PDSCH repetition may be further based on the one or more configuration parameters indicating the application of at least two default TCI states. The wireless device may receive one or more configuration parameters indicating a plurality of TCI states. The receiving the activation command indicating the one or more TCI codepoints may comprise: receiving the activation command indicating one or more TCI states of the plurality of TCI states; and mapping the one or more TCI states to the one or more TCI codepoints. The two default TCI states may be indicated by a TCI codepoint associated with a lowest TCI codepoint indicator among TCI codepoint indicators of a set of TCI codepoints, wherein each TCI codepoint in the set of TCI codepoints may indicate at least two respective TCI states. The receiving the PDSCH repetition based on the two default TCI states may comprise receiving the PDSCH repetition (e.g., the transport block) using: a first default TCI state in one or more first transmission occasions of the plurality of transmission occasions, wherein the one or more first transmission occasions may comprise the first transmission occasion; and a second default TCI state in one or more second transmission occasions of the plurality of transmission occasions, wherein each of the one or more first transmission occasions may be different from each of the one or more second transmission occasions. The threshold may comprise a time duration for decoding the DCI. The offset may comprise a time offset between the receiving the DCI and the receiving the PDSCH repetition. The wireless device may receive one or more configuration parameters indicating an intra-slot repetition scheme, wherein the plurality of transmission occasions may be in a single time slot based on the one or more configuration parameters indicating the intra-slot repetition scheme. The wireless device may receive one or more configuration parameters indicating an inter-slot repetition scheme, wherein the plurality of transmission occasions may be in a plurality of time slots based on the one or more configuration parameters indicating the intra-slot repetition scheme. Each transmission occasion of the plurality of transmission occasions may be in a respective time slot of a plurality of time slots. The receiving the PDSCH repetition may comprise receiving the PDSCH repetition via a physical downlink shared channel (PDSCH). A first default TCI state of the two default TCI states may be a TCI state of a control resource set (CORESET) with a lowest CORESET indicator. A second default TCI state of the two default TCI states may be a TCI state indicated by a TCI codepoint. The receiving the PDSCH repetition by applying the two default TCI states may comprise at least one demodulation reference signal (DM-RS) port of the PDSCH repetition being quasi co-located with: a first reference signal indicated by a first default TCI state in one or more first transmission occasions of the plurality of transmission occasions, wherein the one or more first transmission occasions may comprise the first transmission occasion; and a second reference signal indicated by a second default TCI state in one or more second transmission occasions of the plurality of transmission occasions, wherein each of the one or more first transmission occasions may be different from each of the one or more second transmission occasions. The wireless device may transmit wireless device capability information indicating a value for the threshold. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the DCI. A computer-readable medium may store instructions that, when executed, cause performance of the described method, additional operations and/or include the additional elements.

A wireless device may perform a method comprising multiple operations. The wireless device may receive downlink control information (DCI) for a physical downlink shared channel (PDSCH) repetition (e.g., repetition of a transport block) in a plurality of transmission occasions, wherein the plurality of transmission occasions starts with a first transmission occasion. The wireless device may determine two default transmission configuration indicator (TCI) states based on: an offset, between the first transmission occasion and the receiving the DCI, being less than a threshold; and at least one TCI codepoint indicating two TCI states. The wireless device may receive the PDSCH repetition (e.g., the transport block) based on: a first default TCI state, of the two default TCI states, in one or more odd transmission occasions of the plurality of transmission occasions; and a second default TCI state, of the two default TCI states, in one or more even transmission occasions of the plurality of transmission occasions. The wireless device may also perform one or more additional operations. The wireless device may receive one or more configuration parameters indicating application of at least two default TCI states for the PDSCH repetition, wherein the determining the two default TCI states may be further based on the one or more configuration parameters indicating the application of at least two default TCI states. The wireless device may receive one or more configuration parameters indicating a cyclic TCI mapping, wherein the receiving the for the PDSCH repetition based on the first default TCI state in the one or more odd transmission occasions and the second default TCI state in the one or more even transmission occasions may be based on the one or more configuration parameters indicating the cyclic TCI mapping. The threshold may comprise a time duration for decoding the DCI at the wireless device. The offset may comprise a time offset between the receiving the DCI and the receiving the PDSCH repetition, and wherein the plurality of transmission occasions starts with the first transmission occasion. The wireless device may receive one or more messages comprising one or more configuration parameters indicating a plurality of TCI states. The wireless device may receive an activation command activating one or more TCI states of the plurality of TCI states. The wireless device may map the one or more TCI states to one or more TCI codepoints, wherein the one or more TCI codepoints may comprise the at least one TCI codepoint. The wireless device may receive one or more configuration parameters indicating an intra-slot repetition scheme, wherein the plurality of transmission occasions may be in a single time slot based on the one or more configuration parameters indicating the intra-slot repetition scheme. The wireless device may receive one or more configuration parameters indicating a quantity of the plurality of transmission occasions. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the DCI. A computer-readable medium may store instructions that, when executed, cause performance of the described method, additional operations and/or include the additional elements.

A wireless device may perform a method comprising multiple operations. The wireless device may receive one or more messages comprising one or more configuration parameters indicating: application of at least two default transmission configuration indicator (TCI) states to physical downlink shared channel (PDSCH) receptions; and an intra-slot repetition scheme. The wireless device may receive downlink control information (DCI) scheduling repetitions of a transport block in two transmission occasions of/within a time slot, wherein the two transmission occasions may comprise a first transmission occasion and a second transmission occasion. The wireless device may determine two default TCI states based on: an offset between the downlink control information and the first transmission occasion being less than a threshold; at least one TCI codepoint indicating at least two TCI states; and the one or more configuration parameters indicating the application of at least two default TCI states. The wireless device may receive the transport block based on: a first default TCI state of the two default TCI states in the first transmission occasion; and a second default TCI state of the two default TCI states in the second transmission occasion. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the DCI. A computer-readable medium may store instructions that, when executed, cause performance of the described method, additional operations and/or include the additional elements.

A wireless device may perform a method comprising multiple operations. The wireless device may receive one or more messages comprising one or more configuration parameters indicating: application of at least two default transmission configuration indicator (TCI) states to physical downlink shared channel (PDSCH) receptions; and a cyclic TCI mapping. The wireless device may receive downlink control information (DCI) scheduling repetitions of a transport block in a plurality of transmission occasions that comprise one or more odd transmission occasions and one or more even transmission occasions. The wireless device may determine two default TCI states based on: an offset between the downlink control information and a first transmission occasion of the plurality of transmission occasions being less than a threshold; at least one TCI codepoint indicating at least two TCI states; and the one or more configuration parameters indicating the application of at least two default TCI states. The wireless device may receive the transport block based on: a first default TCI state of the two default TCI states in the one or more odd transmission occasions; and a second default TCI state of the two default TCI states in the one or more even transmission occasions. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the DCI. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
receiving, by a wireless device, a radio resource control (RRC) message comprising an indication indicating that the wireless device use at least two default transmission configuration indicator (TCI) states for a physical downlink shared channel (PDSCH);
receiving downlink control information (DCI) for scheduled reception via the PDSCH; and
receiving a PDSCH transmission using two default TCI states, wherein using the two default TCI states is based on:
the indication being present in the RRC message,
at least one TCI codepoint, of one or more TCI codepoints, indicating at least two TCI states, and
an offset between the receiving the DCI and the scheduled reception via the PDSCH being less than a threshold.

2. The method of claim 1, wherein:
the receiving the PDSCH transmission comprises receiving repetitions of a transport block in a plurality of transmission occasions.

3. The method of claim 1, further comprising:
receiving a second RRC message comprising a second indication that the wireless device use a single default TCI state for the PDSCH;
receiving second DCI for second scheduled reception via the PDSCH; and
based on the second indication indicating that the wireless device use a single default TCI state and based on an offset between the receiving the second DCI and the second scheduled reception via the PDSCH being less than a threshold, receiving a second PDSCH transmission using one default TCI state.

4. The method of claim 1, wherein the receiving the PDSCH transmission using the two default TCI states comprises:
at least one first demodulation reference signal (DM-RS) port of the PDSCH transmission being quasi co-located with a first reference signal indicated by a first default TCI state of the two default TCI states; and
at least one second DM-RS port of the PDSCH transmission being quasi co-located with a second reference signal indicated by a second default TCI state of the two default TCI states.

5. The method of claim 1, wherein the threshold comprises a time duration for decoding the DCI.

6. The method of claim 1, wherein the offset comprises a time offset between the receiving the DCI and the receiving the PDSCH transmission.

7. A method comprising:
receiving, by a wireless device, a radio resource control (RRC) message comprising an indication indicating application of at least two default transmission configuration indicator (TCI) states for a physical downlink shared channel (PDSCH);
receiving an activation command indicating one or more transmission configuration indicator (TCI) codepoints;
receiving downlink control information (DCI) for a PDSCH repetition in a plurality of transmission occasions, wherein the plurality of transmission occasions comprises a first transmission occasion; and
receiving the PDSCH repetition using two default TCI states, wherein using the two default TCI states is based on:
the indication being present in the RRC message;
at least one TCI codepoint, of the one or more TCI codepoints, indicating at least two TCI states; and
an offset, between the first transmission occasion and the receiving the DCI, being less than a threshold.

8. The method of claim 7, further comprising receiving one or more configuration parameters indicating a plurality of TCI states, wherein the receiving the activation command indicating the one or more TCI codepoints comprises receiving the activation command indicating one or more TCI states of the plurality of TCI states, and wherein the method further comprises mapping the one or more TCI states to the one or more TCI codepoints.

9. The method of claim 7, wherein the two default TCI states are indicated by a TCI codepoint associated with a lowest TCI codepoint indicator among TCI codepoint indicators of a set of TCI codepoints, wherein each TCI codepoint in the set of TCI codepoints indicates at least two respective TCI states.

10. The method of claim 7, wherein the receiving the PDSCH repetition using the two default TCI states comprises receiving the PDSCH repetition using:
a first default TCI state in one or more first transmission occasions of the plurality of transmission occasions, wherein the one or more first transmission occasions comprises the first transmission occasion; and
a second default TCI state in one or more second transmission occasions of the plurality of transmission occasions, wherein each of the one or more first transmission occasions is different from each of the one or more second transmission occasions.

11. The method of claim 7, wherein the threshold comprises a time duration for decoding the DCI.

12. The method of claim 7, wherein the offset comprises a time offset between the receiving the DCI and the receiving the PDSCH repetition.

13. A method comprising:
receiving, by a wireless device, downlink control information (DCI) for a downlink transmission in a plurality of transmission occasions, wherein the plurality of transmission occasions comprises a first transmission occasion;
determining two default transmission configuration indicator (TCI) states based on:
an offset, between the first transmission occasion and the receiving the DCI, being less than a threshold;
an indication indicating application of at least two default TCI states being present in a radio resource control (RRC) message; and
at least one TCI codepoint indicating two TCI states; and
receiving, based on a first default TCI state of the two default TCI states, a first plurality of physical downlink shared channel (PDSCH) repetitions in a first group of transmission occasions of the plurality of transmission occasions; and
receiving, based on a second default TCI state of the two default TCI states, a second plurality of PDSCH repetitions in a second group of transmission occasions, of the plurality of transmission occasions, following the first group of transmission occasions.

14. The method of claim 13, further comprising receiving the RRC message comprising the indication indicating application of at least two default TCI states for the downlink transmission.

15. The method of claim 13, further comprising receiving one or more configuration parameters indicating a sequential TCI mapping, wherein the receiving the first plurality of PDSCH repetitions in the first group of transmission occasions and the second plurality of PDSCH repetitions in the second group of transmission occasions is based on the one or more configuration parameters indicating the sequential TCI mapping.

16. The method of claim 13, wherein the threshold comprises a time duration for decoding the DCI.

17. The method of claim 13, wherein the plurality of transmission occasions starts with the first transmission occasion.

18. The method of claim 13, further comprising:
receiving one or more messages comprising one or more configuration parameters indicating a plurality of TCI states;
receiving an activation command activating one or more TCI states of the plurality of TCI states; and
mapping the one or more TCI states to one or more TCI codepoints, wherein the one or more TCI codepoints comprise the at least one TCI codepoint.

19. The method of claim 7, wherein the first transmission occasion is an earliest transmission occasion of the plurality of transmission occasions.

20. The method of claim 13, wherein each transmission occasion in the first group of transmission occasions or the second group of transmission occasions comprises a plurality of symbols.

* * * * *